US012099607B2

(12) United States Patent
Chow

(10) Patent No.: US 12,099,607 B2
(45) Date of Patent: *Sep. 24, 2024

(54) TRUST NETWORK EFFECT

(71) Applicant: Edmond K. Chow, Hong Kong (HK)

(72) Inventor: Edmond K. Chow, Hong Kong (HK)

( * ) Notice: Subject to any disclaimer, the term of this patent is extended or adjusted under 35 U.S.C. 154(b) by 234 days.

This patent is subject to a terminal disclaimer.

(21) Appl. No.: 17/463,527

(22) Filed: Aug. 31, 2021

(65) Prior Publication Data

US 2022/0058267 A1 Feb. 24, 2022

Related U.S. Application Data

(63) Continuation-in-part of application No. 15/795,102, filed on Oct. 26, 2017, now Pat. No. 11,106,794, which is a continuation of application No. 14/604,458, filed on Jan. 23, 2015, now abandoned, which is a continuation-in-part of application No. 13/663,366, filed on Oct. 29, 2012, now Pat. No. 9,626,405, said application No. 14/604,458 is a continuation-in-part of application No. 14/498,866, filed on Sep. 26, 2014, now Pat. No. 9,967,256, which is a continuation-in-part of application No. 13/269,553, filed on Oct. 7, 2011, now Pat. No. 8,881,268, said application No. 14/604,458 is a continuation-in-part of application No. 13/175,021, filed on Jul. 1, 2011, now Pat. No. 8,943,046, said application No. 14/604,458 is a continuation-in-part of application No. 13/161,155, filed on Jun. 15, 2011, now abandoned.

(60) Provisional application No. 61/551,929, filed on Oct. 27, 2011, provisional application No. 62/053,233, filed on Sep. 22, 2014, provisional application No. 61/391,033, filed on Oct. 7, 2010, provisional application No. 61/361,384, filed on Jul. 3, 2010, (Continued)

(51) Int. Cl.

| | |
|---|---|
| ***G06F 21/00*** | (2013.01) |
| ***G06F 21/57*** | (2013.01) |
| ***G06Q 30/0251*** | (2023.01) |
| ***G06Q 30/0282*** | (2023.01) |
| ***H04L 9/40*** | (2022.01) |
| ***H04L 67/02*** | (2022.01) |
| *G06Q 50/00* | (2012.01) |

(52) U.S. Cl.

CPC ......... *G06F 21/57* (2013.01); *G06Q 30/0263* (2013.01); *G06Q 30/0282* (2013.01); *H04L 63/20* (2013.01); *H04L 67/02* (2013.01); *G06Q 50/01* (2013.01)

(58) Field of Classification Search

CPC ......... G06F 21/57; H04L 63/20; H04L 63/01; G06Q 30/0282; G06Q 30/0263

USPC ......................................................... 705/347

See application file for complete search history.

(56) References Cited

U.S. PATENT DOCUMENTS 6,014,638 A * 1/2000 Burge ................ G06Q 30/0201 705/7.29
6,826,626 B1 * 11/2004 McManus ........... G06F 16/9574 707/E17.12

(Continued)

*Primary Examiner* — Vincent F Boccio

(57) ABSTRACT

An invention is disclosed for systems, methods, processes, and products of providing computing and online services. An embodiment of such a system, method, process, or product, among other things, may provide a more reliable, accurate, or otherwise effective way of determining and presenting relevant information to users, consumers, and the like.

20 Claims, 35 Drawing Sheets

Related U.S. Application Data provisional application No. 61/354,702, filed on Jun. 15, 2010.

(56) References Cited

U.S. PATENT DOCUMENTS

| | | | | |
|---|---|---|---|---|
| 7,185,073 | B1 * | 2/2007 | Gai | H04L 41/0893 709/221 |
| 7,735,116 | B1 * | 6/2010 | Gauvin | H04L 63/102 713/153 |
| 2007/0230486 | A1 * | 10/2007 | Zafirov | H04L 43/12 370/428 |
| 2010/0107215 | A1 * | 4/2010 | Bechtel | H04L 63/20 726/1 |

* cited by examiner

400

Trust Network of User 1 (U1): User 1 (U1), User 2 (U2)

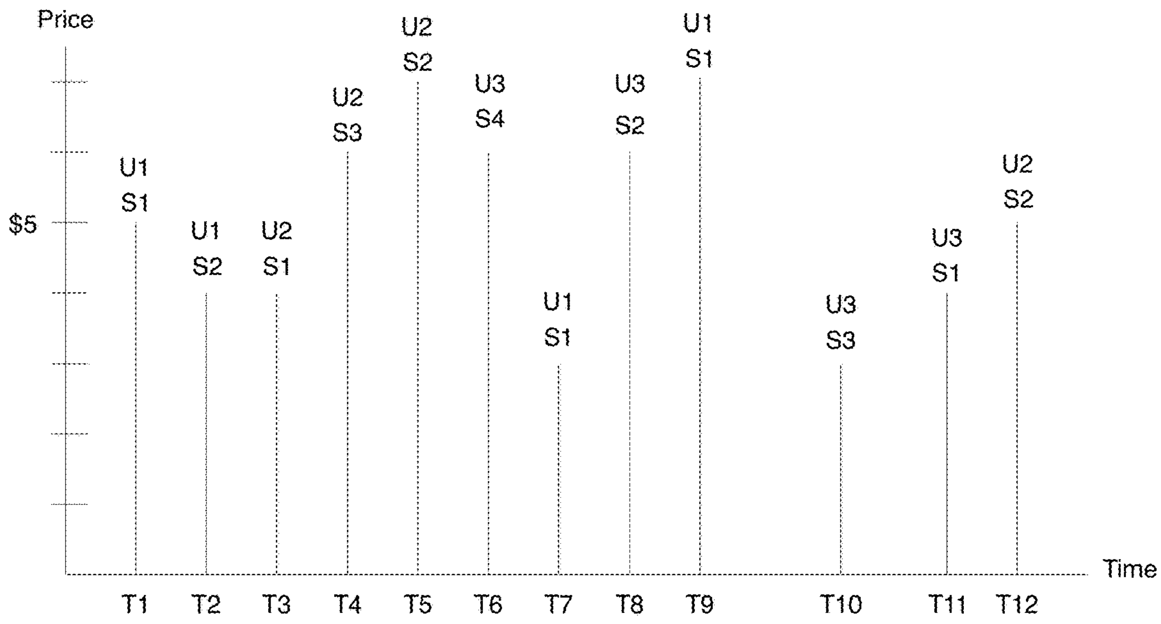

Current Offers (Trust Effect OFF):

Sorted by Time (most recent first): Offer(T12, S2, U2), Offer(T11, S1, U3), Offer(T10, S3, U3), Offer(T6, S4, U3)

Sorted by Price (cheapest first): Offer(T10, S3, U3) = $3, Offer(T11, S1, U3) = $4, Offer(T12, S2, U2) = $5, Offer(T6, S4, U3) = $6

Current Offers (Trust Effect ON):

Sorted by Time (most recent first): Offer(T12, S2, U2), Offer(T9, S1, U1), Offer(T4, S3, U2)

Sorted by Price (cheapest first): Offer(T12, S2, U2) = $5, Offer(T4, S3, U2) = $6, Offer(T9, S1, U1) = $7

FIG. 4

| Rank | Hub1 | Hub2 | Hub3 | Hub4 | Hub5 | Provider-Wide |
|---|---|---|---|---|---|---|
| 1 | Resource 234 | Resource 234 | Resource 343 | Resource 432 | Resource 12333 | Resource 234 |
| 2 | Resource 334 | Resource 3542 | Resource 432 | Resource 23343 | Resource 442243 | Resource 432 |
| 3 | Resource 23343 | Resource 432 | Resource 3233 | Resource 334 | Resource 2323 | Resource 334 |

3506

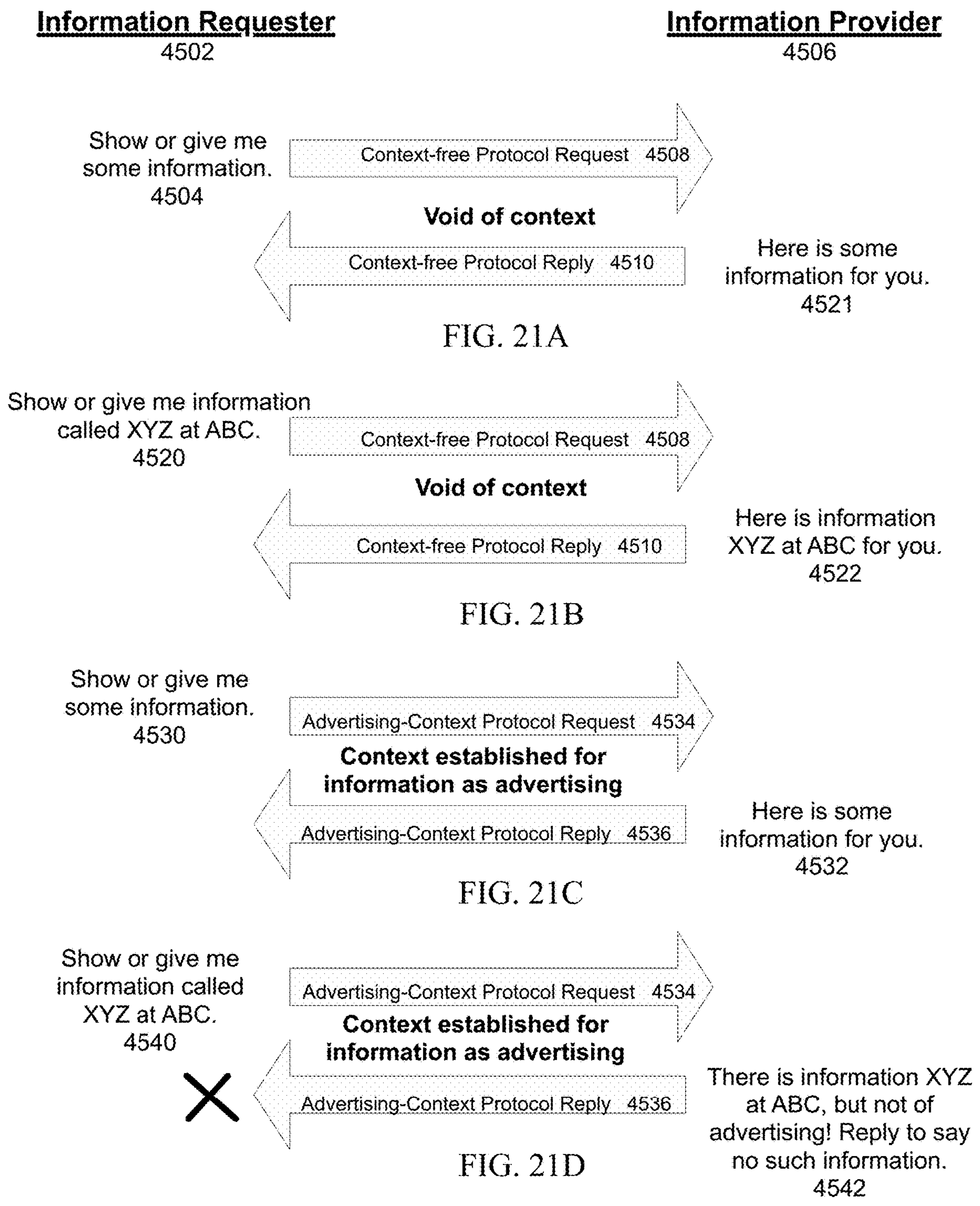

FIG. 21D

Information Requester
4502

Information Provider
4506

Show or give me
some information.
4504

Context-free Protocol Request 4508

Void of context

Context-free Protocol Reply 4510

Here is some
information for you.
4521

Show or give me information
called XYZ at ABC.
4520

Context-free Protocol Request 4508

Void of context

Context-free Protocol Reply 4510

Here is information
XYZ at ABC for you.
4522

Show or give me
some information.
4530

Advertising-Context Protocol Request 4534

**Context established for
information as advertising**

Advertising-Context Protocol Reply 4536

Here is some
information for you.
4532

Show or give me
information called
XYZ at ABC.
4540

Advertising-Context Protocol Request 4534

**Context established for
information as advertising**

Advertising-Context Protocol Reply 4536

There is information XYZ
at ABC, but not of
advertising! Reply to say
no such information.
4542

Information Requester
4602

Information Provider
4606 get(ad_location="www.abc_store .com/stereo_systems")
┈▶ <Advertising><digital resource>
4602

Digital resource (e.g., a web page) with web address "www.abc_store.com/ stereo_systems" sent as reply to requester.
4604

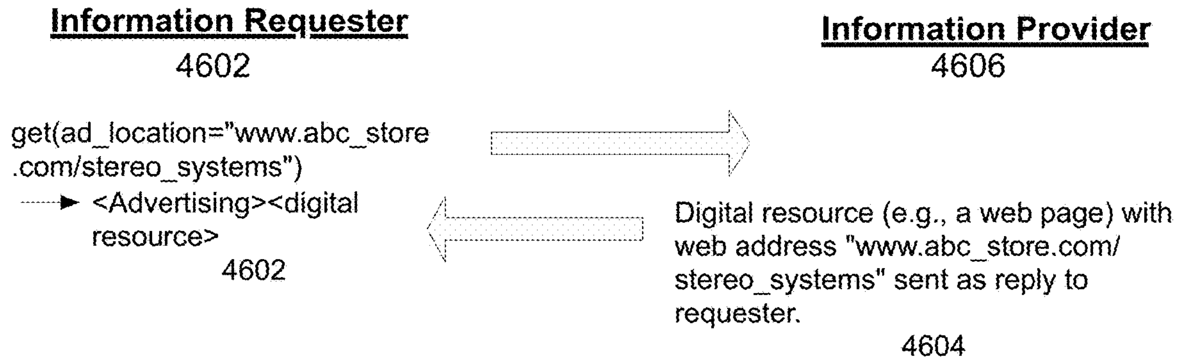

FIG. 22A get(ad_location="www.abc_store. com/stereo_systems", ask="what is the seller's address?")
┈▶ <Advertising><dialogue answer>
4606

Sent as reply the address(es) of the seller for the ad that the digital resource may represent. The returned address, if without qualification, is regarded as in default format.
4608

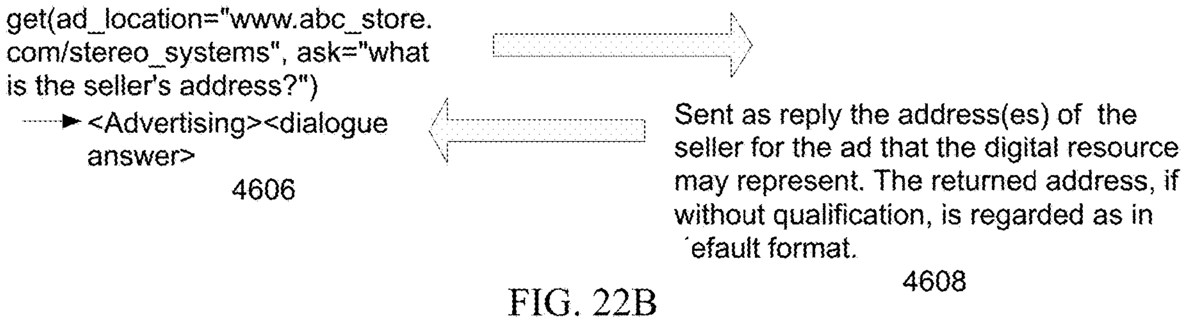

FIG. 22B get(ad_location="www.abc_store.c om/stereo_systems", ask="seller's address?", reply_format="RDF version 1.0 or above")
┈▶ <Advertising><dialogue answer>
4610

No reply is sent as there is no seller's address in RDF format.
4612

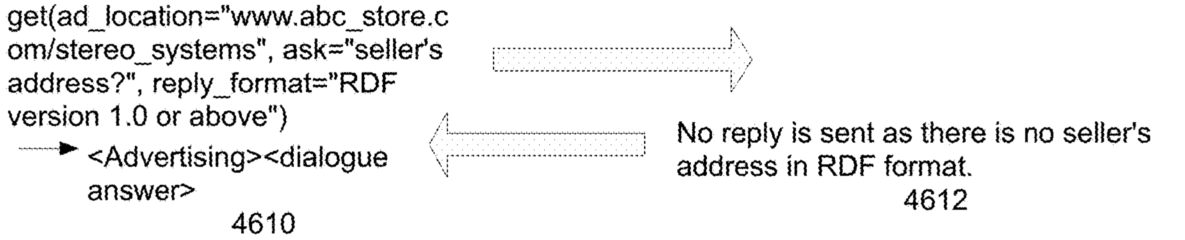

FIG. 22C get(ad_location="www.abc_store.co m/stereo_systems", check="ads protocol version is 2.3 or higher")
┈▶ <boolean>
4614

True or False sent as reply, depending on whether the protocol supported on information provider side is of version 2.3 or higher.
4616

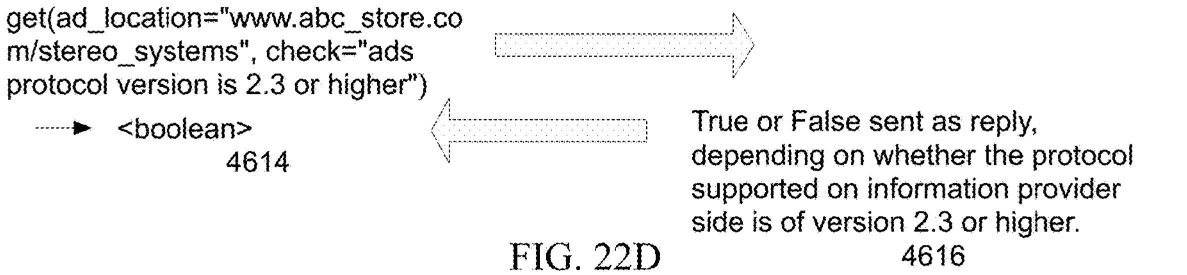

FIG. 22D

TRUST NETWORK EFFECT

CROSS-REFERENCES TO RELATED APPLICATIONS

This application is a continuation-in-part of U.S. application Ser. No. 15/795,102, filed Oct. 26, 2017, and entitled "Trust Network Effect," which is a continuation of U.S. application Ser. No. 14/604,458, filed Jan. 23, 2015, and entitled "Trust Network Effect." Content of each of all of the above applications is incorporated herein by reference in its entirety.

U.S. application Ser. No. 14/604,458 is also a continuation-in-part of U.S. application Ser. No. 13/663,366, filed Oct. 29, 2012, and entitled "Trust Network Effect" (issued as U.S. Pat. No. 9,626,405 on Apr. 18, 2017), which claims benefit under 35 U.S.C. § 119(e) of U.S. Provisional Patent Application No. 61/551,929, filed Oct. 27, 2011, and entitled "Trust Network Effect."

U.S. application Ser. No. 14/604,458 is also a continuation-in-part of U.S. application Ser. No. 14/498,866, filed Sep. 26, 2014 (issued as U.S. Pat. No. 9,967,256 on May 8, 2018), which claims benefit under 35 U.S.C. § 119(e) of U.S. Provisional Patent Application No. 62/053,233, filed Sep. 22, 2014, and entitled "Secure Area for Apps," and which is a continuation-in-part of U.S. application Ser. No. 13/269,553, filed Oct. 7, 2011 (issued as U.S. Pat. No. 8,881,268 on Nov. 4, 2014), and entitled "Secure Area for Apps," which claims benefit under 35 U.S.C. § 119(e) of U.S. Provisional Patent Application No. 61/391,033, filed Oct. 7, 2010, and entitled "Secure Designation for Apps." Content of each of all of the above applications is incorporated herein by reference in its entirety.

U.S. application Ser. No. 14/604,458 is also a continuation-in-part of U.S. application Ser. No. 13/175,021, filed Jul. 1, 2011, and entitled "Resource Hubs for Heterogeneous Groups" (issued as U.S. Pat. No. 8,943,046 on Jan. 27, 2015), which claims benefit under 35 U.S.C. § 119(e) of U.S. Provisional Patent Application No. 61/361,384, filed Jul. 3, 2010, and entitled "Resource Hubs for Heterogeneous Groups." Content of each of all of the above applications is incorporated herein by reference in its entirety.

U.S. application Ser. No. 14/604,458 is also a continuation-in-part of U.S. application Ser. No. 13/161,155, filed Jun. 15, 2011, and entitled "Context Level Protocols and Interfaces," which claims benefit under 35 U.S.C. § 119(e) of U.S. Provisional Patent Application No. 61/354,702, filed Jun. 15, 2010, and entitled "Context Level Protocols and Interfaces." Content of each of all of the above applications is incorporated herein by reference in its entirety.

TECHNICAL FIELD

The present invention relates to systems, methods, processes, and products of providing computing and online services.

BACKGROUND

There are systems that enable consumers to post entries or digital resources about a particular subject matter, such as retail offers, sellers and items. Some of these systems also allow users to sort or filter these entries or digital resources based on attributes of the subject matter to which the entries or digital resources pertain, such as price and distance for retail offer entries. Since user-generated entries or digital resources may contain wrong information, intentional or otherwise, system administrators or providers may review the posts or submissions before making them available to other members or users in the system. However, such manual intervention is not scalable to large volume of posts or submissions, and may impact adversely the timely availability of the posts or submissions. A system may allow users to rate entries so that the entries may be sorted or filtered based on such ratings, so to improve the relevancy of entries to the users. However, according to one study, many top user reviewers are given incentives to provide reviews, and many of these user reviewers might have provided positive reviews due to such incentives. And it is generally taken that only a small portion of consumers would provide ratings, especially when there is no need to voice any complaint, thereby under-reporting otherwise satisfactory goods or services, for instance. Meanwhile, a small group of proactive users can game the system by providing positive ratings to boost up the visibility of entries pertaining to items that they have vested interests in.

In addition, the World Wide Web (or simply called the Web) has made dissimilation and publication of digital resources (e.g., webpages, news, blogs, statements, photos, opinions, offers, music, videos, applications) so easy that a pyramid of digital resources of various kinds are available online. It has become difficult for many online users to decide what to read or consider, or to uncover digital resources of interest to him or her.

There are systems that allow an online user to positively or negatively rate a certain piece of news, article, opinion, or some other information item of a certain topic. Such a system displays, advertises, or otherwise publishes these information items that are deemed by the system as the most recommended or the more favorable based on such user recommendations. These selected information items are herein collectively referred to as prize digital resources. Digital resources such as news items may be made popular through resource sharing or social networking websites. Substantial online content that attracts advertising revenues or becomes widely known have originated or otherwise receive recommendation via these websites and systems.

However, the current art treats the membership population of these websites and systems as homogeneous, where members having diverse or heterogeneous interests may not easily be able to discover or share their content of interest more efficiently or widely, while contributing to the overall relevancy of such content to the population as a whole. For instance, the prize digital resources so determined in accordance to the current art purportedly represent the interest of the whole population or community, when in fact the online users are heterogeneous (by nature or otherwise, such as age, nationality, gender, religion, and so on). This simplistic approach does not facilitate information dissemination of interest to relevant parties. In addition, it might encourage an online user to game or manipulate the systems or their ranking/rating methods so that the articles, news, opinions, and information items of other kinds that they have a vested interest in promoting would become prize digital resources. Other online users who want to see their favorite digital resources unsuppressed by the prize ones would either do their own counter gaming or manipulation, or simply be regarded not as a group of people whose interests are not "important" enough to be heard or seen.

In addition, the World Wide Web (the Web) is an open distributed online repository of digital resources available through the Internet, mostly in form of web pages linked to one another through hypertext (or more broadly, hypermedia) links. Publication or retrieval of digital resources on the Web may be made by anyone via a server capable of accepting and handling HTTP (HyperText Transport Protocol) requests at a specific TCP/IP (Transport Control Protocol/Internet Protocol) port over the Internet. (The default or well-known TCP port for the Web is port 80, a network port number.) Because of the vast amount of digital resources available on the Web, tools are available for online users or consumers to locate relevant digital resources quickly, such as via a search engine. These tools may mostly be automated (e.g., crawling and indexing webpages) to collect information useful for this purpose. However, the accuracy of such effort has so far been met with limited success, because despite both digital resources (such as webpages) and requests for information (e.g., queries for digital resources relevant to a certain interest) may often belong to or otherwise be associated with a certain primary semantic context, there lack reliable and effective tools or schemes to establish contexts of digital resources and match them against requests consistent with their contexts.

For instance, one type of information pervasive on the Web is advertising. An ad may appear on the same webpage whose primary content may be regarded as belonging to another type or context, such as a journalistic article about health in relation to an ad about a mobile phone. In general, websites may exhibit third-party ads for revenue paid for, for example, by ad sponsors. An ad sponsor is one who is responsible for the cost of an ad placement. In comparison, an ad exhibitor is one that presents ads, such as an ad-carrying website. An ad content provider is one that prepares and produces ad content. On the other hand, a digital resource (or simply a resource) such as a webpage may comprise primarily content of advertising nature, such as those made available by a shopping website.

A user or consumer may often use search engines to research or otherwise discover information of some specific interest, such as looking up medical studies or research publications, shopping for a car, or planning for a trip. A search engine may be regarded as having three components: (a) a component that combs or crawls the Web for content, and indexes the content for suitable storage and optimal lookup; (b) a component that stores and maintains the indexed content; and (c) a component that accepts user queries, such as search words or phrases, and performs lookup against the indexed content, and returns search results to the users. (Often these search results comprise indications of digital resources, such as URLs (Uniform Resource Locators) of webpages and URIs (Uniform Resource Identifiers) of resources. Indications of digital resources may also be regarded as digital resources.) The last component may be available to a user in form of a webpage. In contrast, there may be websites that collect online resources of some specific interest, and allow users to provide queries against or submissions to these collections. For example, a shopping website may allow a seller to submit its individual products and their prices based on some data formats via a submission portal. Yet these seemingly more context-certain websites do not replace the use of search engines for context-specific information dissemination and discovery, because the former may only capture a small portion of the relevant resources that the Web would have, while the latter not only have the Web as their target for information capture, but also impose no website-specific formats or interfaces on content providers as pre-requisite for making resources available to such information capture. For instance, any digital resources accessible via HTTP (HyperText Transport Protocol) may be made available on the Web.

However, because the Web is context ignorant, any kind of information may be published, including but not limited to political news, personal blogs and entertainments. In addition, a single webpage may comprise content of possibly incompatible contexts, such as a news report about a political election with an ad about a product or service for travel. Such contextual uncertainty or ambiguity poses a substantial challenge to search engines that comb the Web for resources consistent with a certain interest or specific to a certain semantic context, such as ads of products and services. For example, a search for a particular product or service could result in web pages that simply contain the search words but are totally irrelevant to the user's intent. In addition, some content provider may deliberately put popular but contextually inconsistent terms or content in their digital resources (e.g., on their webpages) so to increase their relevancy to queries that may otherwise find them irrelevant.

Embodiments of the present invention would not only provide remedies to the above problems, but also make possible context-aware communications for dissemination and retrieval of digital resources.

Furthermore, a computing apparatus or device may be equipped with a means to authenticate a user for access. However, there may be applications or functions (herein referred to as apps) on the device that a user would access or use often but not wanting the need for device-level authentication every time he wishes to do so. On the other hand, some apps may provide their own authentication (optional or otherwise), so that a user may disable authentication for the device, and rely on such app-specific authentication. In this case, the user needs to be authenticated individually by these apps, and manage the credentials (e.g., user name and password) for all these apps. In addition, when a device communicatively coupled to a user lacks network connectivity, the user who is using the same online service as another user would not be able to access the service, even though a device of the other user has network connectivity to communicate with the service and the device of the user is communicatively linked to the device of the other user.

SUMMARY

According to one embodiment, a method is provided for accepting a plurality of posts (or entries or digital resources) for a subject matter from a plurality of users in a system. Each user is associated with a user account in the system, and each post is associated with a relationship score maintained in the system. One or more of the posts are presented to one or more of the users, such as in response to a user query or request relative to the subject matter, a notification in connection with some prior user registration, or unsolicited content in part of electronic communication. For each of these posts, it is determined if the one or more users have established a positive relationship with the post, where they had no prior positive relationships with the post before. If there are such new positive relationships, the relationship score of the post is incremented for each new positive relationship. An ordered list of posts including at least one of the one or more posts is generated based at least in part on the relationship score of the one or more posts. According to one embodiment, the relationship score is displayed along with each of the post in the ordered list. According to another embodiment, the relationship score is one of the criteria for sort order of the ordered list. The criteria include time, distance range, location, and price range. According to yet another embodiment, the timestamp of the positive relationship between a user and a post may be updated when the user performs an activity that renews or reinforces their existing positive relationship.

According to one embodiment, only operational relationships will constitute a positive relationship between a user and an entry or digital resource. Activities that may constitute an operational relationship between an entry or digital resource and a user include but not limited to: the user submitting the entry or digital resource, submitting another entry or digital resource adding to, referring to, or including the entry or digital resource, the user purchasing the entity associated with the entry or digital resource, the user requesting information in connection with the entry or digital resource, and the user forwarding the entry or digital resource, or a reference to it, to another user. Activities that may constitute a non-operational relationship between an entry or digital resource and a user include but not limited to: the user submitting a rating for the entry or digital resource, and the user bookmarking the entry or digital resource, or marking it as favorite. According to another embodiment, a positive relationship may include user ratings only if the ratings are not negative. According to yet another embodiment, a positive relationship may be removed when a certain period of time has expired since the latest positive relationship establishment between a user and an entry or digital resource, or when there is deemed a negative relationship between the user and the entry or digital resource, such as a negative review against the entry or digital resource by the user.

According to another embodiment, a method is provided for presenting one or more digital resources to a user in relation in a request, interest, or subject matter, the method comprising: associating one or more participants with a user; accepting a plurality of digital resources; receiving a request from the user, the request relative to a subject matter; identifying a subset of the digital resources based at least in part on the request; determining one or more relationships between the subset of the digital resources and the one or more participants; and presenting the subset of the digital resources to the user based at least in part on the one or more relationships.

According to other embodiments, the method's accepting the plurality of digital resources may include receiving the plurality of digital resources from the one or more participants, and storing in a database the plurality of digital resources. The one or more participants may include the user, information providers and other users. The one or more relationships may include relationships between activities relative to the subset of the digital resources, and the one or more participants performing the activities. The activities may include reviews, recommendations, or updates. The digital resources may include references to the digital resources, the references including URLs (Uniform Resource Locators) and URNs (Uniform Resource Names). The one or more digital resources may include entries in an ordered list of digital resources. The method's presenting the subset of the digital resources to the user based at least in part on the one or more relationships may comprises: ignoring entries in the ordered list of digital resources based at least in part on the one or more relationships; and presenting the ordered list of digital resources to the user, wherein each entry in the ordered list of digital resources is not ignored.

According to one embodiment, the method may further comprise determining the ordered list of digital resources based in least in part on a score, wherein the score includes a relevance score or a ranking. Each of the one or more digital resources may include location information, and the one or more digital resources may include a list of digital resources, ordered by the location information in relation to a location reference. The location information may include distances or GPS coordinates. The location reference may include the position selected by the user, or the position of a device coupled to the user.

According to another embodiment, each of the one or more digital resources may include time information, and the one or more digital resources may include a list of digital resources, ordered by the time information. The method's presenting the subset of the digital resources may comprise: ignoring entries in the ordered list of digital resources based at least in part on the one or more relationships; and presenting the latest entry in the ordered list of digital resources, wherein the latest entry is not ignored. According to one embodiment, the one or more digital resources may include offer entries, each comprising item information, seller information, and price information.

According to yet another embodiment, a non-transitory computer-readable storage medium bears computer-readable instructions that, when executed on a computer, cause the computer to: associate a participant with a user; associate a setting with the user, receive a request from the user; determine a first set of digital resources and a second set of digital resources based on the request; determine that the first set of digital resources is not associated with the participant; and present a third set of digital resources to the user based on the second set of digital resources. In addition, the first set of digital resources and the second set of digital resources may comprise entries, each entry being associated with an entity, and a first attribute associated with the entity, and a second attribute associated with the entity, the entity including an offer from a particular seller for a retail item, the first attribute including a submission time, and the second attribute including a price. The non-transitory computer-readable storage medium bears computer-readable instructions may also cause the computer to: select for each entity in the second set of digital resources an entry, the entry whose first attribute is associated with a value deemed more relevant than values being associated with first attributes of other entries, the other entries being associated with the entity; generate a list of digital resources based on the selected entries, the list of digital resources being sorted based on the second attribute; and present the list of digital resources to the user.

In addition, the present invention may solve some of the above problems and related issues by providing a digital resource gathering and dissemination system, method, or process that can accommodate digital resources of interest for heterogeneous groups and communities of online users for the same topic, demographic, or some other categories as provided by a particular classification scheme. Such a system, method, or process also provides a more reliable or otherwise representative selection of digital resources of interest to the population as a whole.

Disclosed are techniques for rating a digital resource among heterogeneous groups of users in hubs. In embodiments, a hub provider makes available the digital resource to a first hub and a second hub, the first hub comprising a first plurality of members and the second hub comprising a second plurality of members, the first plurality of members differing from the second plurality of members, each member having a member account. In embodiments, one member may be a group of both the first and second pluralities of members, though the sets of members in the first and second pluralities of members differ. The hub provider may then receive a first rating for the digital resource from a first member of the first hub, and receive a second rating for the digital resource from a second member of the second hub. The hub provider may then determine a first hub-level score for the first hub based on the first rating; determine a second hub-level score for the second hub based on the second rating; and determine an overall score for the digital resource based on the first hub-level score and the second hub-level score. The hub provider may store an indication of the first hub-level score, second hub-level score, and overall score in a memory.

Disclosed are methods and systems for distributing digital resources and identifying prize resources and their contributors among heterogeneous users. For instance, a method for selecting more than one set of digital resources among a plurality of digital resources is described, the method comprising: making available a plurality of digital resources in a plurality of hubs, each hub having a plurality of members, wherein each member may be associated with a home hub; presenting the plurality of digital resources to the plurality of members in the plurality of hubs; accepting a member rating from the plurality of members against the plurality of digital resources, wherein the member rating includes a favorable rating or an unfavorable rating; determining a hub-level score for each of the plurality of hubs against one or more digital resources of the plurality of digital resources based at least in part on the member rating; determining an overall score against each of the one or more digital resources based at least in part on the hub-level score; and selecting more than one set of digital resources, a set based at least in part on the overall score and another set based at least in part on the hub-level score in relation to one of the plurality of hubs, wherein the set and the other set include an ordered list of references to digital resources.

In relation to this method, the plurality of digital resources may include one or more digital resources being available in two or more hubs of the plurality of hubs. Each of the more than one set of digital resources may include one digital resource or one or more references to digital resources, and the plurality of members may include a plurality of email addresses. In addition, the making available a plurality of digital resources may include storing the plurality of digital resources, hubs, and user accounts in a database, and selecting the more than one set of digital resources may include storing the more than one set of digital resources in the database. The making available may also include receiving submissions from the plurality of members, the submissions including digital resources or references to the digital resources and member ratings, wherein the references may include URLs. The selecting may also include presenting the set of digital resources to the plurality of members and the other set of digital resources to members of the hub having the other set of digital resources associated with the hub-level score. Furthermore, the accepting a member rating may include considering the member rating only for the home hub. Each of the plurality of members may belong to only one of the plurality of hubs. The method may further comprise: determining eligibility of a user for membership of a hub, wherein the determining includes what the user is, where the user claims to reside or is located, what the user claims to believe, what the user can do, or what digital resources the user has given a favorable rating against; accepting the user as a member if the user is determined to be eligible; rejecting the user as a member if the user is determined to be not eligible; determining if a member should be removed from a hub; and removing the member from the hub, if the member is determined to be removed; and keeping the member in the hub, if the member is determined not to be removed.

Moreover for the method, the determining if a member should be removed may include detecting a certain number of prize digital resources in the hub receiving an unfavorable rating from the member over a period of time or among a number of prize digital resources, and detecting a plurality of digital resources each receiving a favorable rating from the member and not becoming a prize digital resource in the hub over a period of time or among a number of digital resources available in the hub.

The method may further comprise: determining a prize user based at least in part on the set of digital resources, wherein the prize user has submissions comprising one or more resources in the set; determining a prize member based at least in part on the other set of digital resources, wherein the prize member has submissions comprising one or more resources in the other set; and determining a prize hub based at least in part on the set of digital resources, wherein the prize hub has a hub-level score for one or more resources in the set.

The present invention also includes a system for generating a plurality of selections of resources from a plurality of resources, comprising: a hub storage medium for storing a plurality of hubs in a database; a user storage medium for storing a plurality of user accounts in a database; a resource storage medium for storing a plurality of resources in a database; a relationship storage medium for storing a plurality of relationships in a database; a communication interface component configured to send and receive data to and from a user via a user device over a network, the user having a user account in the user storage medium, the user having a membership relationship between the user account and one or more of the plurality of hubs in the relationship storage medium, and the data including one or more submissions, each having a recommended resource or a rating, the recommended resource comprising a reference to a resource, and the rating comprising a target resource, wherein the target resource includes a recommended resource; a user interface component configured to interact with the user or the user device, the interacting including receiving the one or more resource submissions, and presenting a selection of digital resources to the user or the user device; a submission handler component configured to receive one or more recommended resources and ratings; a resource analyzer component configured to determine if each of the one or more recommended resources exists in the resource storage medium, and add the recommended resource to the resource storage medium if the recommended resource does not already exist in the resource storage medium, the recommended resource including an overall score, a user account, and a timestamp; a resource distributor component is configured to determine if an availability relationship between the recommended resource and each of the one or more hubs exists in the relationship storage medium, and add an availability relationship between the recommended resource and the hub in the relationship storage medium if the availability relationship does not already exist in the relationship storage medium, the availability relationship including a hub-level score, a user account, and a timestamp; a score generator component is configured to determine if an availability relationship between each of the one or more target resources and each of the one or more hubs exists in the relationship storage medium, and update the hub-level score in the availability relationship based at least in part on the rating if the availability relationship exists in the relationship storage medium, and to update the overall score in the target resource in the resource storage medium based at least in part on the hub-level score; and a list maker component configured to generate a plurality of selections of digital resources, one selection based at least in part on the overall scores of the digital resources in the resource storage, and the other selections based at least in part on the hub-level scores of the digital resources for the one or more hubs, the generating including presenting the plurality of selections to the user via the user device, wherein the one selection includes the overall scores, and the other selections include the hub-level scores.

The system may also include a membership controller component configured to: check if an activity relationship between the user account in relation to the user and the one of the one or more hubs exists in the relationship storage medium within a period of time, wherein the activity relationship includes but not limited to submission of a resource to the one hub, or rating of a resource in the one hub, and wherein the period of time comprises three months, and is modifiable by an authority of the one hub; assert that the user be removed from the one hub if the activity relationship does not exist in the relationship storage medium within the period of time; and remove in the relationship storage medium the membership relationship between the user account in relation to the user and the one hub if the user should be removed from the one hub.

In addition, the World Wide Web (the Web) is an open distributed online repository of digital resources available through the Internet, mostly in form of web pages linked to one another through hypertext (or more broadly, hypermedia) links. Publication or retrieval of digital resources on the Web may be made by anyone via a server capable of accepting and handling HTTP (HyperText Transport Protocol) requests at a specific TCP/IP (Transport Control Protocol/Internet Protocol) port over the Internet. (The default or well-known TCP port for the Web is port 80, a network port number.) Because of the vast amount of digital resources available on the Web, tools are available for online users or consumers to locate relevant digital resources quickly, such as via a search engine. These tools may mostly be automated (e.g., crawling and indexing webpages) to collect information useful for this purpose. However, the accuracy of such effort has so far been met with limited success, because despite both digital resources (such as webpages) and requests for information (e.g., queries for digital resources relevant to a certain interest) may often belong to or otherwise be associated with a certain primary semantic context, there lacks reliable and effective tools or schemes to establish contexts of digital resources and match them against requests consistent with their contexts.

For instance, one type of information pervasive on the Web is advertising. An ad may appear on the same webpage whose primary content may be regarded as belonging to another type or context, such as a journalistic article about health in relation to an ad about a mobile phone. In general, websites may exhibit third-party ads for revenue paid for, for example, by ad sponsors. An ad sponsor is one who is responsible for the cost of an ad placement. In comparison, an ad exhibitor is one that presents ads, such as an ad-carrying website. An ad content provider is one that prepares and produces ad content. On the other hand, a digital resource (or simply a resource) such as a webpage may comprise primarily content of advertising nature, such as those made available by a shopping website.

A user or consumer may often use search engines to research or otherwise discover information of some specific interest, such as looking up medical studies or research publications, shopping for a car, or planning for a trip. A search engine may be regarded as having three components: (a) a component that combs or crawls the Web for content, and indexes the content for suitable storage and optimal lookup; (b) a component that stores and maintains the indexed content; and (c) a component that accepts user queries, such as search words or phrases, and performs lookup against the indexed content, and returns search results to the users. (Often these search results comprise indications of digital resources, such as URLs (Uniform Resource Locators) of webpages and URIs (Uniform Resource Identifiers) of resources. Indications of digital resources may also be regarded as digital resources.) The last component may be available to a user in form of a webpage. In contrast, there may be websites that collect online resources of some specific interest, and allow users to provide queries against or submissions to these collections. For example, a shopping website may allow a seller to submit its individual products and their prices based on some data formats via a submission portal. Yet these seemingly more context-certain websites do not replace the use of search engines for context-specific information dissemination and discovery, because the former may only capture a small portion of the relevant resources that the Web would have, while the latter not only have the Web as their target for information capture, but also impose no website-specific formats or interfaces on content providers as pre-requisite for making resources available to such information capture. For instance, any digital resources accessible via HTTP (HyperText Transport Protocol) may be made available on the Web.

However, because the Web is context ignorant, any kind of information may be published, including but not limited to political news, personal blogs and entertainments. In addition, a single webpage may comprise content of possibly incompatible contexts, such as a news report about a political election with an ad about a product or service for travel. Such contextual uncertainty or ambiguity poses a substantial challenge to search engines that comb the Web for resources consistent with a certain interest or specific to a certain semantic context, such as ads of products and services. For example, a search for a particular product or service could result in web pages that simply contain the search words but are totally irrelevant to the user's intent. In addition, some content provider may deliberately put popular but contextually inconsistent terms or content in their digital resources (e.g., on their webpages) so to increase their relevancy to queries that may otherwise find them irrelevant.

Embodiments of the present invention would not only provide remedies to the above problems, but also make possible context-aware communications for dissemination and retrieval of digital resources.

In addition, according to one embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful. According to another embodiment, an authorized user may send and receive messages via another device that belongs to another user based on identification of the user by the other user.

The following detailed description, together with the accompanying drawings will provide a better understanding of the nature and advantages of the present invention.

OBJECTS AND ADVANTAGES

An embodiment of the present invention promotes or otherwise selects subject-matter entries or digital resources based on their relationships with members in a social network without the need of the members to explicitly rate or review the entries or digital resources, while taking into account such ratings or reviews if available. Such relationships include operations that a member may have performed on, for, or with the entries or digital resources. For example, a member may use a seller entry to compose an offer entry, thereby establishing a relationship between the member and the seller entry for the purpose of contributing to the visibility of the seller entry to other members, without the seller entry receiving explicitly a positive rating from the member. Another embodiment promotes or otherwise selects subject-matter entries based on their relationships with select members or groups of members relative to a member. Yet another embodiment replaces a list of entries with another list based on attribute values of those entries so promoted or otherwise selected for inclusion on the other list, both the list and the other list being sorted per some subject-matter attribute(s), thereby generating a more reliable ordered list of entries (i.e., the other list).

In addition, embodiments of the present invention may also provide methods, systems, processes and products that would greatly reduce problems of irrelevant content retrieval or search results that have been plaguing the Web or other information systems. For instance, a consumer who may be looking for scholastic and research literature on some health issues would often receive for his queries to a search engine a listing of webpages containing mostly advertising that are of no relevance to his intent or interest. Alternatively, he may be looking for advertising of products, services, or offers but instead receiving among the results many personal blogs that happen to include his query text. Yet, in embodiments of the invention, an online content system (e.g., the Web) would enable a digital resource or information provider to furnish or otherwise declare its resources or content in a context-aware manner. For instance, online consumers would be able to ascertain with ease and confidence that a given digital resource is of advertising nature, as determined or otherwise indicated by a contextualizing interface or protocol via which the digital resource may be obtained or otherwise presented. Existing web-based tools and technologies could readily be re-used to create greater value for both web advertisers and consumers. For example, a context-ignorant but otherwise unbiased search engine may be instructed to look for the query or search words or phrases only in web pages of advertising nature as determined or otherwise indicated by a contextually advertising protocol or interface. Such a search engine could easily outperform a very sophisticated search engine in ridding search results of contextually irrelevant webpages. An ad sponsor would be able to make available context-aware online advertisement to their most valued target audience (i.e., online shoppers who are attracted to unbiased search results and maximum content coverage and accuracy). Embodiments of the invention comprising a system, method or process would provide effective contextualization of digital resources (e.g., advertising webpages) without undue effort imposed on content production (e.g., ad production).

According to one embodiment, the present invention provides flexible and progressive interpretation of context-level inquiries and responses, comprising dialogue questions and answers respectively. It may lower the barrier to and enable incremental approach for providing effective dissemination of digital resources or online information. For instance, an ad content provider could simply type up an ad that is free of any special syntax needed for declaring and denoting the written content as advertisement, and the ad in its entirety may then be published online and made accessible via an advertising-context protocol or interface. An online ad with an unambiguous advertising context may therefore be established. The ad content provider may also choose to provide answers to a context-level protocol's set of dialogue questions relevant to the product or service his ad represents. These answers augment the online ad and may be regarded as either its data or metadata. They become readily available when the protocol is looking for answers from the ad in response to some dialogue questions. As preciseness of a dialogue response becomes more and more important for a successful advertising campaign, and therefore justifying its cost and effort, more tools and support may in turn become available to ad content providers and ad exhibitors. Subsequently, the cost to providing preciseness of dialogue responses, and of specification of product and service offers in general, would then become more affordable and usable to advertisers, large and small. Yet all this potential development may co-exist with yet the simplest form of ads (e.g., in unstructured pure-text format), affording the same unambiguous advertising context to ads of such simplicity.

According to another embodiment, the present invention makes possible a globally distributed open system for advertising, where ads may be placed online with a proper context. Given its simplicity, efficiency and transparency, this system could become the de facto advertising platform of choice for making offers of goods and services known locally and beyond, as Internet access, devices and applications become more and more ubiquitous and user friendly. This may also help discipline the Web at large to rid itself of a systematic exuberant advertising frenzy that is degenerative to the content integrity of its resources. Such advertising frenzy in large part results from the lack of better alternatives to the current status quo, online advertising on a context-free Web that offers the potential of global reach with seemingly low cost of entry.

Embodiments of the present invention make possible many useful features through its ability to establish a reliable and recognizable context without undue effort from content providers (e.g., a scholastic and academic context for researchers or an advertising context for advertisers and consumers). Further objects and advantages of embodiments of the present invention will become apparent from consideration of the other parts of the specification herein.

In addition, embodiments of the present invention may also provide access control to a collection of apps, and access to them needs not be individually authenticated. These apps may also be made invisible or opaque for privacy purposes. Different levels of app availability may also be made available so that only a subset of apps is visible and accessible to a user. For example, one level may be configured to make visible and accessible apps intended for children, while hiding other apps.

BRIEF DESCRIPTION OF THE DRAWINGS

FIG. 4 provides an illustration for an example system, process, or product result in accordance with an embodiment of the present invention.

FIGS. 21A, 21B, 21C, and 21D show a number of context-level interactions between an information requester and provider in accordance with an embodiment.

FIGS. 22A, 22B, 22C, and 22D show a number of context-level requests and responses between an information requester and provider in accordance with an embodiment.

DETAILED DESCRIPTION OF ILLUSTRATIVE EMBODIMENTS

Figure 1:
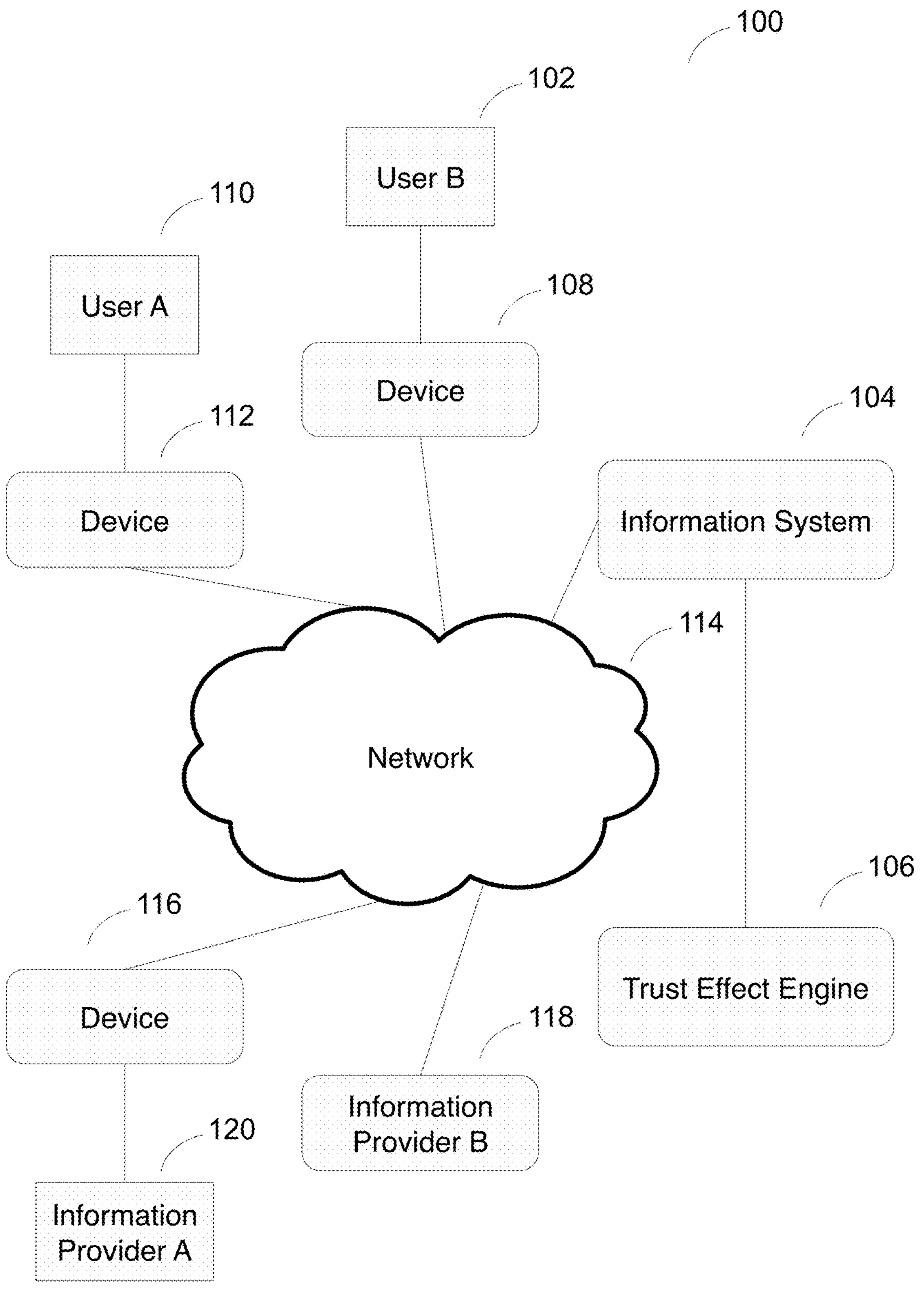
FIG. 1 illustrates an example environment for an embodiment of the present invention.

Disclosed are methods, systems, processes, and products for presenting information to or for a user in an environment based at least in part on the user's relationships with other participants in the environment. For instance, a method for presenting one or more digital resources (herein also referred to as entries) in relation to a request, interest or subject matter to or for a user in a system is described. Such a method may associate in a system one or more participants with a user, where the one or more participants may or may not include the user. The one or more participants may include information providers (e.g., authors, publishers, reporters, news agencies, websites, and so on), and other users. The method may accept in the system a plurality of entries, such as storing in a database the entries and identification of sources of the entries. Such an entry may include or be a reference to a digital resource (e.g., URLs—Uniform Resource Locators), and such a source of an entry may include or be URLs, URNs (Uniform Resource Names), and user IDs. The method may then receive in the system a request from the user, where the request may include a text, image, audio, and so on, and may be associated with a subject matter. The method may identify one or more of the entries based at least in part on the request (e.g., search results in response to a query), and determine one or more relationships between the one or more of the entries and the one or more participants. The method may establish or otherwise determine such a relationship based on identification of users (e.g., user IDs) being associated with the entries, identification of the entries (e.g., URLs) being associated with users, data or metadata relating users to entries (and vice versa). Such data or metadata may include the request, or part thereof; they may include a score, rank, flag, marker, indicator, or value; a vector of scores, ranks, flags, markers, indicators, or values; and a matrix of scores, ranks, flags, markers, indicators, or values. The method may then present the one or more of the entries to the user based at least in part on the one or more relationships. In another embodiment, a computer system equipped with the present invention may associate a set of participants with a user, receive a request from the user about a subject matter, determine a plurality of digital resources based on the request, determining that a relationship exists between a member of the plurality of digital resources and the set of participants, and then present a set of digital resources to the user based on the relationship, wherein the set of digital resources may comprise the member of the plurality of the digital resources.

The set of participants or the one or more participants may comprise the user, members, or information providers in or via other systems. The user may be associated with a multiple groups of participants, where each group as a whole may also be regarded as an individual participant. A Trust Network herein refers to a collection, group, or set of participants or a membership in or via one or more systems whose activities and/or behavior in the systems may affect entries that the one or more systems may present to a user, for example, in response to his query or request. The activities or behavior may include (but not limited to) a submission, review, rating, and usage of entries in the systems. The user may be associated with more than one Trust Network. More than one user may collectively be associated with one or more Trust Networks. Accepting one or more entries in a system equipped with the present invention may include acquiring one or more entries from users in the system, or from automated means such as Web crawling. Such accepting may also include indexing the one or more entries. Storing one or more entries may include indexing the entries in accordance to some criteria or parameters, the criteria or parameters including identification of one or more users in the system having an association or relationship, if any, with each of the entries. Such an association or relationship may include a submission, usage, review, or rating relationship. In one embodiment, such an association or relationship may assume different degrees or levels of relevancy or importance. For example, repeated usage of an entry by a user or the duration of an entry on a user's favorite or bookmark list may constitute a higher degree or level of relationship between the entry and the user. In another embodiment, such a relationship may also be characterized as positive, negative, non-positive, non-negative, or neutral. For example, a user providing a negative rating or a rating below a certain threshold against an entry may constitute a negative relationship between the entry and the user. In an embodiment, a neutral or positive relationship may cause the entry in question to be considered for presentation or comparison, whereas a negative relationship may cause the entry to be omitted or ignored even though the entry may have been deemed relevant to the user request in question. In yet another embodiment, a relationship between an entry and a user may change over time, for example, from existent (e.g., on the user's bookmark list) to non-existent (e.g., off the user's bookmark list), and then back to existent (e.g., the user's bookmarking the entry again), or from positive (e.g., the user's associating a positive rating with the entry) to negative (e.g., the user's associating a negative rating with the entry).

A source of the entries may include identification of users that provide or otherwise make available the entries in the system. The subject matter may include a retail offer, a collection of offers, a news item, a collection of news items, an event, a collection of events, an announcement, a collection of announcements, and so on. A request from the user may include a user-provided query, a system-generated query, or a combination thereof. In one embodiment, Such a request may also include an indication to activate a step of determining of one or more relationships between the entries and the participants, and a step of presenting the one or more of the entries to the user based at least in part on the one or more relationships, so to replace a step of presenting the one or more of the entries to the user based at least in part on the request. In another embodiment, such an indication may be received additionally before or after the request, or independently from the request. In yet another embodiment, a request from the user may include an indication to reverse or switch between these two processes. Such an effect or impact on the presentation to a user of the one or more entries based at least in part on the one or more relationships between the one or more of the entries and a set of participants, and/or between the user and a set of participants, is herein referred to as Trust Network Effect™, or simply Trust Effect™.

In an information system, such as a search engine or social network, a multitude of digital resources or discrete information units (e.g., webpages, news items, retail offers, performance show times, photos, songs, videos), herein also referred to as entries, are available to users whose one of the primary challenges is to discover, receive, or otherwise access relevant entries as quickly as possible. In response or relation to a user's query or interest for information, an information system equipped with the present invention may, for instance, be capable of selecting for presentation entries based at least in part on relationships between the entries and one or more participants in the system, and/or between the user and one or more participants in the system. In one embodiment, a relationship between a user and a digital resource may be established or otherwise construed based on a submission, usage, review, or rating by the user in relation to the digital resource. A relationship between a user and another user, or between a user and a participant in a system, may be established or otherwise indicated statically by the user, participant, or the system. In another embodiment, such a relationship may be established or otherwise determined dynamically by the system, for example, based on users' identity visibility, logon statuses, privacy settings, trustworthiness scores, and so on.

The one or more participants whose association with a user may be considered as part of the selection criteria of entries in relation to the user's request or interest may be regarded as member of a Trust Network for the user in question. Such capability or functionality may also be referred to as Trust Network Effect, or simply Trust Effect. More than one user may share the same Trust Network, while a user may be associated with more than one Trust Network. The user or system may choose a subset of multiple Trust Networks or individual members in a Trust Network for consideration of Trust Effect, whether individually (e.g., the logical OR relationship) or as a series or union of criteria (e.g., the logical AND relationship). The one or more participants may include users in the information system, as well as providers of information to the system. According to an embodiment, a Trust Network for a given user may not include the given user. The membership in a Trust Network may be explicitly stated or otherwise indicated by the user or his group to which the Trust Network is applicable. Or it may be established, dynamically or otherwise, via the user's direct or indirect associations or affiliations with other users or groups. One or more of these other users or groups may make up a Trust Network. Any manner or type of association in creating or constituting a Trust Network is within the scope of various embodiments. For instance, in one embodiment, a user may be deemed being associated with another user when the other user has configured his account to follow the activities or submissions of the user, or to mark the user as his favorite. In another embodiment, all users whose identities are known (e.g., via logon) to the system or the users may by system default belong to a Trust Network with respect to each other, whereas users whose identities are not known (e.g., a user of the system without logging on) are considered outside the Trust Network.

In some embodiments, entries are related by time or space to one another for or via a subject matter. For example, prices for an item at a seller may represent individual entries, where the item and/or price availability at the specific seller may be regarded as the subject matter. Each price entry may also be an update to an older price entry for the same item at the same seller. Sellers available in a given geographical area (whether for a particular item or not) may be related to one another in reference to a geographical point or center in the area. Their corresponding entries may then be compared or otherwise presented in accordance to their locations. In this case, the subject matter of these seller entries may be that of available sellers in the given geographical area. Likewise, entries for parties, shows, or performances available in a given city may also be related to one another by distance to a point of geographical reference, by start time, or by ticket price. Entries for events or news in a country (or organization), of a specific interest (e.g., science and technology), or for a celebrity, may be related by time. Some embodiments may remove, suppress, or otherwise omit entries for presentation or comparison that may have otherwise been included for such operation if without consideration of associations or relationships between users in a system and their associated or related Trust Networks. Some other embodiments may add or otherwise include entries for presentation or comparison that may have otherwise been omitted if without consideration of such associations or relationships.

FIG. 1 illustrates an exemplary environment 100 for presenting digital resources or entries to a user with consideration to his Trust Network(s). User A 110, user B 102, information provider A 120, and information provider B 118 are communicatively coupled to an information system 104 via a network 114, and are participants in the system. As depicted, information provider A 120 is connected to network 114 via device 116. Information providers such as information providers A 120 and B 118 may be sources of digital resources or entries available in or via the information system. Users such as users A 110 and B 102 may be consumers of these resources or entries. For example, they may search, request, or otherwise retrieve entries (including references to entries) from the information system 104. In some embodiments, users may also submit or otherwise contribute to the information or database (not shown) available through or maintained by the system. They may therefore be regarded as information providers. Users and information providers (esp. human ones) often use a device, e.g., a mobile phone, tablet computer, desktop computer, (such as device 108 or 112), for access or communication to an information system (such as the information system 104), while machine users (not shown) and information providers (e.g., information provider B 118) may communicate directly with the information system without such an intermediary. According to one embodiment, the information system 104 may interact with a plurality of users at their device via a website or an application running on the device. Entries or references to entries (e.g., URLs, which may also be considered as entries themselves) may be created or edited via the information system 104, or submitted or otherwise transmitted individually or as a batch to the system 104 via the network 114. According to some embodiments, a user associated with a device (e.g., users A 110 and B 102) may submit an entry to the information system 104. An example entry is an offer entry, which may comprise information for an item, seller and price. The information system 104 may also accept or retrieve information for an entry (e.g., an offer or offer entry) from information providers (e.g., information providers A 120 and B 118).

A trust effect engine 106 is coupled to the information system 104. The trust effect engine 106 may process entries in relation to Trust Networks for a user or a group of users who may share the same Trust Networks or their equivalents. It may manage the Trust Networks and determine direct or indirect relationships, if any, between the entries and the Trust Networks. It may revise, advise, or otherwise cause in relation to these relationships the selection of entries for presentation to the user or group of users in question. For example, the information system 104 may present to a user via his associated device an entry older than another entry for the same subject matter in response to his request for the latest entry for the subject matter, if a Trust Effect setting, or something similar or equivalent, is enabled for the user in general or for this particular request, and the information provider of the entry is a member of the user's Trust Network whereas the information provider of the other (albeit more recent) entry is not. The trust effect engine 106 may also cause the information system 104 to remove, suppress, omit, or otherwise downgrade for presentation some entries against a subject matter (e.g., updates to an event or opinions to a topic) that lack relationships with a user's Trust Networks. According to one embodiment, the trust effect engine 106 may comprise a module associated with the information system 104. According to another embodiment, an entry may be deemed relevant to a user's request only if a minimum number of distinct members in the user's Trust Network have a positive, relevant or applicable relationship, direct or indirect, with the entry. Such positive, relevant or applicable relationships include (but not limited to) a positive rating for the entry, or usage of the entry for a request or as part of another entry that these members may make or submit.

In one embodiment, user A 110 may indicate to the information system 104 that user B 102 is his friend or favorite. As a result, the information system 104 (or the trust effect engine 106 coupled to the information system 104) adds user B 102 to user A's Trust Network. User A 110 may also explicitly mark user B 102 as trusted, thereby adding user B 102 to his Trust Network, even when user B 102 is neither his friend nor favorite (the information system 104 may provide an option for User B 102 to opt out of being a member of user A's Trust Network). After user B submits an offer entry for item ABC (not shown) available at seller XYZ (not shown), another user (not shown) submits an offer entry for the same item and seller, thereby updating the price information for item ABC available at seller XYZ. With the Trust Effect setting (or herein simply Trust Effect) enabled by or for user A (on a per request basis, or an on on-going basis) thereby engaging the trust effect engine 106 or metadata (e.g., attributes in indexes of offer entries in the system) that the trust effect engine 106 may produce or otherwise contribute, the information system 104 may be configured to present to user A 110 the offer entry submitted by user B 102 as the current offer for item ABC at seller XYZ instead of the one submitted by the other user, if the other user is not a member of user A's Trust Network in effect or consideration. That is, without Trust Effect enabled, when user A searches or otherwise requests the current offer information for item ABC, the information system may present him via his associated device the offer information (e.g., the price) as submitted by the other user when seller XYZ or its latest offer is deemed relevant to user A's search or request (e.g., within a price or distance range, or in certain locations).

Figure 2:
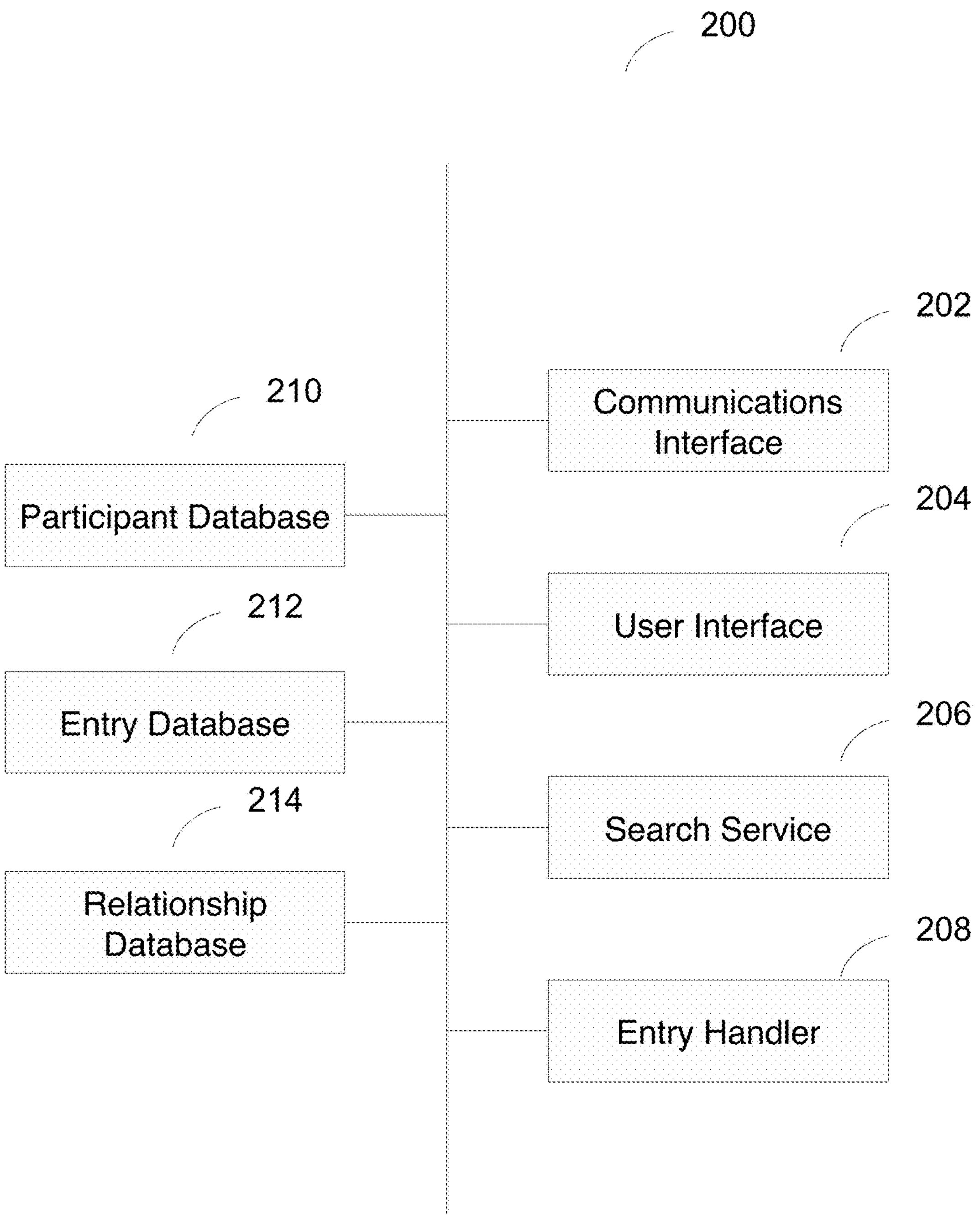
FIG. 2 illustrates an example block diagram for an information system in accordance with an embodiment of the present invention.

FIG. 2 shows a block diagram of an exemplary information system 200, such as the information system 104 shown in FIG. 1. A communications interface 202 is provided for communicating with devices, information providers, and users over a network, such as user A 110, information provider A 120, and the devices 112 and 108 shown in FIG. 1. Through the communications interface 202, entries may be retrieved from (e.g., Web crawling) or submitted by information providers, and requests for entries may be received from users. Other types of data or directives, e.g., a Trust Effect setting for individual requests or users, may also be transmitted via the communication interface 202. Any type of communications interface is within the scope of various embodiments.

A user interface 204 is provided for interacting with users and their coupled or associated devices, and it may include the logic or procedures for user identification or authentication, submission of requests and entries (or references to entries), management of user data, and presentation of entries. Any layout, format, mode (e.g., audio), policy, scheme, or rules pertaining to these activities including but not limited to submission, creation, acquisition, selection, and presentation of entries and related data or metadata such as entry dates, identification of information providers and users, trust network relationships and the like are within the scope of various embodiments.

A search service 206 (or engine or module) is provided for maintaining (such as indexing entries) and searching (such as accepting queries from users) data and metadata available in or via the information system 200, such as those pertaining to various entities such as information providers, users, entries, relationships, and so on. Data and metadata (e.g., indexes of the entities available in or via the system) may be stored and maintained in databases for entities of interest (e.g., participant database 210, entry database 212, and relationship database 214), or some other databases (not shown). For example, a participant database 210 may be divided into an information provider database (not shown) and a user database (not shown). The search service 206 may interact with the trust effect engine 106 for further processing of its selection of entries, for example, in response to a user's query or request.

An entry handler 208 is provided for processing and retrieving entries from information providers (including users), as well as for interacting with users when they create or edit entries via their coupled or associated device. It may cause the search service 206 to store entries and related data and metadata in their respective databases or some other databases. According to one embodiment, the storing may include indexing the entries, or interacting with the trust effect engine 106, for example, to cause the trust effect engine 106 to determine relationships between the entries and Trust Networks that the information system 200 may maintain and to update such relationships in databases.

A relationship database 214 is provided for storing relationships among entities available at or via the information system 200, including but not limited to relationships between entries and participants such as information providers and users, those between entries and users' requests, those among users (e.g., following and followed), those between users and user categories (e.g., qualification for participation in Trust Networks), and those between entries and Trust Networks. Example relationships include memberships of information providers in users' Trust Networks, and submissions, usages or recommendations of entries by information providers. Any type of inter-entity type relationship is within the scope of various embodiments for the relationship database 214. Intra-entity type relationships may also be stored in the relationship database 214, their respective entity-type databases (not shown), or some other databases (not shown).

An entry database 212 is provided for storing entries and/or references to entries including identification of their sources (e.g., information providers), as well as other related data or metadata (e.g., submission time, cached copies of entries, tags, keywords). Relationships among entries (or their equivalent data or metadata) may also be stored in the entry database 212. For instance, entries may be related to one another by subject matter, time or geographical space or distance. According to one embodiment, the search service 206 may retrieve a plurality of entries against some relationship criteria with respect to the entries in the entry database 212. For example, for a database of offer entries or offers, the search service 206 may obtain the latest price information for an item for a particular quantity at a specific seller, the historical price information for the same item for the same quantity at the same seller, or all current offers for the same item from sellers within some geographical designation, distance, or perimeters.

A participant database 210 is provided for storing information about participants (including information providers and users) in the information system 200. There may be different types of categories of participants and the information pertaining to each type may differ. For instance, a user record in the participant database 210 may comprise an identifier, display name, logon credential, and so on. An information provider record may comprise an identifier, display name, location, logon credential, entry retrieval policies, and so on.

Although the information system 200 is described as being comprised of various components (the communications interface 202, user interface 204, search service 206, entry handler 208, relationship database 214, entry database 212, and participant database 210), fewer or more components may comprise the information system 200, or the information system 104 shown in FIG. 1, and still fall within the scope of various embodiments. For instance, the search service 206 may include modules, components or functions for or equivalent to the entry handler 208. The search service 206 or entry handler 208 may include modules, components or functions for or equivalent to the trust effect engine 106 coupled to the information system 104 shown in FIG. 1.

Figure 3:
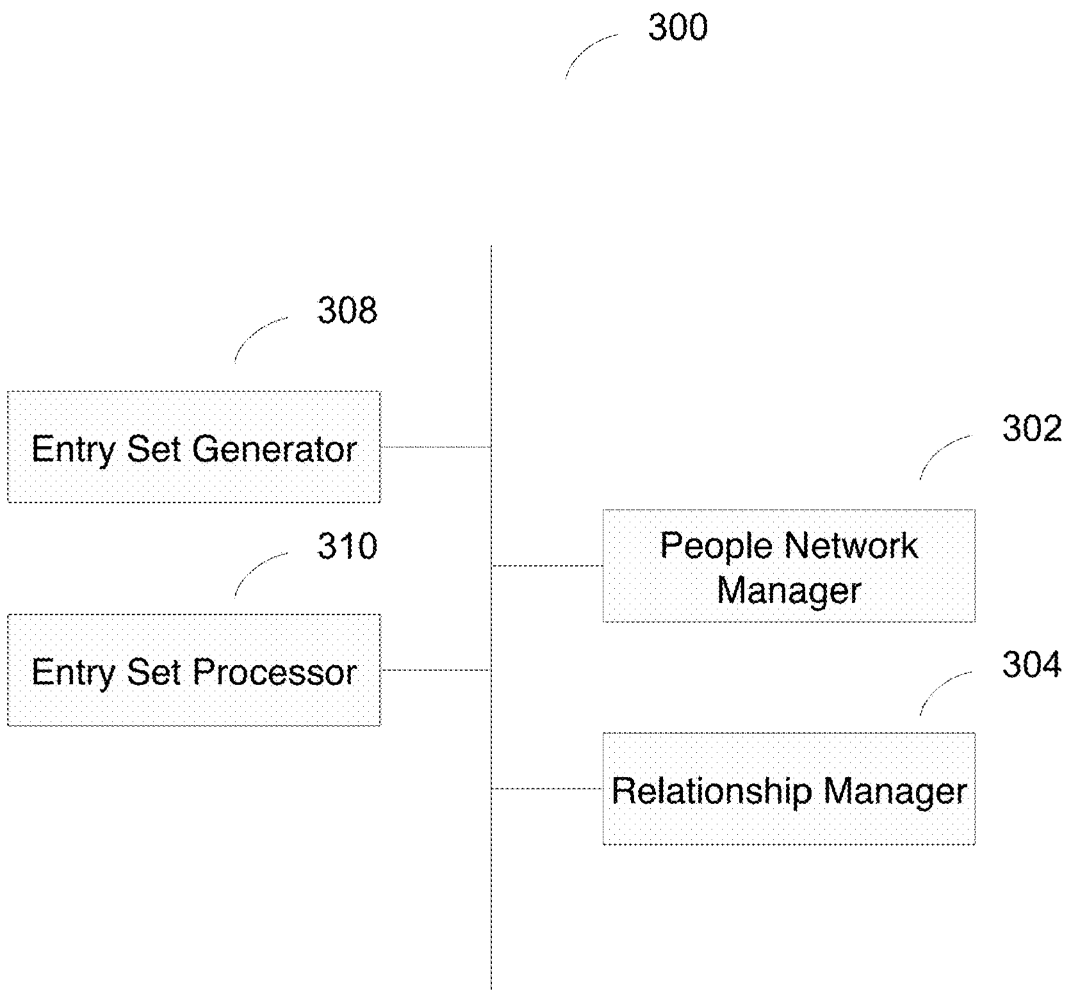
FIG. 3 illustrates an example block diagram for a trust effect engine in accordance with an embodiment of the present invention.

FIG. 3 shows a block diagram of an exemplary embodiment of a trust effect engine 300, such as the trust effect engine 106 shown in FIG. 1. The trust effect engine 300 comprises a people network manager 302, relationship manager 304, entry set processor 310, and entry set generator 308.

The people network manager 302 is provided for establishing, maintaining, and accessing membership information in a Trust Network for a user or group of users stored in the participant database 210. Such membership information may be created explicitly by the user (e.g., via the user interface), or by his association with other users, such as their being his friends or favorites. (Such membership information, associations, or relationships may be stored in the relationship database 214.) The people network manager 302 may receive requests and/or notifications from components in the information system 104, or otherwise monitor their activities so to create, update and destroy Trust Networks accordingly.

The relationship manager 304 is provided for establishing and maintaining relationships stored in the relationship database 214 or its equivalent, such as those between entries stored in the entry database 212 and Trust Networks maintained in or otherwise derivable from the relationship database 214. Such relationships may include (but not limited to) submission, usage, reference, review, or rating relationships between entries and members in Trust Networks. For example, a member in a Trust Network may use an existing item entry to construct a new offer entry before submitting the latter to the information system 104. This may be regarded as a relevant, applicable or positive relationship (e.g., of usage) between the item entry and the Trust Network in question. Such relationships may be stored in the relationship database 214, or entry database 212 (e.g., in fields that are part of an index of entries in the entry database 212). Alternatively, the relationship manager 304 may provide the relevant relationship information directly to the entry set processor 310 upon request or on demand.

The entry set processor 310 is provided for determining what entries in a set of entries, and/or other entries related to the set, as provided by the search service 206 (e.g., in response to a user's query or chosen interest) should be selected, included, or otherwise promoted in relation to relationships, if any, for example, between the entries in the set and a Trust Network in question, or otherwise establishing data or metadata for the same (e.g., in the entry database 212, relationship database 214, and/or some other databases (not shown)). Such relationships may include submission, usage, reference, review, or rating relationships between entries and members in the Trust Network, or any relationship types such as those described earlier, as may be determined by the relationship manager 304. According to some embodiments, the size of the set of entries may be bounded so that entries that may otherwise be deemed relevant by the search service 206 for the user or his request, but excluded from the set of entries due to this size limit, would not be considered by the entry set processor 310 in its determination of relevancy of entries in relation to the user's Trust Network for the user or his request.

The entry set generator 308 is provided for generating an entry set based at least in part on the entries so selected, included or otherwise promoted by the entry set processor 310. The entry set generator 308 may, for instance, apply to these entries some presentation rules or criteria associated with or otherwise intended for the original, initial, or input entry set as received or otherwise worked on by the entry set processor 310. For example, the entry set processor 310 may receive a set of current offer entries at various sellers from the search service 206 whose intent or criterion is to order the offer entries by time or distance for selection or presentation. The entry set processor 310 may replace some of the current offer entries with older ones for the same sellers given the latter are provided by members in a Trust Network in question, and remove a few offer entries because none of the offer entries for their corresponding sellers is provided by any member in the Trust Network. The entry set generator 308 may therefore apply or re-apply the time or distance ordering to the resultant set of entries as provided by the entry set processor 310. In this case, for instance, the search service 206 may then select the top ten entries from the resultant set and present them as initial results to the user via his coupled device. In some embodiments, the entry set generator 308 may be configured to select and present entries to users via the user interface 204.

Although the trust effect engine 300 is described as being comprised of various components (the people network manager 302, relationship manager 304, entry set processor 310, and entry set generator 308), fewer or more components may comprise the trust effect engine 300 or the trust effect engine 106 shown in FIG. 1, and still fall within the scope of various embodiments. For instance, the people network manager 302 and the relationship manager 304 may be combined into a single functional component, while the entry set processor 310 and the entry set generator 308 may be combined into another one. The entry set processor 310 may be configured to provide the function or module for or equivalent to the relationship manager 304. According to some embodiments, the entry set generator 308 may be optional. In addition, any of these components of the trust effect engine 300 may be incorporated into the information system 200, and the components of the information system 200 may assume the role or function of any of these components of the trust effect engine 300. That is, the trust effect engine 300 or its functions or components may be embedded into the information system 200, or its entire functionality be realized as part of the search service 206 or distributed into the various components in the information system 200. For example, the search service 206 may provide the function or module for or equivalent to the entry set processor 310 and/or entry set generator 308, while the user interface 204 may provide the function or module for or equivalent to the people network manager 302 and/or relationship manager 304.

FIG. 4 provides an illustration 400 of an operational effect by an embodiment (a method, system, process, or product) in an exemplary environment (such as the environment 100 shown in FIG. 1). In relation to this illustration, there are three users (namely, U1, U2, and U3) and four sellers (namely S1, S2, S3, and S4). The embodiment, which may be an offer repository system (not shown) equipped with the present invention, may comprise both an information system (such as the information system 200 shown in FIG. 2) and a trust effect engine (such as the trust effect engine 300 shown in FIG. 3). It may identify and interact with these users or their coupled devices via the user interface 204. Such identification, among many options or mechanisms in the art, may be based on prior user authentication using logon credentials stored in the participant database 210.

Via the user interface 204, U1 identifies U2 as his friend in the system, thereby causing the people network manager 302 to add U2 to U1's Trust Network, and store this association or membership in the relationship database 214. For this particular embodiment, a user is by default also a member of his own Trust Network (e.g., U1 is a member of U1's Trust Network).

The entry handler 208 receives via the user interface 204 or communications interface 202 a plurality of offer submissions for a particular item. Over time, these users have together submitted or sent twelve offer submissions for the item available at the various sellers, as illustrated in FIG. 4. For each offer submission, the entry handler 208 creates an offer entry in the entry database 212, along with identification of its submitter or provider. Each offer entry comprises a time (i.e., one of the 12 submission times, namely T1 to T12), seller information or its identification (i.e., for one of 4 sellers, namely S1 to S4), and price information (e.g., currency and amount). The submitter or provider information (i.e., for U1 to U3) may be stored as part of the offer entry, or as separate data associated with the offer entry in question.

Then U1 or his coupled device sends the system via the communications interface 202 a query for the current offer information in relation to the item. The user interface 204 receives the request and directs it to the search service 206. By default or configuration in the system, Trust Effect for U1 is disabled. As such, the search service 206 retrieves from the entry database 212 the offer entries representing the current offers at the four sellers, namely: offer of $4 at time T11 for seller S1 as submitted by user U3 (i.e., Offer(T11, S1, U3)=$4), offer of $5 at T12 for S2 by U2 (i.e., Offer(T12, S2, U2)=$5), offer of $3 at T10 for S3 by U3 (i.e., Offer(T10, S3, U3)=$3), and offer of $6 at T6 for S4 by U3 (i.e., Offer(T6, S4, U3)=$6), and returns them to the user or his device via the user interface 204 or directly via the communications interface 202. Either by the system's preference or upon U1's request, the search results may also be ordered by time (e.g., the most recent first) or price (e.g., the lowest price first). In this case, the result list may be as follows: if sorted by time (most recent first): Offer(T12, S2, U2), Offer(T11, S1, U3), Offer(T10, S3, U3), Offer(T6, S4, U3); if sorted by price (cheapest first): Offer(T10, S3, U3)=$3, Offer(T11, S1, U3)=$4, Offer(T12, S2, U2)=$5, Offer(T6, S4, U3)=$6. This scenario is depicted in FIG. 4.

With Trust Effect turned on for U1 (e.g., as part of his query request, a user profile setting stored in the participant database 210, or as determined by any component in the information system 200 and/or trust effect engine 300), a query from the user for current offers in the system would cause the search service 206 to invoke the entry set processor 310 to select entries from either the entry database 212 and/or directly from the search service 206 in accordance to their relationships with U1's Trust Network(s), wherein the entries may differ from those that would otherwise fulfill the selection criteria of the user query or request. For instance, the entry set processor 310, based on input (e.g., that U1 and U2 are in the Trust Network in effect) from the relationship manager 304 (either directly, or indirectly such as having pre-computed metadata stored in the entry database 212 or relationship database 214), may identify Offer(T6, S4, U3), Offer(T8, S2, U3), Offer(T10, S3, U3), and Offer(T11, S1, U3) as irrelevant to the request of U1. The search service 206 or entry set processor 212 may then return the following as results to the user or his device: Offer(T9, S1, U1)=$7, Offer(T12, S2, U2)=$5, and Offer(T4, S3, U2)=$6. If the results are to be sorted by time (e.g., most recent first) or price (e.g., lowest price first), then the entry set generator 308 (whose function may also be embedded in or otherwise realized by the search service 206 or the entry set processor 310) may generate the following result list: if sorted by time (most recent first): Offer(T12, S2, U2), Offer(T9, S1, U1), and Offer(T4, S3, U2); if sorted by price (cheapest first): Offer(T12, S2, U2)=$5, Offer(T4, S3, U2)=$6, and Offer (T9, S1, U1)=$7. This scenario is depicted in FIG. 4.

Figure 5:
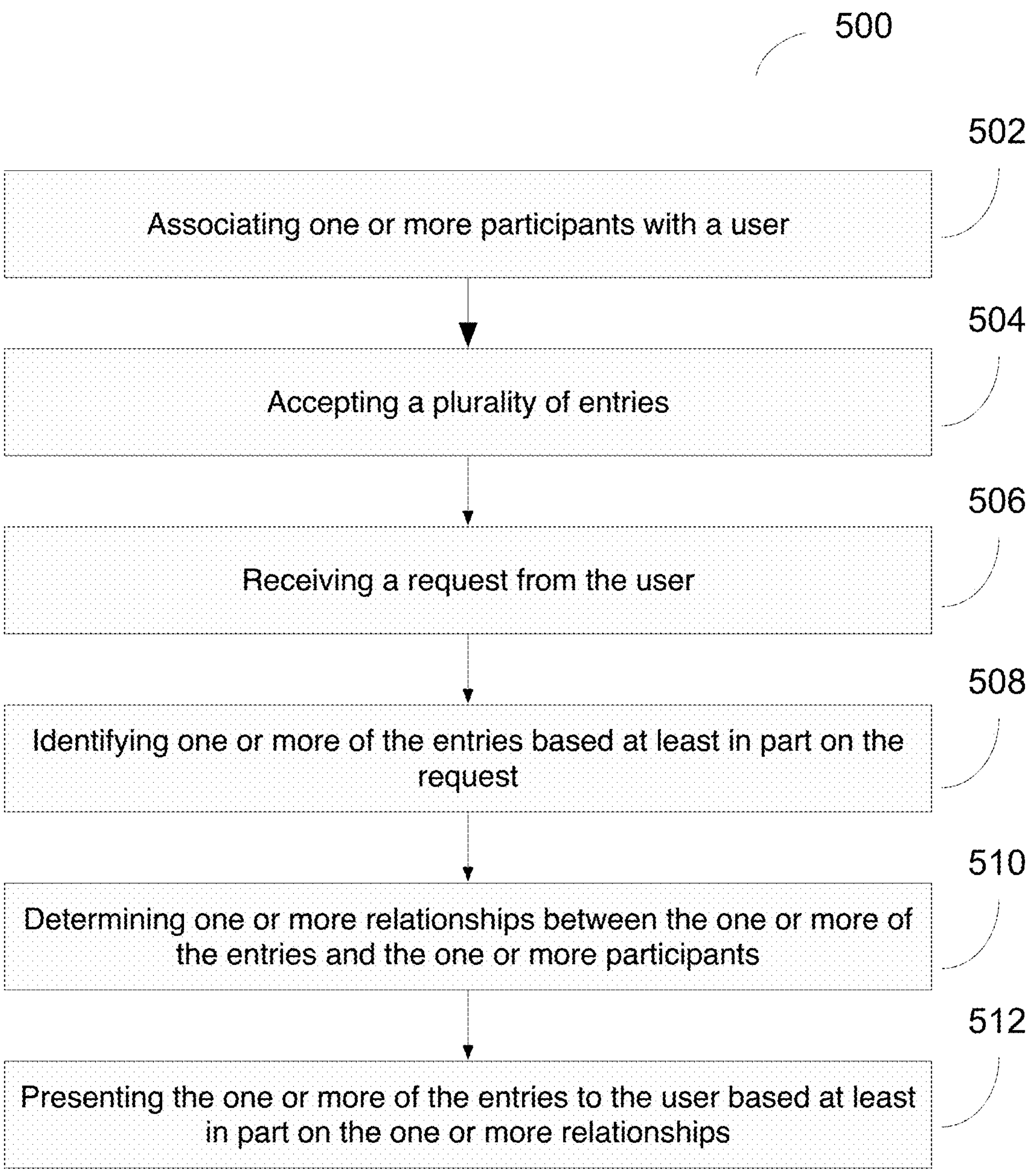
FIG. 5 illustrates a flow diagram of an example process for an embodiment of the present invention.

FIG. 5 shows a flow diagram of an exemplary process 500 for presenting entries to a user based at least in part on relationships between the entries and the user's Trust Network(s). A device or system embodying the present invention or otherwise equipped with the present invention, such as the one shown in FIG. 1, FIG. 2, or FIG. 3, may carry out, implement, or otherwise effect this exemplary process. Per the example process 500, one or more participants (including users and information providers) may be associated with a user in a system (502), where such association may constitute a Trust Network having the user and the one or more participants as members of the Trust Network. For example, the people network manager 302 shown in FIG. 3 may use a list of friends or favorite users or information providers established by the user as the association for creating such a Trust Network for the user in question. Per the example process 500, the system may accept or otherwise retrieve a plurality of entries from one or more participants (504). For example, the entry handler 208 may examine (e.g., by Web crawling) the Web for entries of interest, and store these entries and/or references (e.g., URLs) to these entries, as well as receive submissions from users and other information providers. The identification of sources or submitters of the resulting entries are also recorded, for example, in the entry database 212. Per the example process 500, the system is also capable of receiving a request for information from the user (506), the information comprising one or more entries available in or via the system, and being subject to the Trust Effect setting in relation to the user's Trust Network(s). For example, the user or his device may send a text query via the communications interface 202 to the user interface 204 of the system. The user interface 204 may in turn pass the query to the search service 206. Per the example process 500, the system identifies one or more of the entries available in or via the system in relation to the request (508). For example, the search service 206 may retrieve in the entry database 212 the entries that it considers as relevant to the query based at least in part on the text in the query. Per the example process 500, the system may also determine any relevant relationships between the one or more of the entries and the one or more participants (e.g., in the Trust Network(s) associated with the user) (510), and present the one or more of the entries (or a subset of them) to the user based at least in part on these relevant, applicable or positive relationships (512). For example, the search service 206 may identify in response to a user's request for the top 10 items the 100 most popular items from the entry database 212 among a system or community of users. The relationship manager 304 may determine the relationships between these 100 entries and the Trust Network(s) of the user sending the request. Based on these relationships (e.g., a submission or purchase relationship), the entry set processor 310 may decide 77 out of these 100 item entries are irrelevant to the user's request (e.g., all the other 23 items have either been submitted or purchased by members in the user's Trust Network(s)). The entry set generator 308 may create a new result list of top 10 item entries based on these other 23 item entries in the entry database 212. The search service may then return this result list to the user via the user interface 204. As another example, the search service 206 may identify in response to a user's request for a sorted-by-price list of current offers for a particular item. Without yet having these offer entries sorted by price, the search service 206 may cause the entry set processor 310 to omit or replace any of these current offer entries with one in the entry database 212 containing an older price for the same item and seller, if there is no applicable or relevant relationship between the current offer entry in question and the user's Trust Network, while there is one between the older price offer entry and the Trust Network, the relationship being determined by the relationship manager 304, either prior to or after the user interface 204 receiving the user's request. The entry set generator 308 may sort by price the applicable or relevant offer entries as determined by the entry set processor 310 and provide the corresponding list of offer entries to the user via the search service 206 or user interface 204. A scenario similar to the one in this example is depicted in FIG. 4. In addition, a maximum limit on the size of the initial entry set as determined by the search service 206 in response to a user's request may be set, so that only those entries in the initial entry set are considered by the entry set processor 310 in relation to their relationships with the user's Trust Network. For example, a user may request for a list of seller locations within 100 meters of his current position, with the closest sellers appearing first on the list. If such a maximum limit is set to 50, then only the entries of the 50 closest sellers would be passed to the entry set processor for further processing, even if there are more than 50 sellers within the 100 meter perimeters. A user and/or system may set or otherwise impose such a limit. Furthermore, according to one embodiment, the search service 206 may combine into one the functions or steps of identifying entries in the entry database 212 in response to a user's request, determining relationships between the entries and the user's Trust Network, and presenting to the user one or more of the entries based at least in part on the relationships. For example, the search service 206 may identify the relevant entries based on both the user's request and relationships between the entries in the entry database 212 and the user's Trust Network in a single batch or sequence of operations, or via a single query to the entry database 212 or another database. Data, metadata, or fields for determination of relevancy to a user's request and of relationships between entries and the user's Trust Network(s) may be stored or otherwise made available in the entry database 212 or some other database(s).

It should be appreciated that the specific steps illustrated in FIG. 5 provide a particular method of presenting entries to a user based at least in part on relationships between the entries and the user's Trust Network(s) according to an embodiment of the present invention. Other sequences of steps may also be performed according to alternative embodiments. For instance, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives. For example, the step of accepting a plurality of entries (504) may be omitted or otherwise replaced by a step of crawling an information repository (e.g., the Web) or combined into the step of identifying one or more of the entries based on the request (508). The step of determining one or more relationships between the one or more of the entries and the one or more participants (510) may combine with the step of determining one or more of the entries based on the request (508) so that, for example, only entries that are determined to be associated with the one or more participants would be considered for relevancy to the request. These combined steps may further be enhanced or otherwise modified to take into consideration of the request from the user in relation to the one or more participants, for example, whether these participants have submitted similar requests, and if so, what entries were deemed more preferred to these participants (e.g., that they have bookmarked the entries) in relation to these similar requests. The step of determining one or more relationships between the one or more of the entries and the one or more participants (510) may also comprise determining the degree or level of the relationships and/or whether they are deemed positive, negative, or neutral. The step of presenting one or more of the entries to the user based on the one or more relationships (512) may further comprising considering if a certain set of criteria is met for choosing the one or more of the entries, such as a minimum number of users in a Trust Network having a non-negative relationship with the entries, or for ignoring an entry when someone in a Trust Network has a negative relationship with the entry within the last 60 days. Either the user or system may specify the criteria. And there may be more than one set of criteria, for example, with a Trust Effect score associated with each set.

Figure 6:
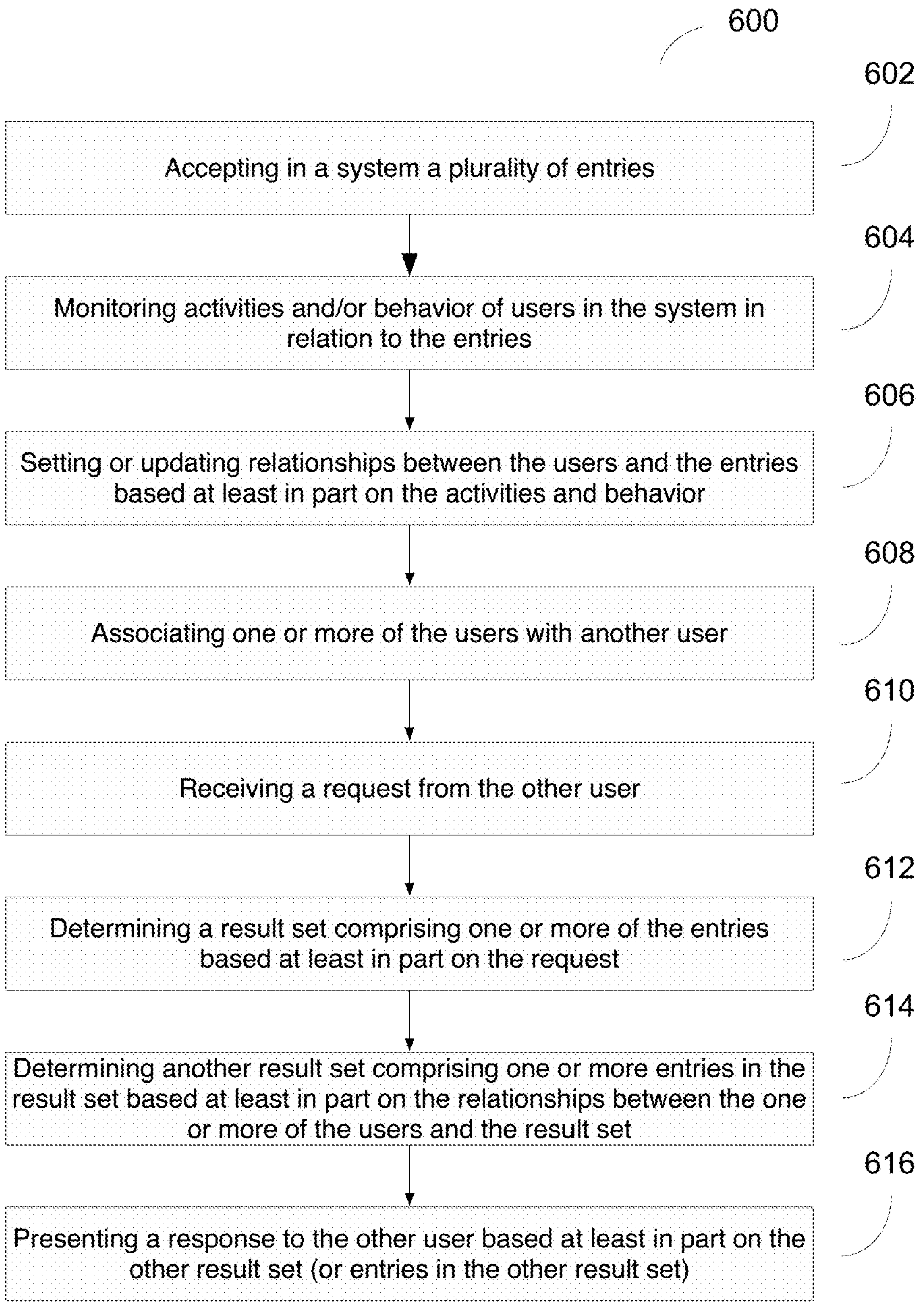
FIG. 6 illustrates a flow diagram of another example process for an embodiment of the present invention.

FIG. 6 shows a flow diagram of an exemplary process 600 that may be implemented, carried out, realized, or otherwise effected by an embodiment of the present invention, such as a search engine, apparatus, component, or system. For instance, per the example process 600, the user interface 204 in a search system comprising the information system 200 and trust effective engine 300 may accept a plurality of entries, the accepting including acquiring URLs from the system's users or administrators, or from within some existing entries in the system, and retrieving webpages as entries based at least in part on the URLs, wherein the retrieving includes crawling and fetching the webpages from the World Wide Web and other digital resources, and indexing them (602). Per the example process 500, the entry handler 208 or search service 206 may monitor activities and/or behavior of the users in relation to entries available in or via the system (604), wherein the activities and/or behavior include the users' selecting or not selecting via the user interface 204 the entries when presented by the search service 206 via the user interface 204, the users' reviewing or rating positively or negatively the entries, the users' incorporating or referencing the entries when creating, submitting, or modifying other entries, the users' bookmarking the entries, and so on. Per the example process 600, the relationship manager 304 may set or update relationships, if any, between the users and the entries based at least in part on the activities and/or behavior, and stores the relationships in the relationship database 214 and/or entry database 212, wherein the relationships include identification of the users (e.g., user IDs), identification of the entries (e.g., URLs), data or metadata relating the users or their activities (e.g., individual queries) to the entries, the data or metadata including a query text, image, an audio input, and so on, and/or a score, rank, flag, marker, indicator, value, a vector of scores, ranks, flags, markers, indicators, or values, or a matrix of scores, ranks, flags, markers, indicators, or values. Per the example process 600, the people network manager 304 may associate one or more of the users with another user (608), for example, when the other user creates a social network or user group to which the one or more of the users are a member, or when the other user marks the one or more of the users as favorite or trusted. Per the example process 600, the user interface 204 may receive a request such as a search request or query from the other user (610), and cause the search service 206 to determine a result set comprising one or more of the entries based at least in part on the request (612), the determining including querying an index of entries stored in the entry database 212 against the request, wherein the result set includes a search result comprising one or more URLs to the entries. Per the example process 600, the entry set processor 310 may determine another result set comprising one or more entries in the result set based at least in part on the relationships, if any, between the one or more of the users and the result set (or entries in the result set) (614), the determining including ranking the relationships (e.g., according to some scores, ratings, or values maintained in or otherwise associated with the relationships) and selecting entries in the result set whose relationships with the one or more of the users have higher scores than other entries in the result set, wherein the other result set includes a set of ranked or ordered URLs and/or images referring to one or more of the entries in the other result set. (According to another embodiment, the search service 206 may determine both the result set and the other result set in a single operation, a sequence of operations, or a multiple sequences of operations.) Per the example process 600, the user interface 204 may present to the other user via the communications interface 202 a response based at least in part on the other result set (or entries in the other result set) (616), wherein the response may include an audio or visual search result list or page of URLs or images (ordered, ranked, or otherwise) referring to a subset of the entries in the other result set. According to some embodiments, participants may opt out or disable (temporarily or otherwise) the associations or relationships between entries and themselves or between a Trust Network and themselves for future activities such as their entry submissions or usage (including but not limited to use of anonymity), or suspend or remove associations or relationships between existing entries and themselves.

It should be appreciated that the specific steps illustrated in FIG. 6 provide a particular method of presenting a response to a user based on his relationship with other users. For instance, the step of accepting a plurality of entries (602) may further receive subject matter information and specification in relation to the plurality of entries, e.g., the search term associated with the URLs (i.e., the plurality of entries) being bookmarked by a user in connection to a research session. The step of accepting a plurality of entries (602), the step of monitoring activities and/or behavior of users in the system in relation to the entries (604), and the step of setting or updating relationships between the users and the entries based on the activities and behavior (606) may take place concurrently and iteratively. For example, a search engine or bookmarking service equipped with the present invention may receive, store, and track URLs bookmarked or saved by each user. One embodiment may allow the user to add ratings or attributes to each bookmarked or saved URL, or create an ordered list of URLs relative to a subject matter of interest. Another embodiment may enable the user to explicitly associate a search session with a set of bookmarks, the search session corresponding to a title or a search term. As individual users create, archive, and abort a search session and its corresponding set of bookmarks, the system may monitor these activities, and establish and maintain relationships among the users, the subject matters or search terms of interest, and the search results that have been bookmarked (and for what and by whom). As part of accepting entries, monitoring activities, and maintaining relationships among users and entries, the system may also determine, periodically or real-time, a popularity or relevancy score for each bookmarked or saved entry against a search term or subject matter of interest.

The step of determining a result set comprising one or more of the entries based on the request (612) and the step of determining another result set comprising one or more entries in the result set based at least in part on the relationships between the one or more of the users and the result set (614) may be combined or otherwise modified so to determine a final set of results based on (a) the request from a user, in its consideration with previously or currently bookmarked results (by other users) deemed relevant (by the other users or the system) to the request; (b) the relationships between the request and the earlier requests from the other users; and/or (c) the relationships between the user and the other users.

For example, upon receiving a search request from a user, the system may determine that the search request or subject matter of interest matches with earlier ones from other users, and identify the common or popular search results or URLs bookmarked, saved, or otherwise identified for these requests. The system may then determine an ordered list of results comprising one or more of these entries, and present the ordered list to the user as part of a response to his search request.

In one embodiment, the system may refine or otherwise generate such an ordered list of results based on the user's relationship with the other users who bookmarked or saved those entries in connection with the similar search requests or subject matters of interest. The user may then select an entry from the ordered list for view or add it to his own set of bookmarks for his current search session (e.g., relative to a subject matter of interest). In one embodiment, this action would contribute to the relationship, popularity, and/or relevancy score for the chosen entry.

In another embodiment, each entry may have multiple relationship, popularity and relevancy scores, one for each subject matter or set of search terms known to be associated with the entry. In addition, the relevancy of a frequently bookmarked or saved entry in connection with a search request could be the same to any user in a group who shares his search results with others in the group, or to any user who has logged on, for example, per some system setup or configuration.

In yet another embodiment, the relevancy of a frequently bookmarked or saved entry in connection with a search request could vary for different users, such as when one user only allows another specific user to access or have visibility to his search results, for example, due to privacy concern. In one embodiment, the system may associate users who bookmarked or saved an entry in relation to a search term, and present a popularity or relevancy score in connection to this association. The system may also present indications of photos or profiles for these users.

A plurality of embodiments are specifically illustrated and/or described herein. However, it will be appreciated that modifications and variations are covered by the above teachings and within the scope of the present invention without departing from the spirit and intended scope thereof. For instance, any type of subject matter in relation to entries is within the scope of various embodiments. For example, a price announcement system may provide price entries for an item at various sellers in various cities. The system may store or reference item entries, seller entries, price entries, city entries, and so on, whose relevancy to a user's request or interest may be enhanced or otherwise determined by a Trust Effect setting. An event or news reporting system may support event or news entries in various cities in different states of a country, or event or news entries about people or celebrities in a group, organization, social network, or region.

An embodiment may also help contextualizing items of interest for a user in an information system that supports query for items. For example, only items submitted, referenced or referred to by members in the user's Trust Network may be included or otherwise given higher relevancy rankings in the results to the user's queries. Hence two different users sending the same query to the system for items may see two different sets of item results, each corresponding to the interests of their respective Trust Networks. And there needs not be a specific subject matter associated with entries in an embodiment. For instance, a general search engine accepts a user's query without any explicit reference to a subject matter or topic. Two entries that may have otherwise been of equal or close rank to a user's query could have one of them being promoted to a distinctively higher rank for relevancy if there is a favorable or positive relationship (e.g., of submission, usage, recommendation) between the entry and the user's Trust Network, while the other entry does not. For example, a user may be given results about Uniform Resource Names (URNs) for his query of "urn", while another user may be given results about urns, a type of vase or vessel, for the same query, because of the previous or historical selections of entries by their respective Trust Networks (or members in their respective Trust Networks) as determined by the search engine equipped with the present invention.

In addition, the impact of Trust Effect on one entry or entry type may affect the relevancy of another entry or entry type in response to a user's query or request. For example, for a user's request for available offers of an item, he may first begin his search for the item in question. If there is no offer entry that satisfies the criteria of Trust Effect for relevancy or inclusion, then an embodiment may suppress or otherwise omit the item entry in its response to the item search request, even though the item search itself may not be subject to Trust Effect per se, or even if the item may otherwise pass the criteria for item relevancy or inclusion.

Another embodiment may, on the other hand, isolate such item search from the impact of a Trust Effect setting enabled for the subsequent offer search, either as a user option or system configuration. Trust Effect on multiple entries or entry types may also be combined, logically or otherwise. For example, when identifying items that may be relevant to a user's search request under the influence of a Trust Effect setting or configuration, an information system may include all items having an applicable or relevant relationship with the user's Trust Network, as well as those available at sellers having an applicable or relevant relationship with his Trust Network. Furthermore, there may be a threshold or criteria for the number of applicable relationships between entries (or their related data or metadata) and a user's Trust Network before the entries in question may be regarded as relevant or selectable for presentation for or to the user. For example, an item entry may be considered relevant under Trust Effect for a user only if more than three distinct members in the user's Trust Network have used the item entry for their entry creation (e.g., of offer entries) or submission or have purchased the item.

According to one embodiment, a Trust Effect setting may always be enabled. According to another embodiment, a user may toggle his Trust Effect setting, and the results will change accordingly without the user initiating the same or another request. According to yet another embodiment, results of entries under an active Trust Effect setting may be presented in addition to those without Trust Effect, with the former assuming higher rankings, or the former and latter arranged in parallel views, or some other arrangements. According to yet another embodiment, Trust Networks for a user or group of users may be established by the system, without any direct relationship between the user or group of users and the members in the Trust Networks. For example, the system may identify according to some criteria the top 10% of its participant base and associate the participant base with or otherwise make available to them a Trust Network comprising these select participants. In one embodiment, a user may also specify a Distrust Network, thereby creating an effective or virtual Trust Network comprising users not in the Distrust Network.

According to another embodiment, the step of associating one or more of the users with another user (608) and/or the step of determining another result set comprising one or more entries in the result set based on the relationships between the one or more of the users and the result set (614) may be omitted or otherwise made optional. For instance, a system equipped with the present invention may accept an entry from a user, and associate it with a subject matter, wherein the subject matter may be defined or specified by the system, the user, or another user. By accepting other entries from other users and associating the entries with their individual submitting users for a common subject matter, the system may determine a set of or an ordered list of most popular entities in connection with those entries for a given subject matter, for example, by the number of submissions, the longevity of the entries' association with the individual users (e.g., the time the entries being on a user's bookmarks for a particular search session), the number of individual submitters or bookmarking users, and so on. The system may then present such a list to a user who may indicate (e.g., via a request to the system) his interest in the subject matter even when the user has never submitted the system any entry in relation to the subject matter.

For example, such a system may accept URL submissions as bookmarking entries for individual users (e.g., after the users have first logged on with the system) in connection with a subject matter (e.g., a retail product or offer, or a query or search term pertaining to a retail product or offer) from Web browsers to which the users are coupled. The subject matter may be specified by the system, or by a user. In one embodiment, the subject matter may be a question (e.g., what is the best microwave oven?) whose user feedback or answers (i.e., user-submitted entries) may each in turn be a subject matter (e.g., how much is this microwave oven and where to get that?). Answers or user-submitted entries to this latter subject matter may be links to the webpages showing the prices of a particular microwave oven, which may be represented by an entry being associated with the former subject matter. Either a subject matter and/or a user-submitted entry may further be qualified by a refining attribute, such as geopolitical location for a subject matter and a language indicator for a submitted URL. A subject matter may also be determined by combining various information types, such as "camera model ABC" and "review", and "camera model ABC" and "price", as in "Where to find the best reviews for the camera model ABC?", and "Where to find the best prices for the camera model ABC?" In one embodiment, the system may support a hierarchy of subject matters, where a system-wide subject matter is predefined, and a subject matter subordinate to or otherwise belonging to the system-wide subject matter may be defined by users. For instance, a search engine system or social network may be declared for or otherwise associated mainly with shopping information or activities. Such a shopping system or network may further provide, for example, two types of contexts for queries: (i) the best product for a particular category, and (ii) the best price for a particular product. The two example contexts may serve as a template for creating user-defined subject matters, such as "the best vacuum cleaner" and "the best price for vacuum cleaner XYZ." In accordance with this approach, users may create and collaborate on various common subject matters of interest all of which belong to shopping. In addition, the system may provide the users with a user interface to browse or search existing questions or subject matters, and create new ones. The users may then associate his search result entries or bookmarking entries with a question or subject matter. For example, the system may accept or use the question or subject matter as, or otherwise associate it with, an initial search or search term for searching the Web or a specific Internet domain or website.

User-submitted entries may or may not comprise a URL. Entities in connection with the user-submitted entries for a given subject matter may include a specific product, service, offer, location, event, server, domain, and so on. The system may enable a user to discover an entry originated by the user or another user, and to associate the entry with himself as a separate submitter or new submission of the entry to the system, for example, against a particular subject matter or one of his research or bookmarking sessions. A user may trigger, for example, via a hypertext link or icon on a webpage a submission of an entry to the system with which the user has already authenticated. An entry may comprise information or attributes that help match or refine a subject matter in question, or generate another subject matter. For example, an entry may include a product name, a brand name, dimensions and weight of the product, and so on. The subject matter in question may have been to find the best product for a particular product category. The brand name information may cause the system to generate or otherwise recognize the subject matter of what is the best product for this brand name for this particular product category. The system may also be able to reduce or otherwise refine the possible results that match users' queries involving attributes related to subject matters, such as location, language, and brand.

In one embodiment, a user-submitted entry may be associated with an entity, where different entries may refer to a common entity. For example, an Internet server or domain name (e.g., www.xvz-abd-149.com) may comprise a plurality of URLs (e.g., www.xvz-abd-149.com/a/b, and www.xvz-abd-149.com/a/c). Each user-submitted entry may comprise a URL identifying a specific webpage on an Internet server or domain. As such, different URLs may map to or otherwise refer to a common Internet server or domain (which may in fact comprise a plurality of computers or servers in deployment). The system may then determine, e.g., continuously, periodically or on demand, which Internet servers or domain names are responsible for or otherwise associated with the most entries for a particular subject matter, and present a set or list of these names or their representations (e.g., an icon such as a favicon) to a user.

For example, a Web browser coupled to the system may display a banner or list of domain names (or favicons, which may be obtained over the Internet), each showing or otherwise being accompanied by the number of past bookmark submissions, and/or the number of current bookmark submissions that refer to the corresponding domain for a given subject matter. The order or ranking of each domain may change or update in real time, periodically, or on demand, as the system monitors and tracks the bookmarking entry submissions in relation to one or more subject matters, or a user-selected or system-selected subject matter. The system may perform such change or update for entries related to an individual user, a group of users, or all users of the system. In one embodiment, the system may also display sponsored domain names next to or otherwise close to such a merit-based list or group of domains. In another embodiment, the system may also display an indication of the popular entities based on the entries submitted by users in relation to a particular subject matter. One advantages of this domain-level discovery feature is that users can discover Internet domains (or herein also referred to as websites) that may specialize in providing certain information.

For example, a popular website for providing retail offers for digital cameras may be different from a popular website for providing reviews for digital cameras. Hence the rankings of websites for the subject matter "Where can I find reviews for digital cameras?" may be different than those for the subject matter "Where can I find the best prices for digital cameras?" In addition, the reputation or expertise of a website so determined enables a user to discover a possible information source for a new entity where there may yet to be an entry submitted to the system for the entity against the website. For example, even though there is no URL ever bookmarked for a particular camera in connection with a popular camera-review site, the fact that the site has been very popular with its URLs being bookmarked for reviews of many other cameras, a user can quickly visit the website and look for review information for that camera. Furthermore, some webpages may have dynamically been generated, so that there is no a static URL one can re-use to reach the same webpage or content. A user may specify the server or domain name in connection with his bookmarking entry, and provide or otherwise associate specific information of interest so that he, another user, or the system may recall the same or equivalent webpage or content based on the information. For instance, a user may include a retail product name in a bookmarking entry, whereby the system may initiate a request to the server based on the product name.

For example, the system may use a Web service interface provided by the domain to conduct the request, or may cause a search engine or service independent of the domain to do so, the search engine or service, for instance, having previously indexed the contents on the domain or the servers associated with the domain. In one embodiment, in response to a query from a user, the system may perform or cause to perform searches against system-determined top domains (e.g., via another system or search service, or the domains' Web services API) for a particular subject matter, the query being associated with the particular subject matter, and the searches being performed in connection with URLs or contents of URLs that comprise the domain names. In one embodiment, the system may provide an interface (e.g., a hypertext link or button) for a user to initiate a search, and if applicable, include a search term with the search, against the top domains, with an option to select or deselect the specific domains, and add addition domains for the search. The search may result in, for example, additional display areas (e.g., UI windows) being shown to the user, with each display area comprising results for each domain, or one display area comprising results for all domains of interest. In one embodiment, a browser coupled to the system and a user may display a banner of icons each representing a system-determined top domain, whereby the user may click on an icon on the banner to visit the domain directly (e.g., on the same browser page, or a new browser tab or window), or interact with that domain alone via the system. The browser may also provide the user an user interface by which the user may have more than one session active, each session corresponding to one subject matter. The user may switch between sessions while submitting entries to the system, thereby associating the entries with one subject matter at a time. The browser may also allow the user to explicitly specify or otherwise identify the subject matter in connection with each entry being submitted to the system.

According to another embodiment, a domain or website of interest may provide, or cause another system or computer to provide, feedback to the system in relation to a specific activity, so that the system may determine a ranking in relation to the activity or based on the frequency or count of the activity. For example, a website or a customer's device may indicate to the system that a user has bought an item at the website. This indication acts as an entry submitted to the system. Depending on the information available at the indication, the entry may be associated with the subject matter of "Where did people buy this item or type of item from?" (if it has location information), and/or the subject matter of "How much did people pay for this item or type of item?" (if it has price information). The system may also generate other statistics of interest based on entries submitted by either users or websites.

According to one embodiment, a webpage or website that sells retail goods may advertise, publish, or otherwise make available to users, visitors, or customers the quantity sold of a particular good. For instance, the quantities sold of a product and another product over a period of time or up to the present time may be presented to a user, wherein the product and the other product are a competing or related product to each other. In another embodiment, such quantities sold of a product and another product may be qualified or otherwise advertised with information that indicates the number of buyers who belong to, are classified as, or otherwise are associated with a group that excludes other buyers. For example, users who or whose reviews have received a certain number or level of positive votes or feedback may be considered by the webpage or website as such a group. Users who are identified as trusted or who belong to a user-created or user-organized list or group may also be considered as such a group. In another embodiment, reviews or a quantity of reviews for one or more products may be qualified or otherwise advertised with information that indicates the number of reviewers who belong to, are classified as, or otherwise are associated with a group that excludes other reviewers.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders or in parallel. Various embodiments of the invention include logic stored on computer readable media, the logic configured to perform methods of the invention. The examples provided herein are exemplary and are not meant to be exclusive.

For instance, while the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of the following claims.

In addition, a digital resource hub (or simply hub herein) may provide dissemination or distribution of digital resources (or simply resources herein) to its users. A user may rate resources to recommend them or otherwise increase their visibility to other users. A hub may limit its access to members. Membership may simply entail a registration (e.g., by email address) or criteria pertaining to a user's physical characteristics (e.g., gender, age, ethnicity), location (e.g., residence, current position), beliefs (e.g., religion, political views), ability (e.g., language, IQ test score), and so on. Membership may also be established or determined continually or per some session or operation, such as those based on GPS positions, personal interests at the moment, and so on. For example, a hub provider may create a plurality of multi-level hubs based on geographical positions for recommended beverage and food. The finest level may represent a radius of 50 meters or an area of 50 times 50 meters square, with a higher level being a composite of four of the previous level (i.e., 100 times 100, 200 time 200, and so on). The geographical extent or coverage of a hub (or its center and dimensions relative to the center) may be pre-assigned by the hub provider, or is determined relative to the position where the user is at the moment of his request for lists of relevant resources (i.e., those of recommend food and beverage), or some combination thereof. The hub provider may respond to a user's location-specific query with a plurality of resource lists, each comprising highly recommended food and beverage items at each level of area coverage, except at the lowest level, based at least in part on the hub-specific scores at the lower levels, whose score would be determined based at least in part on ratings given by users in the geographical area corresponding to that level.

Members may assume different roles as administrators, scouts, reviewers and observers, each of which might require a different set of membership criteria. Administrators or a hub authority may be creators or owners of a hub. Scouts are members who may submit or recommend resources to the hub. Reviewers are those who may provide ratings for resources available in the hub. Observers may access the resources but may neither bring resources into the hub nor provide any rating. Any type of membership role is within the scope of various embodiments. According to one embodiment, a member may assume multiple membership roles.

An authority of a hub may establish or otherwise choose rules for operation, administration and maintenance of the hub, such as those for membership, resource submissions, and resource import and export. There may be multi-tiered levels of authority, where the higher level may delegate some power to the lower level. For instance, a hub provider may assume the highest level of authority for all hubs under its jurisdiction while a hub administrator is responsible for a particular hub. For example, a local hub authority (e.g., a hub administrator) may choose for a hub the applicable membership roles as made available by the hub provider, and have each member assigned to its intended role, centrally or otherwise, while the hub provider may be responsible for rules in ranking resources in the hub based at least in part on ratings given by members of the hub. A hub authority may decide whether to make available to other hubs resources as discovered or otherwise submitted by the hub's members, and if so, under what criteria, if any. Likewise, a hub authority may decide if his hub would accept such public resources, and if so, under what criteria, if any. A hub authority may also decide the circumstances under which a member be removed from the hub. A hub authority may further be established by some voting scheme, where a new hub administrator or new rule may be elected or enacted by a majority of qualified members (e.g., where observers are not allowed to vote).

A hub may present or otherwise make available a plurality of lists of resources, such as the latest and the prize, which may be updated continuously, periodically, or from time to time. The latest list shows a list of resources whose order is mainly influenced by chronological considerations, e.g., from the most recent to the least. (The latest list may comprise resources submitted or otherwise recommended by the hub's members, imported from other hubs, or received as public resources). The prize list shows a list of resources whose order is mainly influenced by relevancy considerations, e.g., from most popular to the least, where the more recent may be considered more popular when all other factors are equal. In embodiments, a user or member may provide a rating against a resource on each of the two lists. According to one embodiment, only one rating is counted for a resource for each unique user or member, and should the user or member belong to more than one hub, then a home hub or a hub priority list would be established to determine which hub should receive the rating in question. A user's hub priority list identifies a plurality of hubs whose hub-level scores may include the user's rating. In one embodiment, the weight of the user's rating may decrease gradually for hubs on the lower order of the hub priority list.

For each hub, the prize list of resources would usually demand more attention from its members than the latest list. This may result in resources on the former list (namely prize resources) attracting more ratings from members who would have otherwise missed them, e.g., the members' not checking out resources on the latest lists (namely latest resources). Given the potential heterogeneity of hubs and their constituent members, a resource may be popular in one hub while barely known in another, even though it might have appeared on the latest lists of both hubs. A hub provider enables the existence of a plurality of hubs that may accommodate different interests and intents. No one single homogenous group of users may easily dominate the opinions about resources and take control of their dissemination under a single jurisdiction. As such, a resource has a much better chance of reaching an appreciative audience.

In addition, a resource may obtain different ratings or scores from a plurality of hubs, and an overall score may be derived based on these hub-level scores. In embodiments, the hub-level scores assigned to different hubs are normalized or otherwise made according to the same scoring system, such that they may be directly compared with each other, and combined to create an overall score. Such an overall score may help determine the relevancy of a resource to a population under a jurisdiction (e.g., that of a hub provider). Furthermore, a prize user, member or hub may be identified, when a user, a member or a hub's members are consistently discovering prize resources, at the hub or provider level.

According to one embodiment, a hub is regarded as an organization characterized by a culture realized via some membership criteria and agreements which may include considerations in beliefs, languages, age, gender, religion, professional affiliation, and so on. Users not compatible with or otherwise interested in one organization may have membership with other organizations (i.e., hubs). Existing members may lose their membership should they fail to fulfill the membership criteria or agreements imposed by the hub in question. Like minded would gradually gather at appropriate hubs, whose otherwise heterogeneous cultures would help not only to promote resources of interest to their peers and members, but also identify and select popular or prize ones for all users in the hub provider as a whole. According to one embodiment, the hub provider may be a social network, and hubs may be groups within the social network. According to another embodiment, the hub provider may comprise a collection of entertainment and news providers, and a hub may comprise individuals, a group, a company, or an organization subscribing to services of any of these entertainment and news providers.

Figure 7:
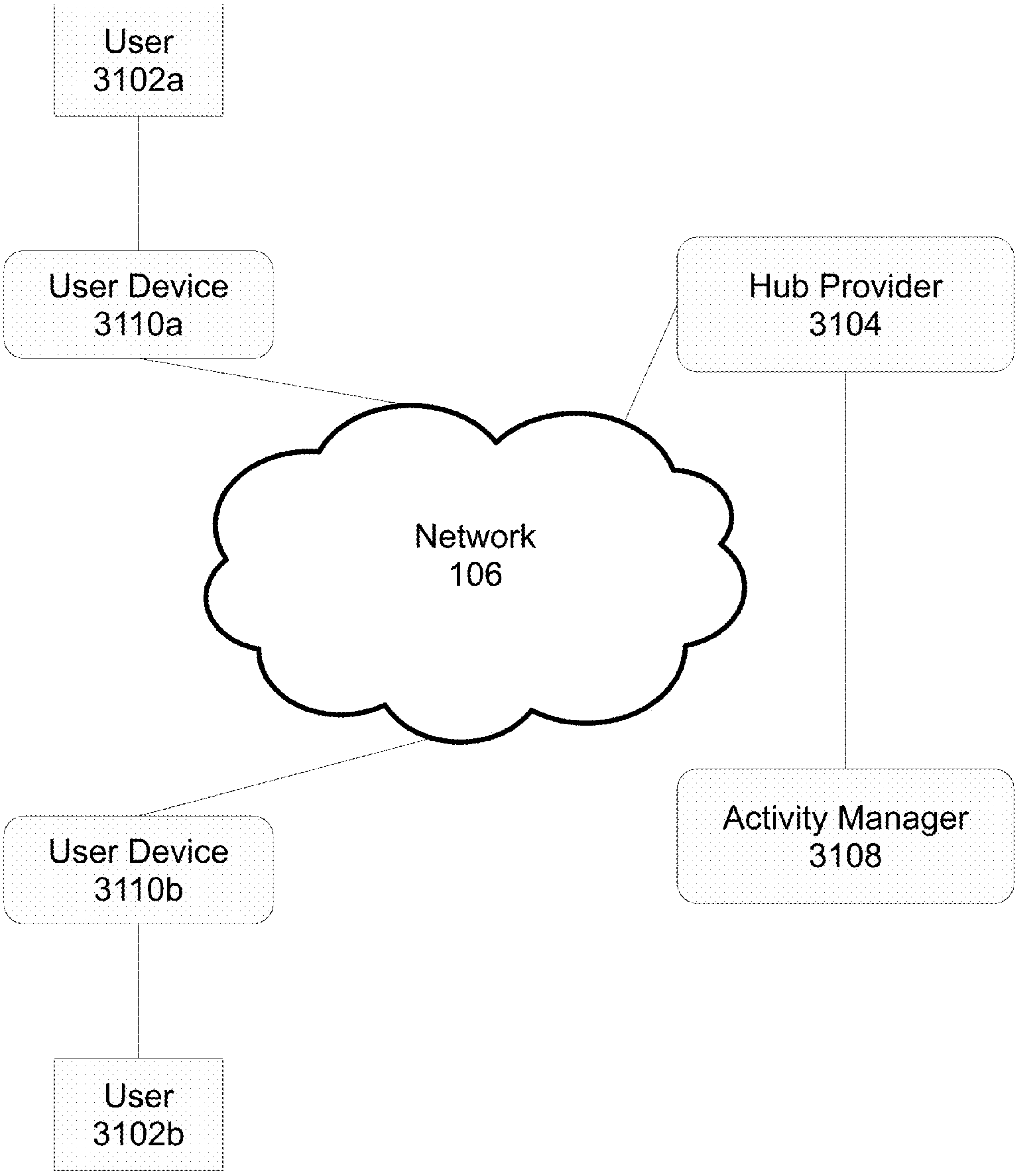
FIG. 7 illustrates an exemplary environment for distributing digital resources and identifying prize resources and their contributors among heterogeneous users.

FIG. 7 illustrates an exemplary environment for distributing digital resources and identifying prize resources and their contributors among heterogeneous users. A plurality of users 3102*a*, 3102*b* are communicatively coupled to a hub provider 3104 via their respective user devices 3110*a*, 3110*b* to a network 3106. The hub provider 3104 may comprise a plurality of hubs (not shown) each associated in membership with one or more of the plurality of users 3102*a*, 3102*b*. According to one embodiment, the hub provider 3104 may interact with a plurality of users 3102*a*, 3102*b* at their devices via a website. A user may search, join, create and visit a hub on the website. According to some embodiments, an administrator may set up rules for membership subject to constraints, if any, by the hub provider 3104.

A hub may be realized as a website where any user 3102*a*, 3102*b* of the hub provider 3104 may view or access content therein, including a list of most recent resources and a list of current prize resources, and where only authenticated users 3102*a*, 3102*b* may submit or recommend resources to the hub of which they are a member. An authenticated user 3102*a*, 3102*b* may submit a resource via a submission page of the website, a toolbar on a Web browser, a submission link for the hub provider 3104 carried by a third-party website, or some other mechanisms whereby a resource or a reference (e.g., URL) to a resource may be submitted by a user 3102*a*, 3102*b* along with a user identity known to the hub provider 3104. Any type, scheme, or mechanism of submission is within the scope of various embodiments.

The hub provider 3104 may cache or otherwise retrieve a copy of the resource in question, and create a new reference to the copy for backup or faster retrieval, while maintaining the original reference and making it available to its users 3102*a*, 3102*b*. In addition, a user 3102*a*, 3102*b* may specify a submission as private, in that only a designated hub (e.g., a hub to which he is a member) may receive the submission.

In one instance, a user 3102*a*, 3102*b* associated with a user device 3110*a*, 3110*b* requests a resource (e.g., via a reference such as a URL) from the latest resource list of a hub. Once authenticated as a member of the hub, the user 3102*a*, 3102*b* may provide a rating against the resource. The resource may be made available on the current prize resource list of the hub should the hub provider 3104 determine that the resource has attained a certain score, whether or not in relation to other resources available in the hub. On the prize resource list, the resource may continue to receive ratings (positive or negative) from members who have not rated it yet. The resource may be removed from both the prize and latest list if it no longer satisfies the criteria that govern the selection of resources for either of the lists.

An activity manager 3108 is coupled to the hub provider 3104. The activity manager 3108 monitors or receives user activities that may result in changes in availability of digital resources, in ratings or scores (e.g., those of resources, hubs, members, and users 3102*a*, 3102*b*) and if applicable, in memberships to hubs. In one instance, the activity manager 3108 receives a reference to a digital resource from a user 3102*a*, 3102*b* associated with a user device 3110*a*, 3110*b*. The activity manager 3108 checks if the digital resource already exists in his hub(s) or the hub provider 3104, subject to the submitter's privacy preference, which may be set in a user profile or at the time of submission. If the resource is considered as publicly available (e.g., having been introduced to the hub provider), such a submission may be counted as a positive user or member rating for the resource, and the submitter may be notified of other users (as well as their hubs) who have submitted the same resource publicly, or of hubs (e.g., those to which the submitter is member) that already have the resource available, subject to their privacy settings, if any. Wherever applicable, the submitter may be credited as having made available the resource to his hub(s) or the hub provider 3104. According to one embodiment, original submissions themselves in relation to a hub or the hub provider 3104 do not contribute to hub or overall ratings of their corresponding resources. The activity manager 3108 may forward or otherwise distribute the newly submitted public resource to the submitter's hub(s) or hubs that accept public resources. According to some embodiments, the activity manager 3108 comprises a module associated with the hub provider 3104.

Figure 8:
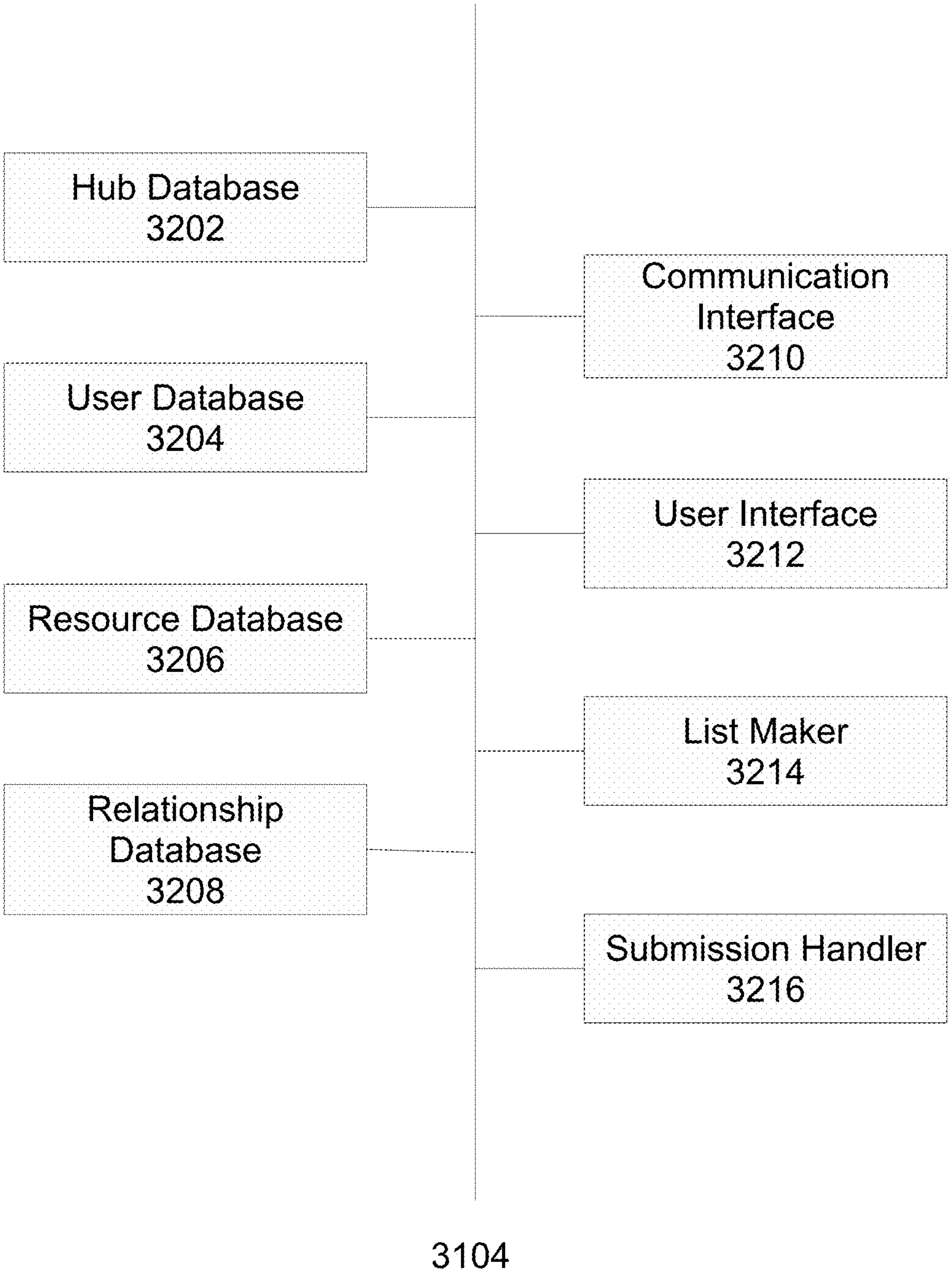
FIG. 8 shows a block diagram of an exemplary hub provider, such as the hub provider shown in FIG. 7.

FIG. 8 shows a block diagram of an exemplary hub provider 3104, such as the hub provider 3104 shown in FIG. 7. A hub database 3202 is provided for storing data associated with each hub, such as membership rules, scores, ranks (e.g., those based on membership size and number of provider-wide prize resources originated), and resource import and export lists and constraints (e.g., hubs from and to which resources are received and forwarded respectively, and if a resource should be exported, and how many times an exportable resource originated from the hub may be forwarded by other hubs), and if public resources are to be received.

A user database 3204 is provided for storing data associated with each user 3102*a*, 3102*b* (in a user account), such as his ranks (e.g., those based on numbers of hub-specific and provider-wide prize resources respectively), and user ID and password for the hub provider 3104.

A resource database 3206 is provided for storing resources and/or their references, as well as other related data such as their time of availability, overall rating or score, and local copy and reference.

A relationship database 3208 is provided for storing data associated with relationships among hubs, users and resources, as well as their attributes such as popularity or scores. For example, it may store the membership relationship between a user 3102*a*, 3102*b* and one or more hubs, and a rating of his contribution for each hub (e.g., the number of prize resources that he submitted into the hub), and support query for the membership of a hub. It may store the availability relationship between a hub and one or more resources, and a rating for each resource in the hub, and support query for all hub-level ratings for each resource. It may also store activity relationships between a user having a user account and one or more hubs, as well as those between a user having a user account and one or more resources (or their references). Such activity relationships include but not limited to submission of a resource to a hub, rating of a resource, and rating negatively of a prize resource in a hub.

A communication interface 3210 is provided for communicating with devices and users over a network 3106, such as a user 3102*a*, 3102*b* via the user device 3110*a*, 3110*b* shown in FIG. 7. A device or a user 3102*a*, 3102*b* via a user device 3110*a*, 3110*b* may send and receive data (e.g., rating and resource submissions, hub membership requests and responses, and personal preferences) to and from the hub provider 3104 via the communication interface 3210. Any type of communications interface is within the scope of various embodiments.

A user interface 3212 is provided for interacting with users or user devices 3110*a*, 3110*b*, and it includes the logic or procedures for user logon and logoff, presentation of hub-specific and provider-wide views having lists or selections of latest and prize resources, filtering and sorting of entities such as resources, hubs and the like, and hub creation and signup. Any layout, format, mode (e.g., audio), policy, scheme, or rules pertaining to presentation of resources and other entities such as hubs, users, relationships and the like are within the scope of various embodiments. The user interface 3212 may also be equipped with a search engine or search module (not shown), or otherwise configured to provide indexing and searching services for entities such as resources, users, hubs, relationships and the like in the hub provider 3104. Corresponding indexes, if any, may be stored and maintained in the databases for the entities of interest (e.g., the hub database 3202, the user database 3204, the resource database 3206, and the relationship database 3208), or some other databases.

A list maker 3214 is provided for creating and maintaining lists or selections of latest resources and those of prize resources for the hub provider 3104 and each hub therein. For instance, the relationship database 3208 may provide the list maker 3214 with the latest (and historical) aggregate ratings or popularity scores for a resource in a particular hub, so that the list maker 3214 may create and maintain a list of prize resources at a given time for a hub. The resource database 3206 may provide the list maker 3214 with the latest (as well as historical) overall scores or popularity ranks for a resource.

A submission handler 3216 is provided to process submissions from users 3102*a*, 3102*b* or user devices 3110*a*, 3110*b*, namely resources (or their references) and ratings against resources. According to one embodiment, the submitted resources (including their references) and ratings may be stored in the resource database 3206 and the relationship database 3208 respectively. Resource entries in the resource database 3206 may include a timestamp indicating time and date of the submission, identification of the user 3102*a*, 3102*b* providing the submission (i.e., the submitter), his preference for whether to make the submission public (i.e., whether it be available to other hubs to which he is not a member), and the like. Rating entries in the relationship database 3208 may include a timestamp of the submission, the submitter (or his ID), the hubs (or their IDs) to which the submitter is a member, and the like. These submissions and ratings (and other entities such as hubs, users, relationships, and the like) may be stored in a single or multiple databases, including the resource database 3206, the user database 3204, the resource database 3206, the relationship database 3208, and the like. One or more databases described herein may be located remotely and accessed by the hub provider 3104 or any component, system or device coupled to the hub provider 3104, subject to any applicable authentication control and access policy. A timestamp or other chronological information may be associated with each entry in these databases. The user interface 3212 may feed or otherwise provide the submission handler 3216 with resources and ratings from a user 3102*a*, 3102*b* or user device 3110*a*, 3110*b*. The submission handler 3216 may include modules or functions for processing these resources and ratings, or act as a proxy or agent to a component, system or device comprising such components and functions, or a combination thereof. According to some embodiments, the submission handler 3216 may be optional.

Figure 9:
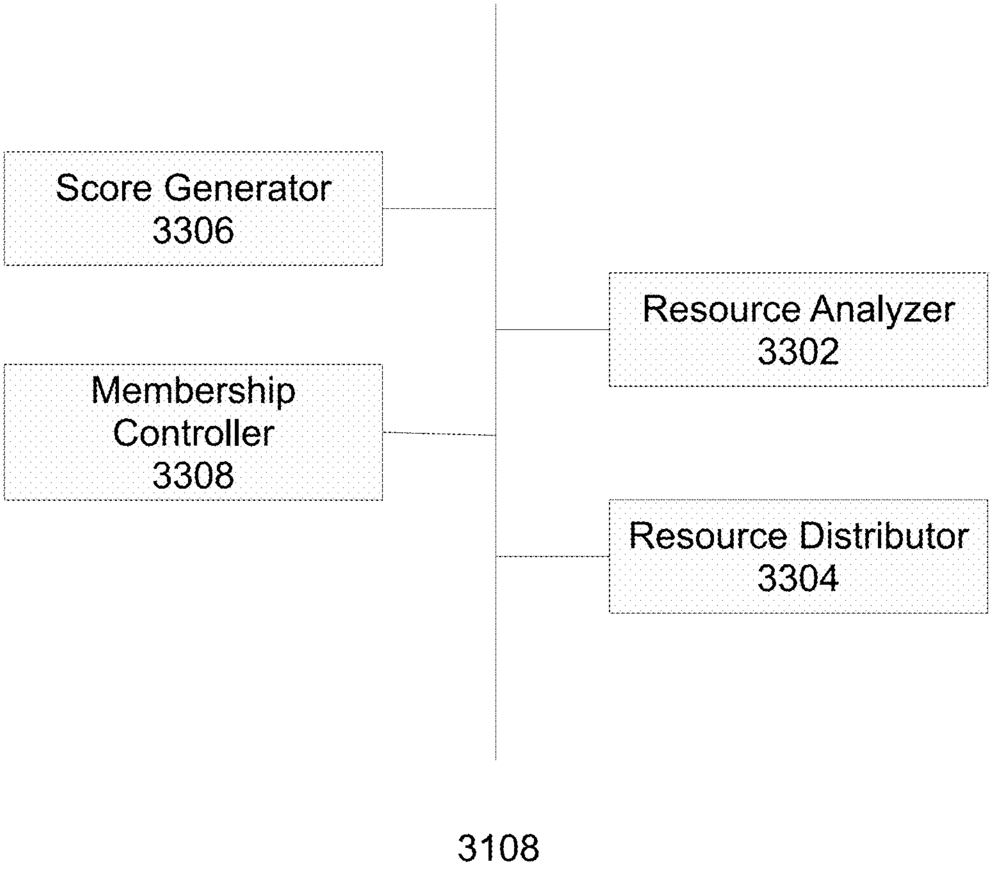
FIG. 9 shows a block diagram of an exemplary embodiment of the activity manager of FIG. 7.

The activity manager 3108 shown in FIG. 7 is such an exemplary component, system and device. FIG. 9 shows a block diagram of an exemplary embodiment of the activity manager 3108. The activity manager 3108 comprises a resource analyzer 3302, a resource distributor 3304, a score generator 3306, and a membership controller 3308. According to some embodiments, the membership controller 3308 may be optional.

The resource analyzer 3302 determines if the submitted resource already exists in the provider hub (for instance, by checking the resource database 3206). It may also create a local copy of the resource along with a new reference, store them in the resource database 3206, and maintain the relationship between the copy and the original in the relationship database 3208. In addition, multiple resources may be related to one another, for instance, for the purpose of popularity rating. For example, multiple linguistic translations or versions to the same news reporting, while having different URLs, may be regarded as referring to the same news item. On the other hand, resources having the same URL might be regarded as different resources, for example, when a newer and distinguishable version has been made available via the same URL, such as a newer version of software or a news front page with a newer publication date. The resource analyzer 3302 creates a resource entry in the resource database 3206 when the submitted resource is considered new. In an embodiment where submission of an existing resource (at the hub or provider level) is considered as a positive rating from a user 3102*a*, 3102*b* when he has not yet rated the resource, the resource analyzer 3302 may create an internal rating submission for the resource, and the user 3102*a*, 3102*b* may then be considered as having rated it (at the hub or provider level, wherever applicable).

The resource distributor 3304 identifies the hubs to which a submitted resource be made available based at least in part on hub membership of the submitter, and delivers the resource to the hub(s). Where an embodiment may support the creation and receipt of public resources, the resource distributor 3304 determines whether the submitted resource should be made available to hubs which are configured or otherwise identified to accept public resources and to which the submitter is not a member. The submitter may provide a privacy setting that causes the resource be only made available to all his associated hubs (e.g., with membership), or some specific individual hubs or groups of hubs. Where an embodiment may support a private personal hub (i.e., to which no other users may have access except the user owner), the submitter may specify a privacy setting that causes the resource available to no hubs but his private personal hub. (A private personal hub, for example, may record all resources submitted and those rated positively by its owner, and highlight those being made prize at a hub or in the whole of the hub provider 3104.) Such a privacy setting may be specified as part of a user account in the hub provider 3104 (e.g., in the user database 3204) and/or as part of a resource submission. The latter, if present, may override the former. The delivery of resources to their destination hubs may be realized via entries to the relationship database 3208, where an entry relates or associates a destination hub in the hub database 3202 to or with the resource in the resource database 3206. The entry may comprise such a relationship, the date and time of association, the current and historical cumulative positive and negative ratings of the resource for the hub, and the like. The list maker 3214 as shown in FIG. 8 would then be able to make it available to users of the hub via the user interface 3212.

In some embodiments, the resource distributor 3304 may be configured to attach or otherwise associate advertising to or with a resource destined to a hub. Examples of advertising include, but are not limited to, a depiction of a product, a depiction of a logo, a display of a trademark, an inducement to buy a product, an inducement to buy a service, an inducement to invest, an offer for sale, a product description, trade promotion, a survey, a political message, an opinion, a public service announcement, news, a religious message, educational information, a coupon, entertainment, a file of data, an article, a book, a picture, travel information, and the like. In addition, the format of the advertising may include, singularly or in combination, an audio or animation or other multimedia element played at various times, banner advertising, network links, e-mail, images, text messages, video clips, audio clips, programs, applets, cookies, scripts, and the like. Furthermore, each instance, entity, or object of advertising itself may be regarded as a resource, and be maintained in the resource database 3206 or some other databases. Its relationship with one or more resources (and/or with possibly other entities such as users, hubs, and the like) may be maintained in the relationship databases 3208 or some other databases. The resource distributor 3304 may deliver one or more advertising resources to a hub in response to a single resource submission (e.g., one carrying a primary resource). An advertising resource may also be rated by a user 3102*a*, 3102*b* and selected as a prize resource (e.g., by the list maker 3214). It may be presented (e.g., by the user interface 3212) to a user in a pop-up window on a user device 3110*a*, 3110*b* when a primary resource is chosen by a user 3102*a*, 3102*b* for view, or as part of the presentation of the primary resource. The user 3102*a*, 3102*b* may not only view the primary resource and its associated advertising resource(s), but also provide ratings against each of them. Any advertising presentation policy, scheme, or rules are within the scope of various embodiments.

The score generator 3306 interprets, updates and maintains scores and the like (such as ratings, rankings, votes, marks, yes/no answers, like/dislike, bless/damn/forget, mark as favorite/hide it, clicks, impression time, and so on) that may be associated with resources and other entities, such as hubs, users, relationships, and the like. It may store the scores in a central database, or in various databases such as the relationship database 3208, the resource database 3206, the user database 3204, and the hub database 3202. Based at least in part on a rating submission (including internal rating submissions, if applicable), the score generator 3306 may create or retrieve a database entry (e.g., from the relationship database 3208) corresponding to the score for a resource at a hub, the hub having the submitter as member, and update the entry accordingly (e.g., the score and time of update). The score generator 3306 may create or retrieve a database entry (e.g., from the resource database 3206) corresponding to the hub provider-wide score for a resource, and update the entry accordingly. Score update or assignment may be executed in accordance to some policy or rules. For example, if a submitter is allowed to provide (only once)

either a positive or negative rating against a resource, then one point may be added to the score of a resource for a positive rating, while one point may be removed from the score for a negative rating, with the score starting from zero when the resource is first made available in a hub. The hub provider-wide score for a resource may then be the sum of all its individual scores from all hubs. Alternatively, a good score and a bad score may be maintained simultaneously for a resource (at both hub-level and provider-wide-level), each accumulating points from positive and negative ratings respectively. According to one embodiment, the list maker 3214 as shown in FIG. 8 may then produce a list of popular resources for a hub using only the good scores, and a list of controversial resources based at least in part on both the good and bad scores (both of which may be regarded as list of prize resources). Yet another scoring scheme may be to regard a resource as prize at the hub level when the percentage of a hub membership that have given it a positive rating is twice or more than the percentage that have given the resource a negative rating. And a resource may receive at the hub provider level one point for every ten positive ratings within a hub, with a minimum of 100 positive ratings within the hub, regardless of any negative ratings. A scoring rule may also be that there may only be one hub or a limited number of hubs receiving the one and only one rating (positive or otherwise) given by a user 3102*a*, 3102*b* against a resource even though the user 3102*a*, 3102*b* may be member to more than one hub (not counting his private personal hub, if any). The user 3102*a*, 3102*b* would need to designate a home hub or a hub priority list for the score generator 3306 to decide which hub should receive the rating in relation to the resource. Another scoring rule may be that ratings from a hub administrator do not count in hub-specific scores for resources in relation to the hub. While the score generator 3306 may be responsible for updating and maintaining scores for resources (and for other entities such as users, hubs, and so on) in the hub provider 3104, the list maker 3214 is responsible for selection of prize resources. A scoring policy or scheme may involve the collaboration of both the score generator 3306 and the list maker 3214. Any scoring policy, scheme, or rules are within the scope of various embodiments.

The membership controller 3308 monitors scores and statuses of resources and users 3102*a*, 3102*b* (and other entities wherever applicable) that may affect hub memberships and performs appropriate actions accordingly. For instance, there may be a rule for a particular hub that stipulates a member be removed or changed to become an observer if he has not voted for or against a resource for a specific period of time (e.g., one month) despite being eligible to do so. Another example rule may be that a member be removed if none of his submitted resources is picked as prize for the hub for a specific period of time, or three or more of his submitted resources have ever received a certain number or percentage of negative ratings from the membership in a given period of time (e.g., over 70% of membership giving negative ratings within three months of the submission of each of his submitted resources). Any membership control policy, scheme, or rules are within the scope of various embodiments.

The membership controller 3308 may check the relationship database 3208 and other databases whenever there is a score, status and/or time change, or be notified of such changes (e.g., by the score generator 3306, the resource distributor 3304, and/or an internal or external timer (not shown)). The membership controller 3308 may also set up a condition and associate it with each entity of interest (e.g., in the database where the entity resides) so that the score generator 3306, resource distributor 3304, resource analyzer 3302 would check if the condition is met prior or subsequent to its own operations. The databases may also be configured to perform some or all of this condition checking upon access, and provide the necessary notification when needed. Upon notification of such conditions, the membership controller 3308 may perform its operations accordingly (e.g., further rules checking and/or subsequent member removal). In one embodiment, the membership controller may notify users of their membership being removed from a hub via the user interface 3212.

Any type of hub may be provided by the hub provider 3104 shown in FIG. 7. A hub may comprise people or users established or grouped according to any type of category, such as friendship, geopolitical boundaries, affiliation (e.g., having the same email domain), and so forth. A user 3102*a*, 3102*b* may specify the hubs, the categories, subcategories, and so forth; and/or the hubs, the social networks, the categories, the subcategories, and so on may be predetermined by the hub provider 3104. A user 3102*a*, 3102*b* may create a hub, join an existing hub, invite other people or users to join a hub, and cease to be a member of a hub, subject to the terms, rules and policies that may be set forth by the hub provider 3104 and/or the hub owner. Such terms, rules and policies may include the provisions for hub creation, hub membership and resource submission and rating.

For instance, a user 3102*a*, 3102*b* may connect via a desktop computer or a portable device (i.e., a user device 3110*a*, 3110*b* shown in FIG. 7) to a website or system embodying the hub provider 3104. The device 3110*a*, 3110*b* is communicatively coupled with the website, namely the hub provider, over a network 3106 via the communication interface 3210. The user 3102*a*, 3102*b* provides his email address as his user ID and a string of characters as his password as part of the signup process with the hub provider (via the user interface 3212). Upon successful registration, the user interface 3212 would create an entry (namely, a user account entry or simply a user entry) in the user database 3204 for the user.

Figure 10:
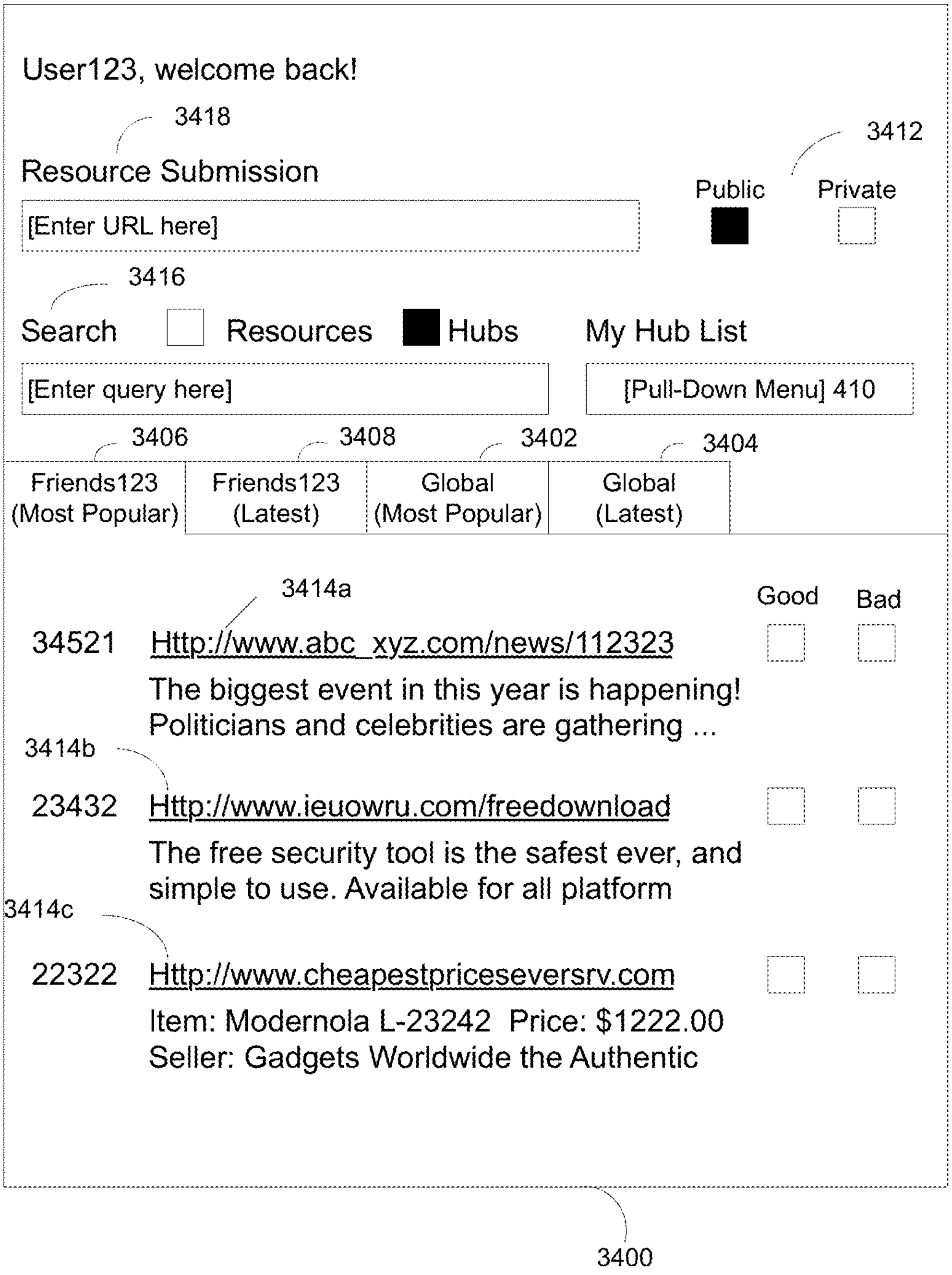
FIG. 10 shows an exemplary webpage that a user of the hub provider may be presented with upon successful logon.

FIG. 10 shows an exemplary webpage 3400, which a user of the hub provider 3104 may be presented with (by the user interface 3212) upon successful logon. For instance, such an webpage may comprise a list or selection of provider-wide or global prize resources 3402, a provider-wide or global view of latest resources 3404, a pair of lists of hub-wide prize resources 3406 and latest resources for a hub 3408 (e.g., hub "Friends123"), a pull-down list 3410 of hubs to which the user 3102*a*, 3102*b* is a member (from which a user 3102*a*, 3102*b* may select more hubs into view), a search interface 3416 for resources and hubs in the hub provider 3104, and a resource submission interface 3418 which also allows a user 3102*a*, 3102*b* to specify if the resource should be made public 3412. Each entry 3414*a*, 3414*b*, 3414*c*, in the selection or list of resources may comprise a URL to the resource in question, a summary or excerpt for the resource, a hub-level and/or overall score, and a control for receiving a good or bad rating. An authenticated user 3102*a*, 3102*b* may locate a hub among a plurality of hubs retrieved via the search interface 3416 (e.g., by school name, hobby description, organization name, a friend's name or user ID, and so on). The user 3102*a*, 3102*b* decides to sign up with the hub (herein named "ABC"), and is presented with membership criteria (e.g., a minimum age of 18 and a pending IQ test passed with a score of 80 or above) and agreements (e.g., initial membership of scout, but be demoted to observer if no prize resources submitted by the user within three months of membership). Such criteria and agreements may be stored and maintained in the hub database 3202 or some other databases, which may also maintain other membership rules such as those for invitation, as well as rules about resources such as those for prize resource selection, public resource acceptance, resource import and export, and the like.

If the user 3102*a*, 3102*b* passes the criteria and accepts the agreements, then the user interface 3212 may create a membership relationship between the user 3102*a*, 3102*b* and the hub in the relationship database 3208, thereby realizing the adding of the user 3102*a*, 3102*b* as member to the hub. Otherwise, the signup process with the hub via the user interface 3212 will be aborted, and the user 3102*a*, 3102*b* will be notified as such. Upon successful signup with the hub, the user's hub list will now include the hub. As such, the user 3102*a*, 3102*b* in this example may now view up to six non-private-personal lists: two for global latest and prize resources, two for hub Friends123's latest and prize resources, and two for hub ABC's. The list maker 3214 retrieves the appropriate resources from the resource and relationship databases 3208 and produces the respective lists.

Later the user 3102*a*, 3102*b* discovers a webpage of interest (e.g., via the same or different user device 3110*a*, 3110*b*), and submits the URL to the webpage to the hub provider 3104 (e.g., via the resource submission interface 3418 on the hub provider 3104 website, or a resource submission interface 3418 on a third-party tool or website, or one on the webpage of interest itself). The user interface 3212 receives the resource submission via the communication interface 3210, and passes it to the submission handler 3216. (In some instances, the submission handler 3216 may also receive the submission directly without involvement of the user interface 3212.) The submission handler 3216 invokes the resource analyzer 3302, which checks if the resource already exists in the resource database 3206. Assuming the resource already exists in the hub provider as a whole but not in hubs Friends123 and ABC, the resource distributor 3304 will create a positive availability relationship between the resource (e.g., via its URL in the resource database 3206) and each of the two hubs in the relationship database 3208. Subsequently, other members of these two hubs may see the resource or a copy or excerpt of the resource along with its URL on the hubs' lists or selections of latest resources, which are updated by the list maker 3214. The submitter member or other members may add comments to the resource. These comments may be stored and maintained in the relationship database 3208 or other databases, and made available for view to all members of the same hub. According to some embodiments, members of other hubs which happen to have already included the resource in their latest and/or prize resource lists may also view these comments if both parties agree to export and import comments respectively in relation to a common resource.

As other members of hub ABC provide their ratings against the resource, the score generator 3306 is updating the hub as well as overall (i.e., provider-wide) scores for the resource in the relationship database 3208 or the databases where the scores are kept. The popularity of the resource in hub ABC may soon promote the resource to become a global (i.e., provider-wide) prize resource (as determined by the list maker 3214) when it has so far been unable to attain such a status despite being available to many other hubs for quite a while. The resource may have also received little attention in hub Friends123.

The same user 3102*a*, 3102*b* in this example may join another hub (herein named "XYZ"), with the same membership criteria and agreements as hub ABC (e.g., membership status changed from scout to observer if no prize resource submissions within three months of membership). Later when the user 3102*a*, 3102*b* fails to meet the criteria or fulfill the agreements (as determined by the membership controller 3308), the membership of the user 3102*a*, 3102*b* in the hub XYZ will be removed (e.g., as executed by the membership controller 3308 via the removal of the corresponding membership relationship entry in the relationship database 3208). The user interface 3212 may also notify the user 3102*a*, 3102*b* of such membership removal.

According to some embodiments, one or more hubs may be provided for each user 3102*a*, 3102*b* in a hub provider 3104. For example, a user 3102*a*, 3102*b* may have a hub comprised of membership established or otherwise grouped according to university attended, to the user's residence or geographical position (e.g., via location sensing modules or devices), to the user's professional status or position, to a business or organization, and so forth. In one embodiment, a common or global hub may establish or otherwise group all users 3102*a*, 3102*b* in a hub provider 3104.

Although the hub provider 3104 is described as being comprised of various components (the hub database 3202, the user database 3204, the resource database 3206, the relationship database 3208, the communication interface 3210, the user interface 3212, the list maker 3214, and the submission handler 3216), fewer or more components may comprise the hub provider 3104 shown in FIG. 7 and still fall within the scope of various embodiments. Likewise, fewer or more components than those shown in FIG. 9 may comprise the activity manager 3108 shown in FIG. 7 and still fall within the scope of various embodiments.

Figure 11:
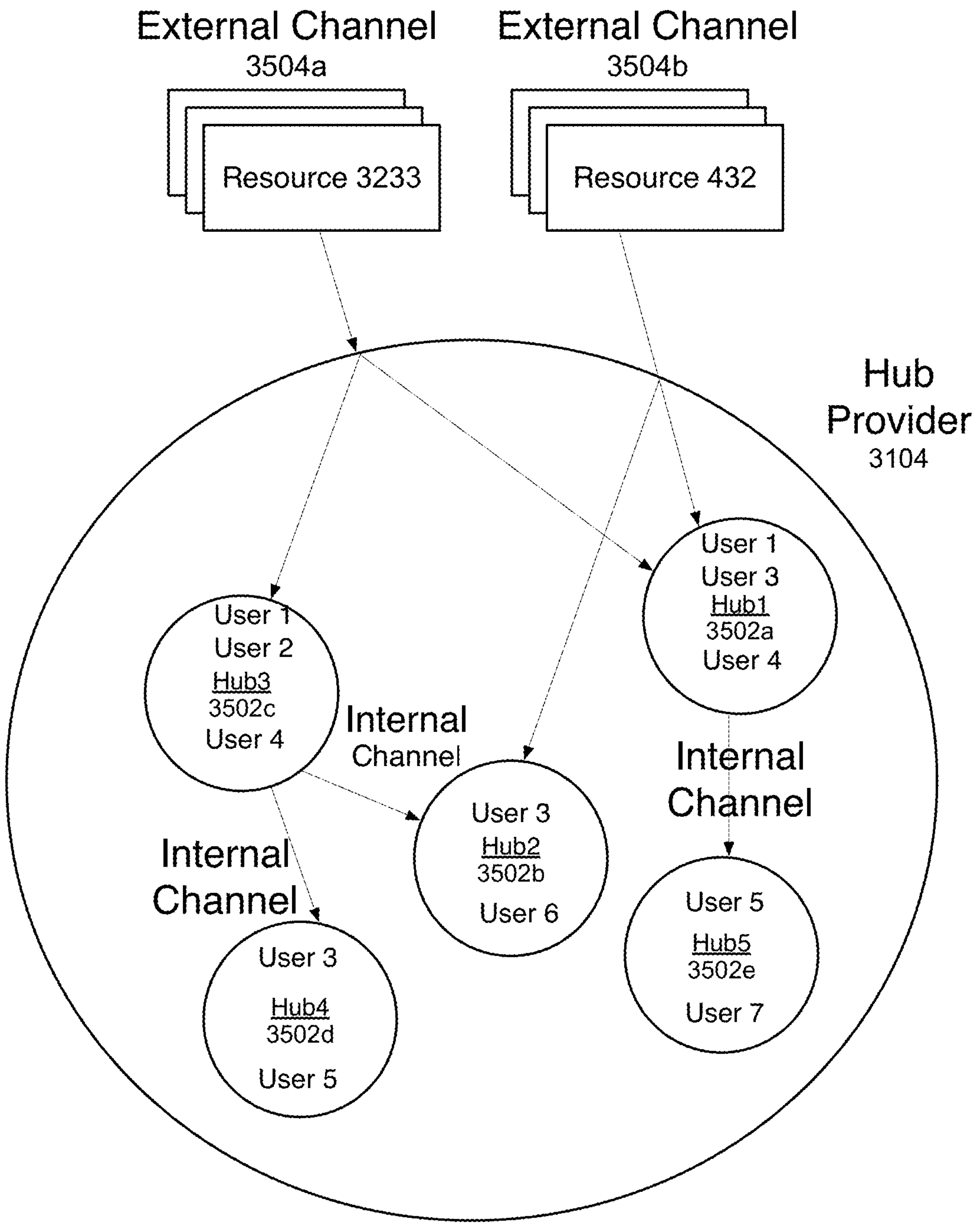
FIG. 11 shows a representation of a hub provider, and a hub-level prize resource list for five hubs, as well as the provider-wide prize resource list 3506.

FIG. 11 shows a representation of a hub provider such as the hub provider 3104 in FIG. 7, and a hub-level prize resource list for five hubs 3502*a*, 3502*b*, 3502*c*, 3502*d*, 3502*e*, as well as the provider-wide prize resource list 3506. There are two external channels of resources 3504*a*, 3504*b* that hubs in the hub provider may subscribe to or otherwise obtain resources from. These two channels 3504*a*, 3504*b* have Resource 3233 and Resource 432 respectively. Hub1 3502*a* and Hub3 3502*c* receive resources from the former channel while Hub1 3502*a* and Hub2 3502*b* receive resources from the latter channel. Hubs may also subscribe to or otherwise obtain resources from other hubs. For example, Hub2 3502*b* and Hub4 3502*d* receive resources from Hub3 3502*c*, while Hub5 3502*e* receives resources from Hub1 3502*a*. Hub1 3502*a* and Hub3 3502*c* are referred to as internal channels. A user may belong to more than one hub. For example, User1 belongs to Hub1 3502*a* and Hub3 3502*c*, while User3 belongs to Hub1 3502*a*, Hub2 3502*b*, and Hub4 3502*d*. According to one embodiment, a hub may specify criteria for selecting incoming resources from an external or internal channel. For example, a hub may only import prize resources from another hub. According to another embodiment, a hub may perform export control on its resources, whether created internally, or imported from external or internal channels. For example, a hub may make available only a subset of resources to other hubs for subscription, while restricting other resources for internal consumption only. The former may be referred to as public resources, while the latter as private resources with respect to the hub. All members of the hub may designate individual resources as private or public, or only those with certain privileges such as the hub owner or administrator may make resources public.

Figure 12:
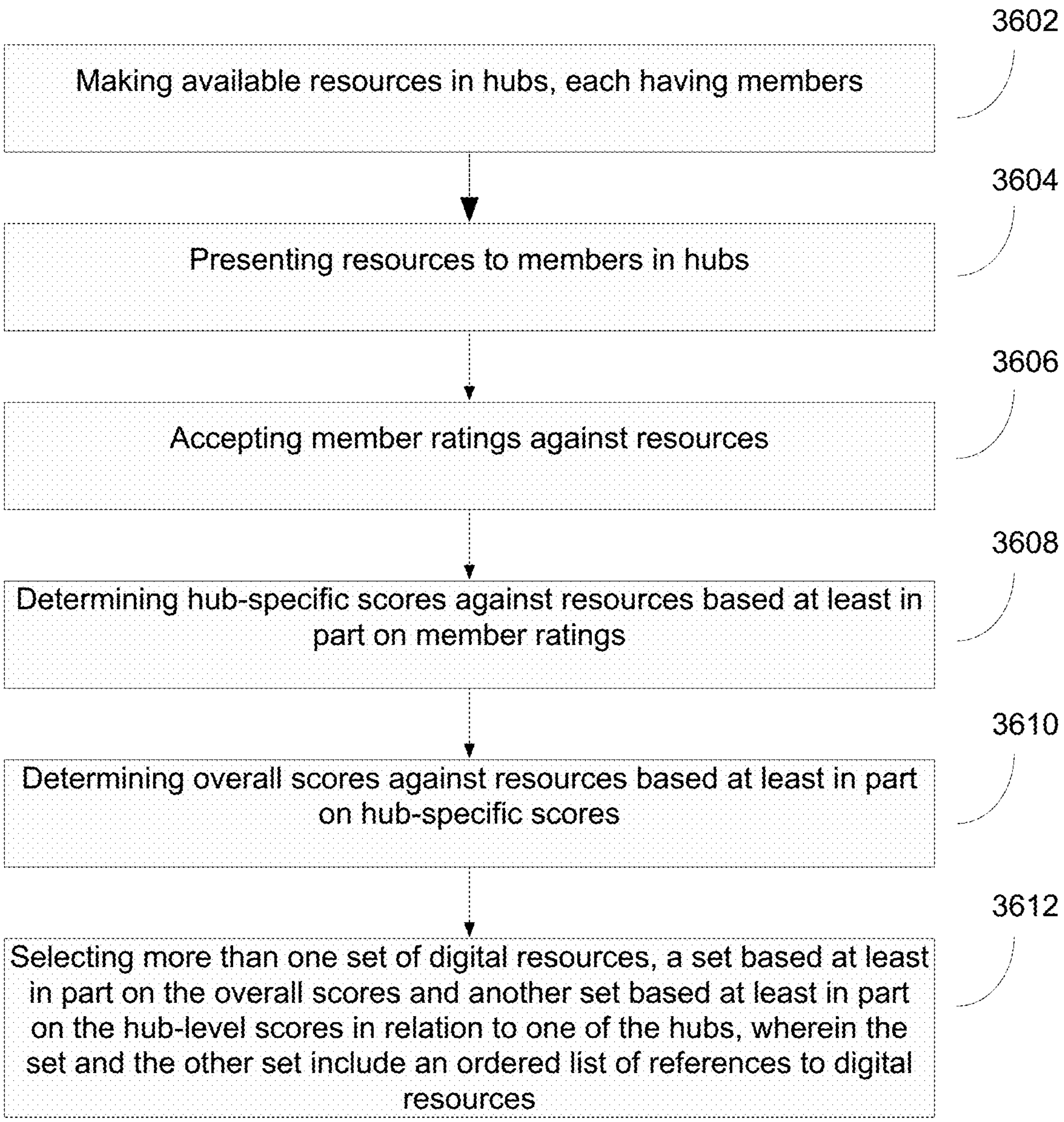
FIG. 12 shows a flow diagram of an exemplary process for selecting more than one set of digital resources among a plurality of resources via a hub provider.

FIG. 12 shows a flow diagram of an exemplary process for selecting more than one set of digital resources among a plurality of resources via a hub provider 3104. For instance, a user 3102*a*, 3102*b* via a user device 3110, 3110*b* such as one shown in FIG. 7 may make available 3602 one or more resources to a hub provider by sending or submitting their references (e.g., URLs) over a network 3104. The hub provider 3104 may comprise a plurality of hubs each having members, where the user 3102*a*, 3102*b* may be member to one or more of the hubs, subject to membership criteria and agreements, and other applicable constraints. The submitting may include sending a user ID (and password if not yet authenticated as a user 3102*a*, 3102*b* of the hub provider 3104), and other information, such as comment or some initial rating.

The hub provider 3104 may then make available the resource (and/or its representative reference, copy, or other equivalent entities or objects) to all the members of the hubs to which the resource is destined 3604, e.g., by the membership of the user 3102*a*, 3102*b* in the hubs, the policy in public resource acceptance of the other hubs, and the like. For example, the user interface 3212 of the hub provider 3104, upon receipt of the submission, may pass it to the submission handler 3216 which invokes the resource analyzer 3302. The resource analyzer 3302 may determine that the resource is not yet available to the hubs to which the user 3102*a*, 3102*b* is member, so it adds the resource to the hubs via positive resource availability entries in the relationship database 3208. The list maker 3214 may then make the resource available on the list of latest resources for each of the hub.

The hub provider 3104 may accept ratings from members whose hubs have the resource in question available 3606, and determine a hub-level or hub-specific score against the resource for each of the hubs 3608, based at least in part on these member ratings. For example, the user interface 3212 may receive a rating submission from a user 3102*a*, 3102*b* or user device 3110*a*, 3110*b* via the communication interface 3210. The user interface 3212 then passes it to the submission handler 3216 which invokes the score generator 3306. The score generator 3306 may update the score for the relationships between the resource and each of the applicable hubs in the relationship database 3208.

The hub provider 3104 may also determine an overall score 3610 against the resource based at least in part on its hub-level or hub-specific scores. Such overall scores associated with resources in the hub provider 3104 may drive, enable or otherwise facilitate the hub provider 3104 to select more than one set of prize digital resources 3612, the more than one set of prize digital resources comprising a set based at least in part on the overall scores, and another set based at least in part on the hub-level scores in relation one of the hubs in the hub provider 3104, wherein the set and the other set include an ordered list of references to digital resources, the references comprising URLs each accompanied by a score, the score being an overall score or a hub-level score. For example, the score generator 3306 may calculate and maintain an overall score (e.g., in the resource database 3206) for each of the resources in the hub provider 3104, in addition to updating their hub-level scores. The list maker 3214 may identify global prize resources 3402 based at least in part on these overall scores, and produce a selection or list of global prize resources 3402 accessible (e.g., via the user interface 3212) to all members of the hub provider 3104. Generation or production of such a selection or list may take place continuously, on-demand, periodically, or from time to time.

Similar to prize resources, a prize member may be determined at the hub level, for instance, based at least in part on his contribution to making available prize resources to the hub in question, and a prize user 3102*a*, 3102*b* based at least in part on the hub-level scores the resources that he has made available to the hub provider 3104 have received. (In an embodiment, a user may receive points towards his obtaining a prize status for resources he has made public that other hubs, i.e., those to which he is not a member at the time of submission, have then considered as prize.) A prize hub may be determined, for instance, based at least in part on the number or percentage of provider-wide prize resources made available by the hub in question over a given period of time, or based on the number or percentage of hubs per some category whose prize lists have included resources that originated from the hub.

A plurality of embodiments are specifically illustrated and/or described herein. However, it will be appreciated that modifications and variations are covered by the above teachings and within the scope of the present invention without departing from the spirit and intended scope thereof. For example, a hub provider 3104 may provide a set of rules or rule templates for various aspects of a hub-related maintenance and operations, such as those for membership admission, invitation and removal, and those for resource submission and (hub-specific) resource rating and list making. A hub owner or authority (e.g., the creator of the hub, one or more members elected by others in the hub, and so on) may choose among these rules or rule templates to form a specific membership policy for the hub. Rules or rule templates for changing existing rules may also be provided by the hub provider 3104. A hub may also be associated with an external or third-party component or system for conducting membership admission testing, such as an IQ test. The user interface 3212 may be configured to invoke such a component or system upon a user request for membership to a specific hub, cause the user 3102*a*, 3102*b* or the user device 3110*a*, 3110*b* to interact with the component or system, and then receive the testing result from the component or system. The user interface 3212 may also monitor how a user interacts or otherwise selects resources in the hub provider 3104 to generate (internal) rating submissions. A user 3102*a*, 3102*b* may also send the hub provider 3104 via a user device 3110*a*, 3110*b* a single submission comprising more than one resource and/or rating. The user interface 3212 may provide a search interface 3416 whereby a user may perform personalized queries against the resources in the hub provider 3104. For example, he may enter queries comprising keywords against only the resources he has submitted or rated positively. A user 3102*a*, 3102*b* or a hub authority may also specify criteria for filtering and sorting resources available to him or the hub. For example, a user 3102*a*, 3102*b* may hide a resource from his personal view either for his own private personal hub or another hub. Such a request and another subsequent change may cause the user interface 3212 to generate a rating submission against the resource, e.g., for the calculation of the overall score for the resource in question. A hub provider 3104 embodying the present invention may provide hubs in a specific category, including but not limited to advertising, retail goods and services, or news and journalism. A hub provider 3104 may also specify various categories of hubs (e.g., lifestyle, politics, science and technology, literature, and the like), where a user 3102*a*, 3102*b* may create a new category. A hub provider 3104 may stipulate that a user 3102*a*, 3102*b* may only join one hub per category, or become a voting or rating member to one hub (per category or per hub provider 3104)

while being allowed to be observer to all other hubs. A hub provider 3104 may detect or determine hubs common in interest and thereby suggest merging of these hubs. Users may also be recommended for membership to hubs or review of resources based on his interests that may be deduced or induced from his memberships with other hubs, his resource and rating submissions, or some other observations or testing, including but not limited to questionnaires and personality profiling. The hub provider 3104 may also identify and publicly recognize a user 3102*a*, 3102*b* or hub for his or its ability to discover prize resources, and award or otherwise assign a title or rank to the user 3102*a*, 3102*b* or the hub. Ratings or scores of such a prize user or prize hub may receive more weight than other non-prize users or hubs for hub-level or overall score generation. In embodiments, a user in a hub provider may not need to join or belong to any hub. He or she may be presented with a list of provider-wide prize resources.

A hub provider 3104 may comprise a plurality of hub providers 3104. For example, a system or website may be a hub provider 3104 for a number of news publishers each being a hub provider 3104 for its subscribers, who may join or create hubs of their interest. A hub may also comprise a plurality of hubs. For example, a hub may refer to a country and have state or province hubs, each further comprising city or town hubs. Ratings or scores may be amalgamated or consolidated for each higher level (e.g., by the summation of lower-level scores or some other schemes) for entities or objects of interest, such as resources, hubs, users and the like. A system or service may be equipped or otherwise embodying the features of the present invention in addition to its inherent functionality. For example, a search service or engine may initially partition or assign its users 3102*a*, 3102*b* into different geographical areas or locations each area or location being a hub, and allow them to join other hubs (of types other than geographical area or location, e.g., shopping, health, entertainment, travel, and so on). The users may join and quit any of these hubs freely in relation to their queries. The search engine may monitor or track resources selected by the users from search results, and the queries responsible for the search results. The user-selected resources may be considered as having better ratings than those not selected from the search results. Each resource may then be associated with a relevancy score for the hub(s) in question, while having a global relevancy score. In response to queries, the search engine may present the users with search results comprising groups of relevant resources or their references, one group corresponding to their overall relevancy scores, while each of the others corresponding to a specific hub. Relevant resources in more than one hub of interest (e.g., geographical location hub "Seattle" and context hub "Travel") may further be consolidated to produce a selection or list of resources based on their consolidated hub-level scores. For example, a logical hub of "Travel from Seattle" may be created (e.g., on the fly in response to queries from users having membership in both "Travel" and "Seattle") to account for resources that are applicable to both hub "Travel" and hub "Seattle", and assume their consolidated hub-level score (e.g., by summation of their individual hub-level scores, or some other schemes). A social networking website or system, or an application on the website or system, may provide its members with the provision to create hubs based on friendship, topic, organization or professional affiliation, brand, and so on. A peer-to-peer resource sharing website or system may allow its users to share music, videos or retail offers among groups or circles of friends or people, each group or circle being a hub. A member may share the availability of a song, video or retail offer with his peers in the group or circle, and provide indication or action interpretable as a rating, such as its being his favorite, a good deal, a purchase, a watched video, and so on. Some action or indication may result in a higher rating than another, e.g., a purchase resulting in a higher rating than being a favorite.

In addition to selections or lists of latest, prize, or controversial resources, a hub provider 3104 or individual hubs in a hub provider 3104 may include other types of selections or lists. For example, a list of pending prize resources may include resources that have attained some intermediary level of scores, so that users 3102*a*, 3102*b* or members may be led or otherwise suggested to view or review such pending prize resources so to obtain better consensus or more ratings on their way to being included in a prize selection or list. According to some embodiments, a hub provider 3104 could determine a resource that has a high negative score in one hub while a high positive score in another hub to be a prize resource for the latter hub and not the former, and yet consider both scores as a positive contribution to the overall score of the resource, for example, for a list of controversial resources.

Furthermore, a hub provider 3104 may also be equipped with facilities or components to allow users to generate their own digital resources, which may be derived from resources submitted from other users. For example, a user may create a resource comprising an incoming resource, and his editorial or opinion about that resource. A digital resource may also be specific to a certain type of resources and be created in accordance to some templates or guidelines. For example, an offer of goods and services may include an item name, seller information, price, and optional quantity. Membership to hubs or delivery of resources may require payment. A hub provider 3104 may be equipped with a component or otherwise configured to trigger a component or system to handle such payment. A submitter may also receive payments for resource submissions whose resources or their related or associated ads that have received a certain level of attention, e.g., becoming a prize resource. For example, an online newspaper may register as or otherwise become a hub, with subscribers as members and other content distributors/aggregators being hubs that receive news items from the online newspaper. Resource usage (e.g., impressions, clicks, transactions, and the like) may also be metered, e.g., for payment or revenue. A portion of such revenue may be distributed to users responsible for submitting or otherwise making available those resources.

Moreover, a resource may be a composite, comprising a plurality of resources, including resources of different categories or sources, e.g., ads on a new article, or still photos in a video, and so on. A reference to a resource may involve different scopes, e.g., a URL may refer to a single webpage or a website including all URLs comprising the URL. A resource submission may include annotations, tags and other information to qualify or otherwise annotate the resource, such as whether the URL refers to a webpage or a website, the topic to which the resource is relevant to, a summary of item, seller, quantity, and price to an offer, and so on. A reference to a resource needs not be explicitly available or accessible online to a user 3102*a*, 3102*b*. For instance, an brick-and-mortar retail offer comprising an item name, seller information and price may be presented or otherwise accessible via a list of offers, where a user 3102*a*, 3102*b* may choose one among the list, where the hub provider 3104 would maintain internal references to such offers. Answers from a user 3102*a*, 3102*b* to a series of questions may also help determine a resource without revealing the resulting resource(s), e.g., a personality profile or characterization, to the user 3102*a*, 3102*b*. How the chosen or resulting resources correspond to one another may be established or otherwise determined by the hub provider 3104.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on physical computer readable storage media, or embodied in signals in computer readable transmission media, the logic configured to perform methods of the invention. The examples provided herein are exemplary and are not meant to be exclusive.

"Protocol is the Context."

Embodiments of the present invention provide systems, methods, processes, and products for establishing one or more semantic contexts for dissemination and retrieval of digital resources such as those available on the Web, including but not limited to webpages, documents, multimedia presentations, computer executables, interactive programs, and any online information or resources, partial or otherwise. For instance, they make possible context-layer, context-level or context-aware communication between communication entities such as clients and servers, information requesters and providers, information senders and receivers, and so on, and enable a plurality of communication entities to transfer, interact with or otherwise handle digital resources via context layer or context-level protocols or interfaces. A semantic context, or simply context, refers to providing a denotation or setting for interpreting information in relation to a specific intent or subject matter (e.g., advertising, reviews, news, business and finance, entertainment, politics, science and technologies, medical and health, history, books and arts, scholastic and academic). A context may be thematic and self-contained. In contrast, an attribute (e.g., a length) may be a characteristic, property or quality inherent or subordinate to something, which it serves to qualify. As such, an attribute on its own may not be capable of providing a context.

According to one embodiment, a context for an interface (or protocol) may mean a primary context whereby a digital resource deemed relevant to the context may include contextually irrelevant content or data, as long as the primary content or data is consistent with or otherwise relevant to the context. For example, a webpage of a news article including ads may be served in a news context, as long as the news article itself is not of advertising. This is similar to a specialty television channel where the primary content of interest should be consistent with the claimed specialty (e.g., history), while ads may be exhibited during program breaks, or concurrently with the program runs, e.g., at the bottom margin of the screen. According to another embodiment, a context's definition is provided in a URI-identifiable (Uniform Resource Identifier-identifiable) or publicly available document. (This could be similar to how various IETF (Internet Engineering Task Force) protocols are defined in RFC (Request for Comments) documents.)

An interface, as herein referred to, defines a programmatic, access or communication point or a set of such points at which operative or communication entities such as independent systems or diverse components may interact, entailing certain service or protocol declarations or agreements. (Entities that provide the services of an interface may be referred to as interface service providers, while those that use the services may be referred to as interface service users. An interface service provider may be regarded as a service or server while an interface service user may be regarded as a user or client to the service or server.)

For instance, the following shows some example interface definitions or declarations:

(1) get(<location>)=>< >
(2) get(<location>)=><document>
(3) get(<location>)=>[Advertising]
(4) get(<location>)=>[Advertising]<document>
(5) getAdvertising(<location>)=><document>
(6) getGarbage(<location>)=>[Advertising]
(7) getAdvertising(<location>)=>[Advertising]

The first interface "get" makes no statement about the data type or format of digital resources being retrieved, nor the context to which such resources may be related. A source of digital resources is being identified by a location such as a URL. (Such a source may refer to some repository or service hosting or capable of locating digital resources.) The second interface "get" is also context-free, but it states that target resources for retrieval is of document type, e.g., a web page or a spreadsheet. The third interface "get" is context-aware, in that it states the semantic context of target resources is of advertising. A target digital resource needs not be a document; it could be a computer executable file, for example. The fourth interface "get" is also context-aware, and it states not only that the semantic context of its target resources is of advertising, but also that they are of document type. The fifth interface "getAdvertising" is context-free, even though the name itself may suggest that its target entity is of advertising. As far as an interface declaration or specification is concerned, the name of an interface provides identification and description, but does not necessarily make any declarative or binding statement on the acceptable types, let alone contexts, of the interface's input and output. That is, if the interface returned a document not of advertising, the interface service provider did not break its service agreement. In contrast, the sixth interface "getGarbage" declares to return some digital resource of advertising. If it returned a document not of advertising, the service provider of this interface would have broken its service agreement. The seventh interface "getAdvertising" is context-aware, and it has the same interface name as the fifth interface, though the latter is context-free.

A protocol, such as a communication protocol, may be considered as a form of interface. A protocol may provide a convention whereby communicably-coupled entities could send, receive, or exchange requests, responses or data via some communication link such as a connection, channel, path, memory, or any medium across between two endpoints or across an interface, whether physical (including wireless), programmatic (including procedure call stacks), or logical (including pipes and queues). When a communication link embodies an interface, there may involve two (or more) endpoints, each of which may be considered as an interface for each side or end of the communication in question. For example, a HTTP server may use port 80 (namely, the server port) for accepting requests while a HTTP client may use available ports other than port 80 (namely, the client port) for sending requests. There may exist a communication link between a HTTP client and a HTTP server when the former sends requests to and receives responses from the latter. The client in this case may regard the client port as its interface for sending requests to the server while the server may regard the server port as its interface for receiving requests from the client.

An implementation of a protocol may include client or server functionality when the protocol involves exchange of requests and responses between two communication entities, with one assuming the role of a client while the other, the role of a server. A server-side protocol implementation may be referred to as a protocol server, while a client-side protocol implementation, a protocol client. A protocol server or client may provide services for sending and/or receiving information over a communication link to and from its peer at the other end of a communication link. It may make available these services for third-party use (e.g., an interface service user) via a service access point or service interface, for example, an application programming interface (API). An example of such third-party use includes a higher-layer protocol client or server using the services of a lower-layer protocol client or server, such as a HTTP client and server using services provided by a TCP protocol client and server respectively, or a Web browser using services provided by a HTTP protocol client. According to some embodiments, a protocol client or server may include its protocol service user. For example, a Web browser may be regarded as a HTTP protocol client communicating with a HTTP server on behalf of a human user.

Information exchanged in accordance with a protocol may include overhead information such as those for connection initiation, maintenance or control. User content, information or payload of a protocol includes data or digital resources that may be received from or delivered to an interface service user or an application. For example, a file for transfer is a payload of FTP (File Transfer Protocol), while a webpage to retrieve is user data of HTTP.

Figure 13:
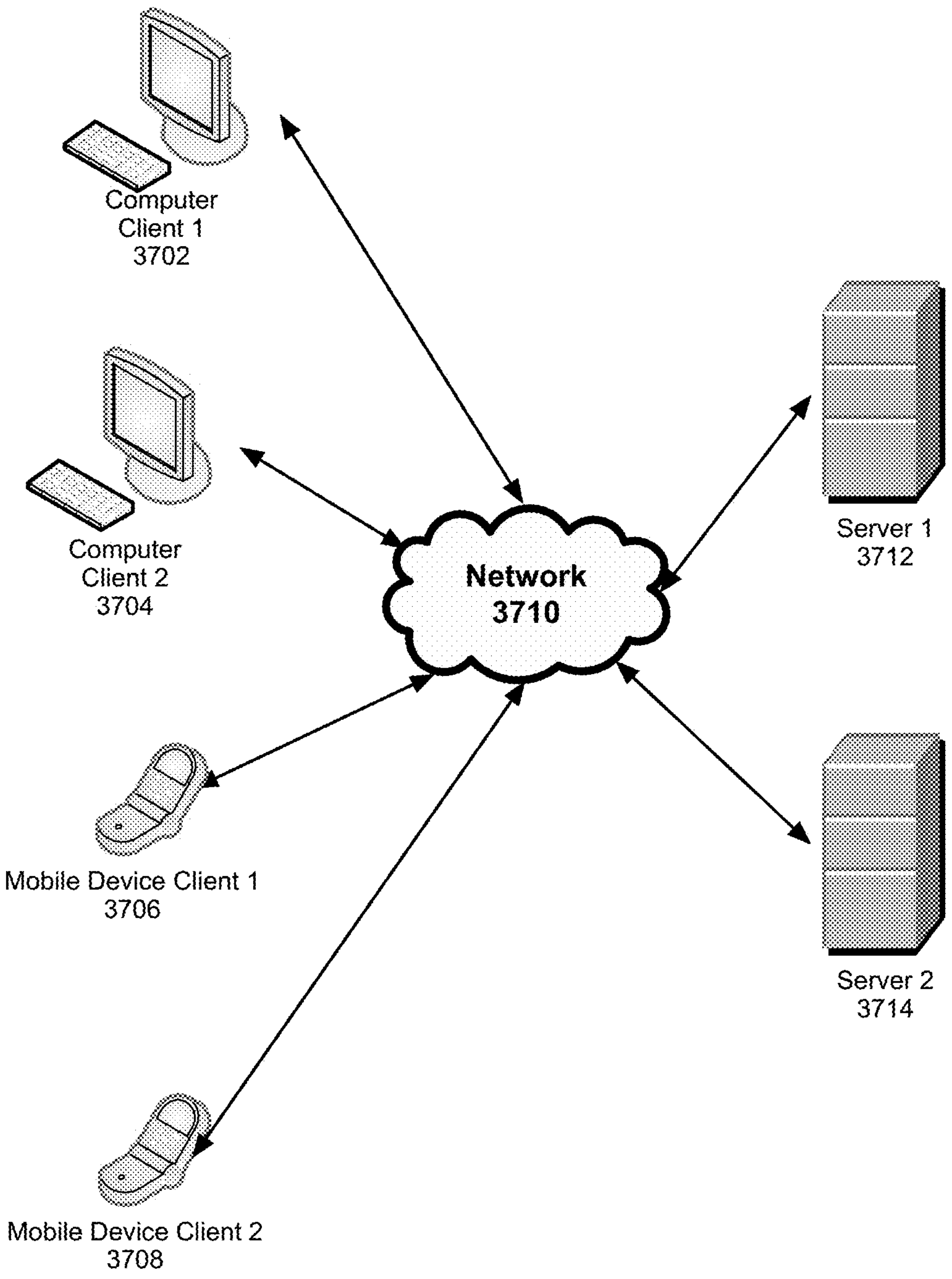
FIG. 13 shows a client-server communication in accordance with an embodiment.

FIG. 13 shows a system for retrieval of digital resources relative to some specific contexts according to an embodiment of the present invention. Portable and mobile devices and computers are example clients that may communicate with a server over a network.

The system may include one or more client computers and devices 3702-3708. A client is any general-purpose apparatus that can communicate with other computers or devices over a network and has the capability of connecting to the network 3710. In one embodiment, a client may be a portable or mobile communications device having the requisite functionality. The system may include a server 3712, 3714 such as a database server or a Web server. The server may be any general-purpose computer capable of storage, such as hosting a database or file system, and of communication with multiple clients over a network. The network may be an intranet, the Internet, the World Wide Web (i.e., the Web), or any other network, either closed or open, that includes one or more devices or applications that are communicating over the network. Clients and the server may communicate using a wired or wireless medium. A client may include a web browser when the server is a Web server. In addition, a client may also include an application resident in its memory (not shown) that may provide a user interface through which the client may receive input, instructions or directives from a user. In some embodiments, the user interface may reside as an extension to a software application and may be integrated into a web browser resident of client. In some other embodiments, a client and a server may be embedded into a single apparatus and communicate with each other. A server may also receive requests, responses or some other transmissions from another server. A server that sends a request or response to another server without prior solicitation from the latter is often referred to as a proxy server or a proxy. A client may also receive responses or some other transmissions from a server without specific corresponding requests, usually upon some prior authorization or setup. This is often referred to as notifications or events.

Figure 14:
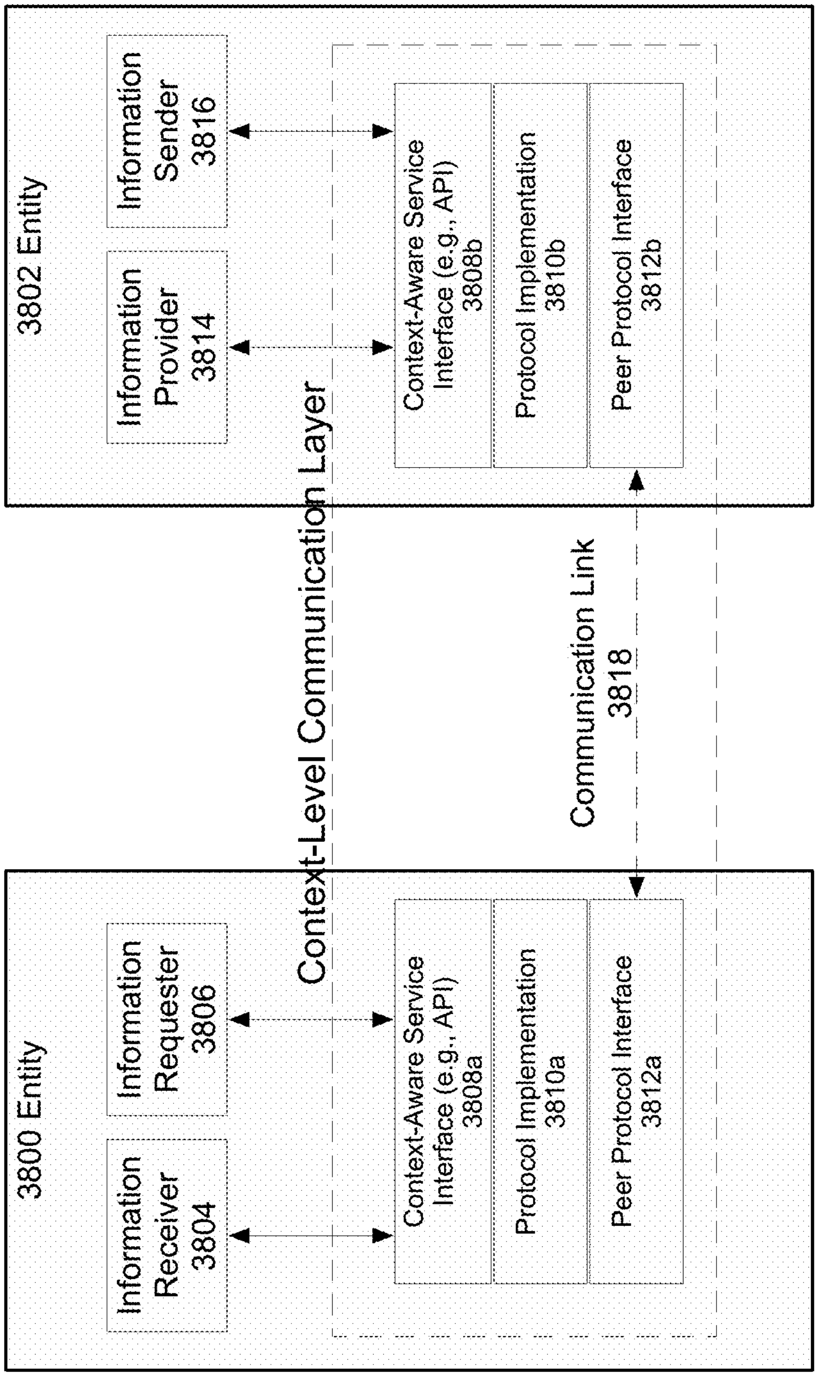
FIG. 14 shows a context-level communication layer in accordance with an embodiment.

FIG. 14 shows two communication entities, such as those embedded in or otherwise embodied by the clients and servers shown in FIG. 13, communicating via a context-level communication layer according to one embodiment. Each entity 3800-3802 comprises three components, which may be realized in software and/or hardware. A context-aware service interface 3808*a*-3808*b* or service access point component enables an information receiver 3804 (or requester 3806) and information sender 3816 (or provider 3814) to access and use services provided by a protocol implementation to receive and deliver context-denoted payload (such as data or digital resources). A protocol implementation component 3810*a*-3810*b* (e.g., a protocol client or server) may realize a specific protocol in accordance to some rules, specifications or roles. It may use services provided by other entities, such as those available from other communication layers. The layer that uses the services of another layer but not the other way around is often regarded as a higher layer in relation to the latter. A peer protocol interface 3812*a*-*b* (e.g., a TCP/IP stack) provides an endpoint for a communication link (e.g., a network socket) with another entity capable of communication via the same or compatible protocol. Below the protocol interface, a communication link can establish a connection via a physical link or a wireless channel. A communication link 3818 may also be encapsulated into or otherwise established upon another communication link to achieve its functions or utilities. For example, a payload of a higher-layer communication link may be encapsulated into or otherwise carried by a payload of a lower-layer communication link for delivery, e.g., the transfer of encoded data from one geographical location to another via a physical communication link (i.e., the lower layer) may be performed before the data may be decoded by a recipient application (i.e., the higher layer).

For non-physical communication links, there may be addressable identifiers (IDs) for identifying peer protocol interfaces or endpoints. For example, MAC (Media Access Control) addresses provide an addressable ID for interfacing with Ethernet and Token Ring network devices or adapters, which may be regarded as being capable of layer-2 communication as defined in the OSI Reference Model. IP (Internet Protocol) addresses provide an addressable ID for computers and devices communicable via the Internet or Web. Internet Protocol may be regarded as a layer-3 protocol in accordance to the OSI Reference Model. TCP (Transmission Control Protocol) port numbers provide a 16-bit addressable ID for one of the virtual interfaces that a TCP/IP-capable device may provide for interfacing with its applications and services therein. In accordance to the OSI Reference Model, TCP may be regarded as a layer-4 protocol that uses services provided by a lower-layer protocol, e.g., Internet Protocol, which in turn may also use services by a lower-layer protocol, e.g., Ethernet. Communication entities peer to one another would use addressable IDs suitable to their layer of communication to identify the specific interfaces of interest.

Addressable IDs may be independent or relative to addressable IDs at dependent or otherwise lower layers of communication. For example, IP addresses (OSI layer 3) may be regarded as independent from MAC addresses (OSI layer 2), even the former might map to the latter for effecting actual transmission of data from one computer or host to another. TCP or UDP port numbers (OSI layer 4) would require a layer-3 address (e.g., IP addresses) to identify a specific interface or endpoint for peer-level communication. For example, an endpoint of a bi-directional inter-process communication such as an IP socket may have an address comprising the address of the host where the process resides and that of an endpoint at the host. For instance, an IP socket address may comprise an IP address and a port number. In contrast, an IP address or MAC address on its own would suffice in this respect.

Peer interfaces or endpoints of some protocols, especially at the higher layers, may include or otherwise involve a reference to a digital resource (e.g., a user account, a software program, a file, a webpage), which may also be independent or relative to addressable IDs of some lower-layer protocols. Such inclusion or involvement may depend on specific connections, operations or payload that a protocol in question may support. For example, Telnet, an Application Layer or Layer 7 protocol according to the OSI Reference Model, may require or otherwise accept a user account for connection, when there are multiple user accounts available for Telnet connections. FTP and HTTP (both also of OSI layer 7) may accept a file path or URL (Uniform Resource Locator) to identify for retrieval, for example, a software program, folder, file or webpage. Such references to digital resources themselves may be regarded as interface or endpoint IDs in relation to these digital resources, especially when these resources may provide services or interactivity, such as a user account having specific access and operation privileges, or a webpage comprising hyperlinks, videos or spreadsheets.

In contrast to those at OSI layer 4 or below, protocol implementations of higher layers may use OSI layer 4 interfaces or endpoints to identify point of entries or access points for peer communication. For example, TCP port 80, an OSI layer-4 addressable interface ID, is designated as a well-known port for HTTP (i.e., layer-7) servers or services. While any available and unoccupied TCP port may be used by a HTTP server or service as the server or service's interface or endpoint for communication, port 80 is the official addressable interface for a computer, server or host to provide HTTP services. For example, the Web at large comprises a myriad of HTTP service providers accepting requests at port 80.

According to one embodiment, an OSI layer-4 addressable ID, such as a TCP or UDP port, may be assigned to or otherwise associated with a protocol implementation whose peer communication is relative to one or more contexts. According to another embodiment, a peer communication relative to a context (e.g., advertising) may be established in a layer higher than the Application layer of either the OSI Model or the TCP/IP Model, and references to digital resources of interest in relation to this communication may include URIs (Uniform Resource Identifiers), which comprise URNs (Uniform Resource Names) and URLs. For instance, a protocol implementation for a context-level layer of communication may listen to a TCP/IP or TCP/UDP port for accepting context-level requests for digital resources. According to yet another embodiment, a context's definition as well as the association between an endpoint and the context is provided in a URI-identifiable or publicly available document, such a standard or specification published or maintained by an organization or corporation.

In contrast, TCP or UPC ports like port 13 (associated with a so-called "daytime" protocol), port 17 ("quote of the day" protocol), port 43 (WHOIS protocol), ports 350 and 351 (for mapping of Airline Traffic over IP), and port 666 (for DOOM, an online game) provide an interface for obtaining data pertaining to debugging and measurement purposes (e.g., via a sequence of characters, including time information or an arbitrary message), to a particular system operation (e.g., an online game or air traffic system), or to a proprietary, centrally managed, or application-specific database (e.g., domain holder information), and not to a defined context with which information or digital resources having the same, equivalent or compatible context may be published, requested, or retrieved in accordance with the context.

For example, port 13 (for both TCP and UDP) provides a service to output a current date and time as a character string without regard to the corresponding input (e.g., whatever reference to a digital resource present in the request would be ignored). Port 17 provides a service to output an arbitrary short message, also without regard to the corresponding input. Although the name of the protocol associated with port 17 is called Quote of the Day protocol, the standard or definition of this protocol does not require sending of any actual notable quote, but simply a short message (without regard to the input). Hence a service implementing the protocol may send an arbitrary text (instead of any notable quote) without violating the standard governing or otherwise defining the protocol. In fact, the purpose of ports 13 and 17 is for testing and measurement. That is, any data (including any references to digital resources) received by their protocol servers or services implementing these protocols are ignored or discarded, and a sequence of characters expressing a date or a short message would be sent as response to their protocol clients or service users for the purpose of network testing and measurement, rather than anything useful in a given context. In addition, these testing and measurement ports are often disabled by default in a server or host for security concerns.

Ports 350 and 351 (both TCP and UDP) as well as 666 (UDP only) provide an interface for accepting requests for operation of a particular system, namely an airline traffic system and an online game system respectively. Port 43 (TCP only) provides a service to obtain registration information about an Internet domain (i.e., the WHOIS service). Usually only domain registrars would provide such a service. Domain names are managed under an administrative hierarchy headed by the Internet Assigned Numbers Authority (IANA), and only relevant to the operation, administration and maintenance of Domain Name System (DNS), a hierarchical naming system for computers, services, or resources connected to an IP-based network, including the Web.

According to one embodiment, a TCP port may be used for publishing or receiving requests for online ads using HTTP as an underlying context-ignorant transport protocol. Such publications and requests may be accomplished without any central administration or authoritative control, just like how digital resources such as webpages may be published and requested via HTTP over TCP port 80. According to another embodiment, an endpoint for communication of layer lower than the Transport layer may be assigned with or otherwise declared for a context, such as an IP address (i.e., the Network layer).

Figure 15A:
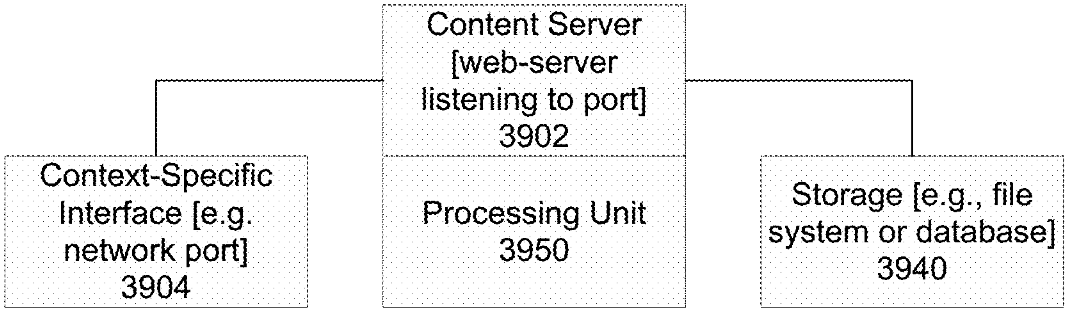
FIGS. 15A, 15B, and 15C show a number of systems capable of handling context-level requests in accordance with some embodiments.
Figure 15B:
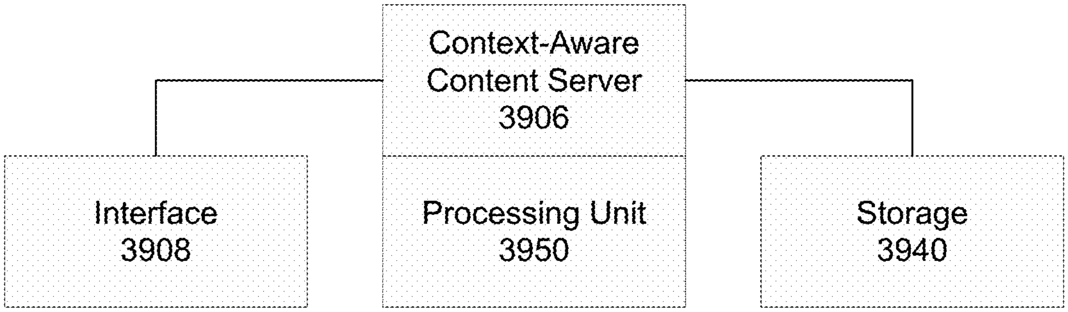
Figure 15C:
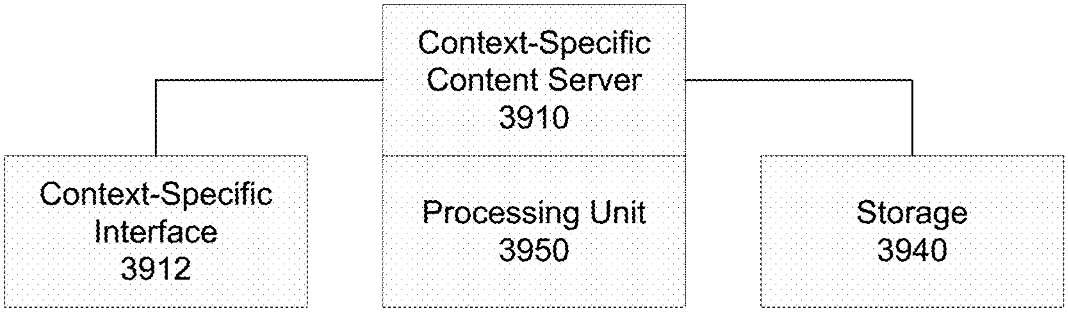

FIGS. 15A to 15C show three example systems capable of contextualizing digital resources in response to a request. Each example system comprises a processing unit 3950 (e.g., a processor coupled with an operating system), a storage device 3940 (e.g., a file system, a database), an interface (e.g., an endpoint capable of establishing or otherwise facilitating a communication link with one or more clients, the endpoint including both hardware and software necessary for such connection, virtual or otherwise, such as a network port), and a content server (e.g., a service having a protocol stack that may process requests and send responses including digital resources maintained in the storage, the protocol stack being a particular software implementation of a computer networking protocol suite or a collection of protocols for communication via the interface). According to one embodiment, a content server includes a plurality of protocol servers, the plurality of protocol servers having at least one protocol server capable of establishing or supporting a context-level communication layer, such as the one shown in FIG. 14.

FIG. 15A shows a system according to one embodiment, where there exists an interface 3904 which may be context-specific. For example, a TCP/IP port or IANA-maintained port may be designated for scholastic and academic content or for advertising of goods and services. As such, user-level or payload-related requests, responses, and messages sent to this interface or port are considered to be relative or in relation to the context.

Other types of requests, responses, messages, or data such as those for transmission control and protocol operation may also go through the interface or port, and yet they need not be considered as having bearing on any context. For example, between a Web browser and a Web server 3902 participating in context-level communication, a HTTP request for a webpage and a corresponding response including the webpage may be considered as a user-level data or payload-level request and response in relation to a given context. On the other hand, context-ignorant protocol data in support of a context-level protocol (e.g., those of TCP) may also go utilize the same port. A context-level Web server may also send context-irrelevant responses to its clients (e.g., for server capability queries or service timeout). According to one embodiment, only user data or payload requests and responses may be relative to a given context for context-level communication or in a context layer of communication. According to another embodiment, a context-specific interface may be defined as providing digital resources primarily for advertising of goods and services via HTTP, for example, through TCP/IP port 98 or 2040, which may be in contrast to port 80 the official or well-known port of the Web's context-ignorant HTTP interface. According to one embodiment, instead of the context-specific interface that receives requests for digital resources, another interface, which may or may not be context-specific, can be responsible for delivering those digital resources. According to another embodiment, an entire website (e.g., as identified by a domain name or IP address) may be regarded as a digital resource. Such a digital resource may provide other digital resources (e.g., web pages, videos, interactive programs). A computer or system hosting the website that listens on a context-specific network port, or otherwise serves via a context-specific interface, may contextualize the website as a whole. Depending on the definition or scope of a subject matter context, the website associated with the subject matter context may include contents not associated with the subject matter context per se. For example, a website associated with a shopping context may include webpages containing investor and management information, legal statements about the terms of use of the website, application programming interface (API) specifications for accessing services or contents of the website, and so on. According to one embodiment, a subject matter context of a website or a collection of web resources pertaining to a website indicates the overall nature of the website or the collection of digital resources pertaining to the website. An individual digital resource of the website needs not be consistent with the subject matter context in question.

FIG. 15B shows a system according to one embodiment, where there exists a content server 3906 which may be context-aware. For example, the content server may determine from protocol data, message metadata, or payload whether the transmission in question may be context-specific or what context it may belong to. According to one embodiment, a content server may be responsible for handling requests received via an otherwise context-ignorant interface 3908 (e.g., port 80 for HTTP), in addition to context-specific requests received via the same interface. As such, the content server may service HTTP requests just like a typical HTTP server would, except that the former may also handle context-specific requests and responses. For example, a context-specific protocol may also use port 80 as its contact or well-known port. A context-aware content server would service context-level messages, while still being able to recognize and process messages for the other and context-ignorant protocol sharing the same port, i.e., HTTP on port 80. Such a context-level protocol may or may not be a superset of this other protocol. A superset protocol often provides an extension to its constituent protocols wherein data for such an extension would be transparent to constituent protocol servers or handlers if they receive transmissions relative to the superset protocol. According to one embodiment, a context-aware protocol server needs not be able to handle messages of an otherwise context-ignorant protocol. According to another embodiment, a context-aware protocol server may determine or decide whether a message is context-specific via data or metadata carried in an otherwise context-ignorant or context-neutral protocol. For example, context indication, declaration or data may be specified as optional parameters in a URI, protocol data or payload metadata, and that their presence would not interfere with the operation of the context-ignorant or context-neutral protocol in question (e.g., HTTP). According to yet another embodiment, a context-aware protocol may handle requests or messages for more than one context. A digital resource may also be relevant to more than one context. For example, an online ad for airline tickets may be relevant to both travel and shopping contexts that may otherwise, according to one embodiment, be unrelated to one another.

FIG. 15C shows a system according to one embodiment, where there exists an interface a content server 3910 which may both be context-specific. For example, an interface 3912 of port 98 or 2040 may be assigned to the context of advertising of goods and services, while the content server responsible for that port is only capable of receiving and generating requests and responses whose digital resources of interest are provided in or otherwise primarily related to the advertising context.

Embodiments of the present invention may also provide asynchronous retrieval or receipt of digital resources via context-level protocols and interfaces. According to one embodiment, a system such as one shown in FIG. 15A to FIG. 15C may be configured or otherwise adapted to receive digital resources via a context-level protocol and/or interface. For example, a content receiver along with an interface, processing unit, and storage may receive digital resources via a contextualized endpoint. A content receiver may also implement or otherwise include a context-level protocol client capable of identifying incoming context-level messages or payload, similar to the manner or scheme in which a context-level protocol server may identify context-level requests or digital resources. According to one embodiment, a prior registration or configuration may be set up (e.g., establishing or installing authorization code, logon credential, secret token) so that the content receiver may perform authentication against the receipt or delivery of unsolicited or asynchronous receipt of digital resources.

Figure 16:
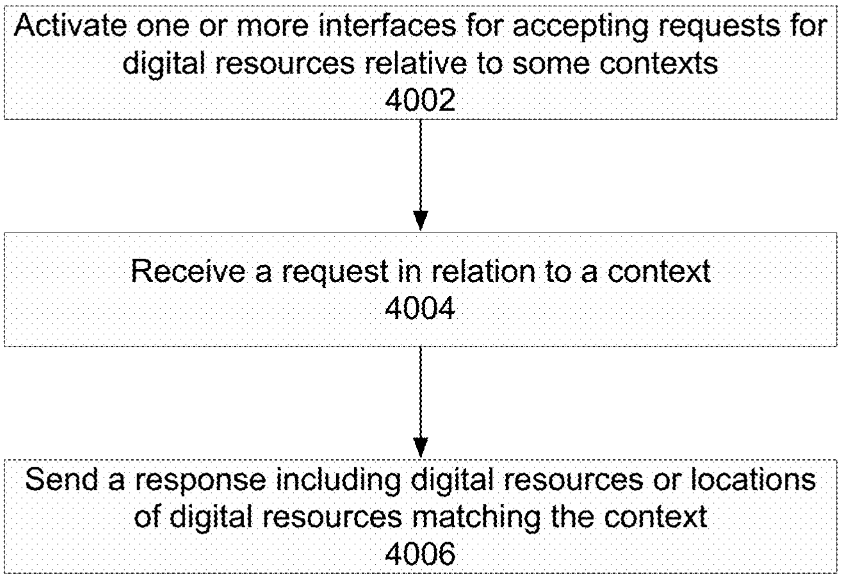
FIG. 16 shows a computerized method in accordance with an embodiment.

FIG. 16 is a high-level flow diagram for a computerized method that may be executed by a functional entity, such as a context-level protocol server, or a system such as one of those shown in FIG. 15A to FIG. 15C, according to one embodiment. Those of skill in the art will understand that various steps in the method (and in other methods described herein) may be added or combined without deviating from the spirit and purview of the embodiment. The high-level flow diagram is not limiting on any claims. As shown in FIG. 16, a system may:

(a) activate one or more interfaces for accepting a request for one or more digital resources, the one or more digital resources having relation to one or more contexts 4002;
(b) receive the request in relation to a context 4004; and
(c) send a response including a collection of the one or more digital resources or a collection of locations of the one or more digital resources, wherein the collection has relation to the context 4006.

The one or more digital resources may include digital resources identifiable by URI or accessible by HTTP or FTP. The request may include the URI. The activating may include assigning the one or more contexts to the one or more interfaces. The one or more interfaces may include one or more communication endpoints, the one or more communication endpoints including a TCP port or UDP port. In addition, the receiving may include receiving from a client while the sending may include sending to the client. The one or more contexts may include Advertising, Reviews, News, Science and Technologies, Medical and Health, History, Books and Arts, Scholastic and Academic. Each pair of the one or more contexts and the one or more interfaces may be associated with a URI-identifiable or publicly available standard or specification defining the context in each pair.

Figure 17:
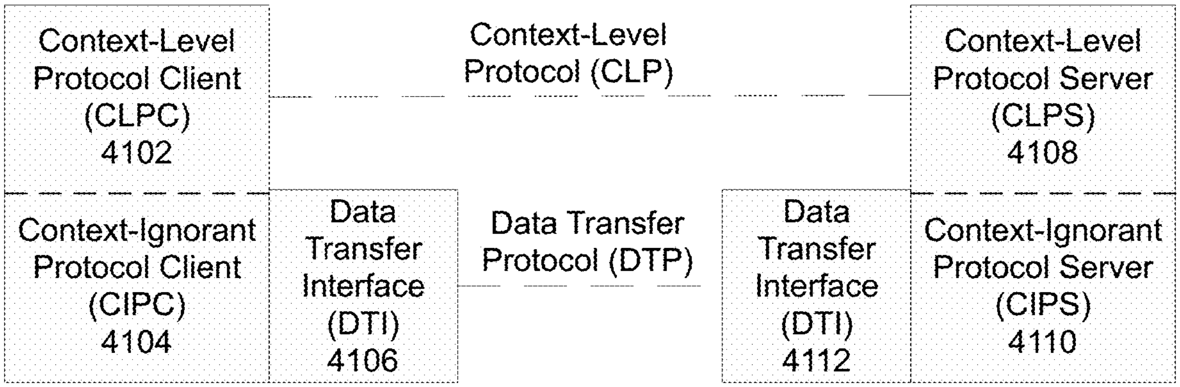
FIG. 17 shows multi-layer communication between a client and server via a context-level protocol, in accordance with an embodiment.

FIG. 17 shows a client and server capable of context-level communication, according to one embodiment. The client comprises three components: a context-level protocol client (CLPC) 4102, a context-ignorant protocol client (CIPC) 4104, and a data transfer interface (DTI) 4106. The server comprises a context-level protocol server (CLPS) 4108, a context-ignorant protocol server (CIPS) 4110, and a data transfer interface (DTI) 4112. A protocol whose purpose is to transfer data from one endpoint to another without regard to any context is herein referred to as a data transfer protocol (DTP). A protocol intended or used for communication or connection (virtual or otherwise) at a context layer or level is referred to as a context-level protocol (CLP).

Examples of DTP are TCP/IP and HTTP, where HTTP uses the services of TCP/IP. As such, HTTP is usually regarded as a higher level or layer protocol than TCP/IP. (HTTP is an application layer protocol while TCP/IP, a transport layer one, according to OSI Reference Model.) Examples of CIPS are protocol servers for TCP/IP and HTTP respectively, while examples of CIPC are protocol clients for TCP/IP and HTTP respectively. A CLPC or CLPS may rely on or otherwise use one or more DTPs explicitly for data delivery across two endpoints over a communication link. A protocol client or server may use services from some lower layer or level protocols without explicit knowledge or exposure. For example, a HTTP protocol server may use TCP services (Layer 3) that may in turn rely on Ethernet services (Layer 2) without the HTTP protocol server being aware of the latter. A context-level protocol server may use HTTP services without the context-level protocol server being aware of TCP services on which the HTTP services may rely.

A DTI may be context-specific or context-ignorant. For example, the status-quo well-known port 80 for HTTP may be regarded as context-ignorant, whereas the example of port 98 or 2040 having assigned the context of advertising (as described herein) may be regarded as context-specific. On the other hand, an interface may also simultaneously be context-ignorant with respect to one protocol or protocol server, while being assigned with one or more specific contexts with respect to a context-level protocol or protocol server. For instance, port 80 of HTTP may also be designated for use with a context-level protocol or communication link, with which a protocol server may accept, distinguish, and serve all requests arriving at that port, or otherwise direct the two different types of requests (i.e., context-level vs. context-ignorant) to their respective dedicated servers or handlers. A protocol server may also embed or otherwise comprise a plurality of individual protocol servers or handlers that may otherwise be distinctive from one another. In addition, a CLPS or CLPC may incorporate the functionality of a CIPS or CIPC instead of relying on services of an otherwise distinctive CIPS or CIPC for data transfer, the latter case being illustrated in FIG. 17.

Figure 18:
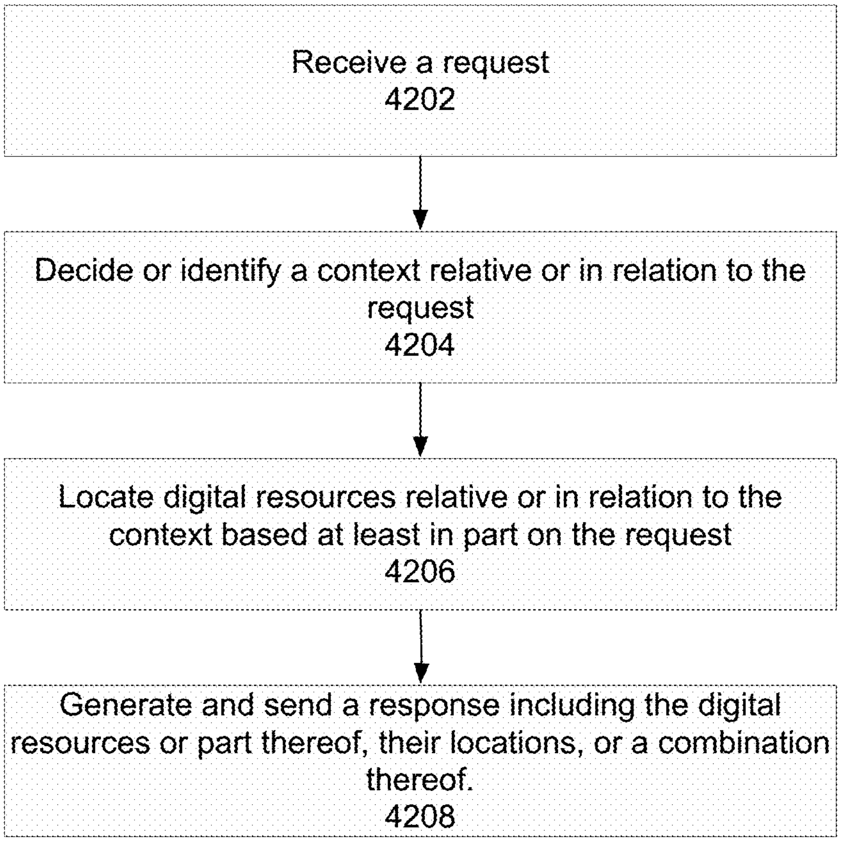
FIG. 18 shows another computerized method in accordance with an embodiment.

FIG. 18 is a high-level flow diagram for a computerized method that may be executed by a server, a communication entity or a content server, such as those shown in FIG. 13, FIG. 15A-39C and FIG. 17, according to some embodiments. Those of skill in the art will understand that various steps in the method (and in other methods described herein) may be added or combined without deviating from the spirit and purview of the embodiment. The high-level flow diagram is not limiting on any claims. As shown in FIG. 18, a server may:

(a) receive a request, wherein the receiving includes receiving from a client 4202;
(b) decide or identify a context relative or in relation to the request 4204;
(c) locate one or more digital resources relative or in relation to the context based at least in part on the request 4206; and
(d) generate and send a response comprising the one or more digital resources or part thereof, their locations, or a combination thereof, wherein the sending includes sending to a client 4208.

In addition, the server may relate an interface to one or more contexts, wherein the interface may include a communication endpoint. It may receive the request via the interface, wherein the request may include a reference to digital resources, the reference including a URI. It may then locate digital resources via the reference. Furthermore, the server may determine if the reference refers to the one or more contexts, wherein the determining includes looking up a table having entries each comprising a criteria for matching one or more references, and a corresponding context.

The server may identify dialogue questions in the request if the reference refers to the one or more contexts, generate dialogue answers for the dialogue questions, and include the dialogue answers in the response. (Dialog questions and answers would be described later.) Moreover, the server may identify the context in the reference, locate dialogue questions in the reference, and determine dialogue answers based at least in part on the one or more digital resources.

Figure 19:
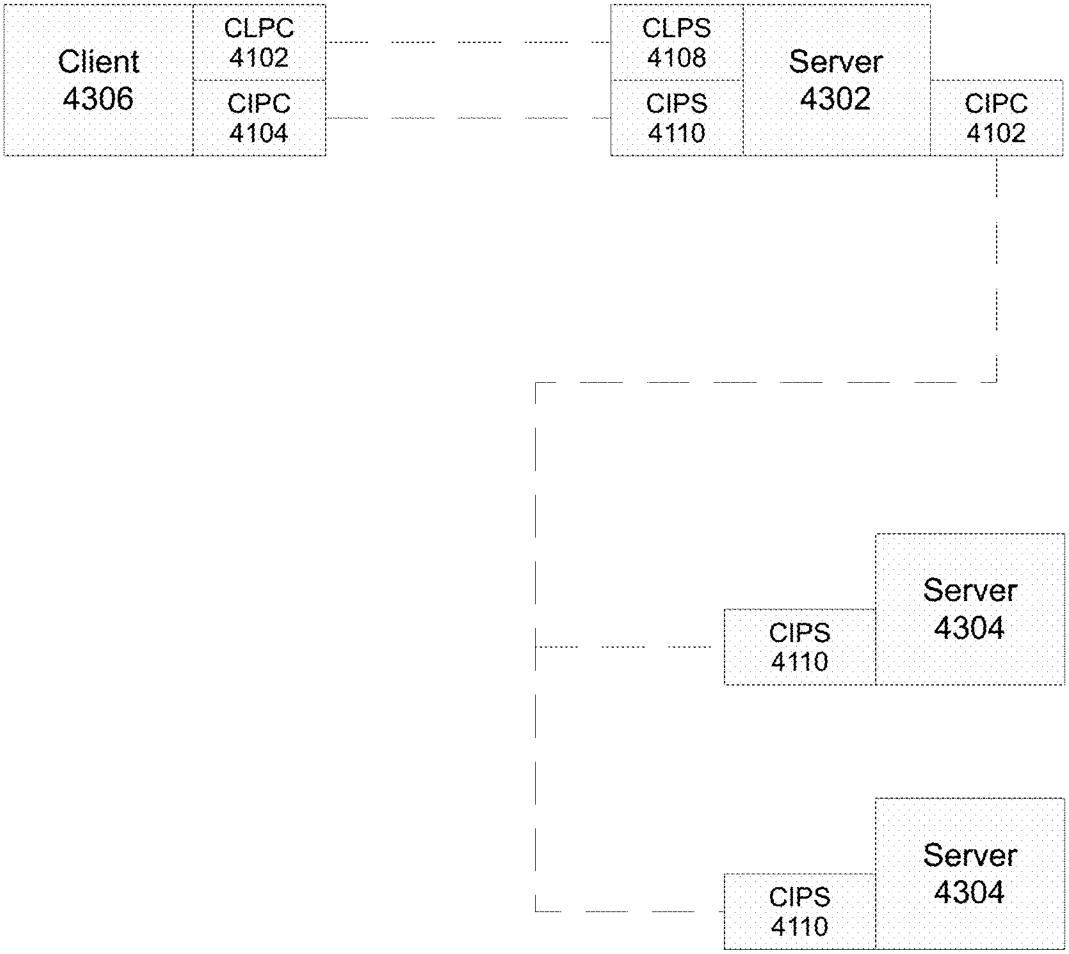
FIG. 19 shows a server acting as proxy for context-level communication in accordance with an embodiment.

FIG. 19 shows a scenario where a server 4302 embodying or otherwise equipped with a CLPS and DTI (no DTIs shown in FIG. 19; see FIG. 17) may serve as a proxy to another server 4304 that is otherwise context-ignorant, according to one embodiment. A client 4306 may send a server a context-level request (e.g., a request via a context-level protocol). The server may in turn request digital resources from one or more servers that are otherwise context-ignorant, and return them via a context-level protocol (e.g., a response including context-specific digital resources), thereby contextualizing these digital resources. For instance, such a proxy or a server having the capability of a proxy may contain information, e.g., via a directory, lookup table or database, that may help map a context-level request to applicable digital resources. For example, such a request may refer to an URL of a digital resource. Upon receiving the request, a proxy or proxy server may try to locate the URL from its database of URLs having the context that the request may correspond to or otherwise implicate. If the lookup is successful, then the proxy may retrieve the corresponding digital resource from another server having only CIPSs, and then forward it to the client of the request, both the server and client participating in a context-level connection or communication via their respective CLPS and CLPC. Alternatively among other possible options, the proxy may reply the client with a location of the digital resource so that the client may directly fetch or otherwise receive the digital resource in question from a server hosting that resource.

Figure 20:
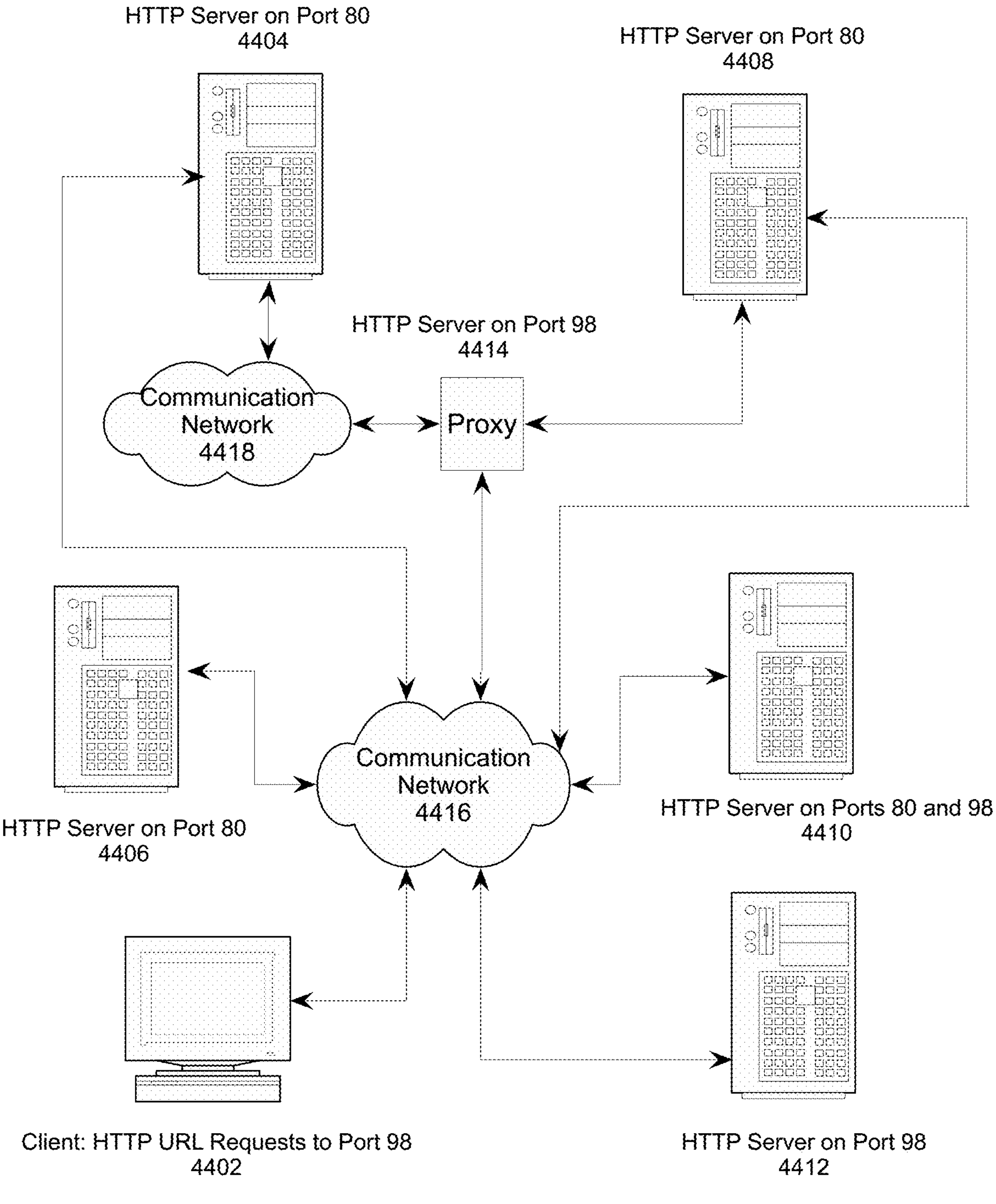
FIG. 20 shows a proxy and a plurality of servers involved in context-level communication in accordance with an embodiment.

According to another embodiment, a context-level proxy or proxy server may provide contextualization of digital resources via interfaces, such as a communication endpoint or a TCP/IP port, the contextualization including denoting requests for digital resources via a specific endpoint or interface as requests for resources about advertising of goods and services. For instance, FIG. 20 shows a client (e.g., a computer), a proxy server (or simply proxy), and a plurality of HTTP servers and communication networks (wireless or otherwise), according to one embodiment. Here port 98 is used as a context-denoted port. As such, HTTP traffic destined or otherwise addressed to the port would carry context-level payload, information or resources of interest consistent or congruent to the context associated with the port. For example, if the context is of shopping, then webpages whose primary concern is politics should not be requested or received through port 98. In contrast, the official HTTP port 80 makes no such contextual denotation or declaration, and cannot impose or demand any contextual integrity. According to embodiments of the invention, a declaration of a subject matter context (such as Shopping) of an interface, a network port, or a TCP/UDP port number is published in a publicly accessible resource or document. According to another embodiment, such a declaration is published in a standard or specification, such as one defined, maintained, or overseen by the Internet Assigned Numbers Authority (IANA), the Internet Engineering Task Force (IETF), or a private company.

In FIG. 22, the client 4402 is set up to send HTTP URL requests to port 98 over a communication network 4416. HTTP servers 4404-4408 listening only on Port 80 (namely, the official HTTP port) may not be reachable by requests from the client. While unavailability of these otherwise operational information servers might be regarded as a problem at the data communication level or for dissemination of digital resources via HTTP, it may be an advantage at the context level or for dissemination of context-denoted digital resources. This is so because the client by targeting port 98 indicates that it is interested in information or resources (such as a webpage) for a specific context. For example, a search engine crawling and indexing webpages obtained from port 98 would generate and maintain indexes comprising, maintaining or otherwise referring to context-denoted webpages. As such, the results from such a search engine would be much more contextually certain than those from a general-purpose search engine of port 80. As such, both information requesters and providers sharing the same context would be able to more reliably receive and publish digital resources of their interests by utilizing a context-denoted interface for communication between their respective clients and servers.

There are two HTTP servers connected to a proxy 4414 shown in FIG. 20. One is connected directly to the proxy while the other through a communication network 4418. Although these two servers are listening to or otherwise serving port 80, the context of some or all webpages provided by them may be denoted or otherwise made certain by the proxy that may handle context-level HTTP requests on their behalf (e.g., HTTP requests sent to port 98). For instance, the proxy may intercept or otherwise receive HTTP requests sent from the client. It would process the requests, e.g., parsing the URL in the requests for information on a host or server and its port (e.g., port 98), as well as a path identifying a webpage or digital resource. (A HTTP request of port 80 could bypass the proxy and go directly to the intended HTTP server, as illustrated in FIG. 20.) According to one embodiment, all digital resources of a server registered with or otherwise reachable by the proxy (e.g., via port 80) may be retrieved by context-level requests sent to the proxy (e.g., via port 98), thereby contextualizing all such digital resources. According to another embodiment, only a subset of digital resources of such a registered or reachable server may be contextualized. For example, a lookup table or rules such as URL pattern matching, either maintained by the server or its proxy, may further distinguish digital resources of a specific context from those without or otherwise with an incompatible one. According to one embodiment, the proxy may retrieve digital resources from a server, and then forward them to the client sending the request in question. Alternatively among other possible options, the proxy may reply the client with a location of the digital resources so that the client may directly fetch or otherwise receive them from the server.

FIG. 20 also shows a HTTP server listening on both ports 80 and 98. Such a server may be able to serve in both the context-ignorant Web (i.e., port 80) of the status quo and an alternative context-aware Web made possible by context-level interfaces. According to one embodiment, currently unassigned TCP/IP ports may be adopted or otherwise chosen as official or default context-level ports so to create one or more context-aware Webs or information channels, which may be placed under different jurisdictions, whether administrative, technical or otherwise. Such a Web or channel demands or otherwise declares an information space relative or congruent to one or more contexts. According to one embodiment, context-ignorant protocols such as HTTP and FTP as well as clients, servers and services available for the status quo Web may be re-used or otherwise applicable to these individual context-aware or channelized Webs. For instance, a single server may participate in both types of Webs, e.g., by serving both port 80 and 98 as illustrated in FIG. 20.

When there is more than one context for a given information space, the contexts may or may not be compatible with one another. For example, the context of wars and military and the context of shopping might be regarded as incompatible or otherwise mutually independent. Yet a Web or Web channel may be associated with both contexts, thereby regarding digital resources about wars and military or those about shopping as contextually relevant. On the other hand, a composite context may also be supported, so that a digital resource contextually relevant to it would also be contextually relevant to its constituent contexts. For example, an online ad for a video disc whose content is about a certain war may be regarded as relevant to the composite context of wars and military, and shopping. In addition, a context may comprise one or more sub-contexts, as will be discussed later.

FIG. 21A to 21D together illustrate how a protocol in embodiments of the present invention may establish an advertising context for user information or payload that may otherwise be context free. FIG. 21A shows an information requester 4502 asks 4508 for some information 4504 from an information provider 4506 via a context-free protocol. The information provider returns the requested information 921, void of context 4510. FIG. 21B shows an information requester asking for a specific piece of information 4520 of a specific name and on a specific location, also via a context-free protocol. The information provider returns the requested information, also void of context 4522.

FIG. 21C, similar to FIG. 21A, shows an information requester asks for some information 4530, except this time it is via a context-specific or context-making protocol 4534, e.g., for advertising. Although the information provider may have behaved the same as in FIG. 21A, the returned information 4532 is construed to be of advertising nature 4536, whereas in the scenario depicted in FIG. 21A there is no such revelation. The difference that exists between the two scenarios depicted respectively in FIG. 21A and FIG. 21C may be only the use of advertising-context protocol or interface over the use of context-free protocol or interface. In both cases, the information requester and provider may have performed the same actions. Yet the advertising-context protocol may provide preliminary meaning (i.e., context) to the information being requested and returned.

In FIG. 21D, both an information requester and provider may benefit from the semantic implication of using a context-aware protocol or interface on user information or payload in question 4540. Transfer of digital resources via a context-aware protocol or interface may provide an unambiguous context denotation that would otherwise be unavailable or difficult to ascertain. An information provider might find a piece of information of the same name and location as specified and requested by an information requester, but if it is not of the requested, expected or specified context, the information provider shall deem that there is no such relevant information 4542. Subsequently the information provider would not reply to the requester with that piece of information even it exists on the location as specified, as demonstrated in FIG. 21D.

According to one embodiment, a context-aware protocol may handle more than one context, and a default context may be established or otherwise implied if no context is explicitly specified. According to another embodiment, a context-aware protocol may support or otherwise handle context-ignorant or context-neutral payload, in addition to context-denoted one.

According to yet another embodiment, having a context established or otherwise declared for a communication link or endpoint, a protocol may provide capabilities to inquire about a digital resource in relation to the context. A client of such a protocol may obtain responses from a server hosting or otherwise providing the digital resource or a location of the digital resource, or from the digital resource itself (e.g., a running computer executable referenced by a URI or URL). Exchange of context-level inquires and responses about a digital resource between a requester and a provider may herein be referred to as dialogue. A context-level inquiry and response may also be herein referred to as a dialogue inquiry and a dialogue response respectively. A dialogue inquiry may comprise one or more questions (namely, dialogue questions), while a dialogue response may comprise one or more answers (namely, dialogue answers). A dialogue inquiry requester or dialogue inquirer may send via an advertising context protocol an inquiry comprising dialogue questions as well as other requests, such as a request for the possible formats of seller addresses, or a request for seller addresses in a specific format. Likewise, a dialogue response provider or a dialogue responder may send a response comprising dialogue answers as well as other results, such as those corresponding to requests not at the context level.

According to one embodiment, an advertising-context protocol may provide services for inquiry of information about a product or service that a digital resource may represent or otherwise have data for, such as its detailed specification or after-sales warranty information, the seller's address and rating information, and shipping and handling costs for a specific location of a prospective customer. According to one embodiment, a digital resource may represent or otherwise has data for more than one product or service. Questions or inquiries may be specific to a certain type of products or services. For example, a question "What is the product's 'best before' date?" may be applicable only for perishable goods.

A context-level protocol or protocol client may interpret or otherwise process dialogue answers for its own operation or on behalf of an information requester, or simply pass them back as the protocol's user information or payload for processing and manipulation by a protocol service user (e.g., an application such as a Web browser) or a higher-level or layer protocol implementation, whether a human, a piece of hardware, a software program, or so on.

A dialogue question or answer may specify a framework or format that information in an answer or response would adhere to. For example, a freeform answer may comprise a piece of structure-free content such that there may be no structure within the content of the answer for guided parsing and interpretation, although the content as a whole is still associated with a context relevant to a given question. For example, the answer to the question "Seller's Address" in freeform could be "1213 First Avenue, Vancouver, Washington, USA 91021". A structured answer, such as that of AVP (Attribute-Value Pair), may be:

Street="1213 First Avenue"
City="Vancouver"
State="Washington"
Country="USA"
ZipCode="91021"

An attribute may be associated with a definition of meaning while a value with a definition or format. For instance, a structured answer, such as that based on RDF (Resource Description Framework of the Semantic Web Initiative by W3C—the World Wide Web Consortium), could provide much more precise definitions to street, city, state, etc. so that there should be no semantic ambiguity of what each piece of data means in accordance to some semantic definitions specified elsewhere. There may be other possible frameworks or formats suitable for use in the specification of dialogue answers or responses.

According to one embodiment, a context-level protocol may allow a dialogue inquirer to specify preferences for formats or frameworks in which answers shall be provided. It is up to whether a dialogue responder may fulfill such preferences. A context-level protocol may allow a dialogue inquirer to stipulate that certain dictionaries be used to provide for term definitions of an answer that should follow a given framework or format.

For example, a plurality of dialogue questions may be specified for a given context. Digital resources relevant to the context may result in dialogue answers to these questions. With advertising or shopping context, possible dialogue questions may include "What is the product name?," "What is the product specification?" and "What are the customer satisfaction ratings of the seller according to Rating Agency X and Rating Agency Y?". A dialogue inquirer such as a search engine or crawler may post, send or otherwise search dialogue questions to or against digital resources via a context-aware protocol. Digital resources or protocol servers found ignorant of these questions may result in the digital resources in question deemed contextually irrelevant. Those found capable of containing or handling dialogue questions may result in the digital resources in question deemed contextually relevant. Specific answers to those dialogue questions would afford a search engine or service to provide context-specific results with better relevancy or precision, such as when serving a query in relation to a particular product from a seller of a particular location with a specific customer satisfaction rating.

According to one embodiment, dialogue answers may be embedded in a digital resource to which they may be applicable, or be maintained and served as metadata to the digital resource. They may be identified by their corresponding dialogue questions, which may be specified by computer-readable codes or human-readable text. A context-level protocol may locate dialogue answers therein and deliver them to dialogue inquirers as if sent or otherwise provided by a dialogue responder. For example, a search engine or service equipped with an embodiment of the present invention may be able to identify and include digital resources such as webpages that are relevant to a certain context of interest, such as advertising or review of products and services, and exclude irrelevant ones, so to create and maintain a context-specific search index or service. According to another embodiment, a dialogue question (or a dialogue answer identifier or referrer) may be specified or otherwise identified as a markup tag (such as those on a HTML-authored page) and the corresponding dialogue answer may be specified as data to the markup tag. Such a dialogue question and/or answer may be hidden from visual presentation of the digital resource in or to which it may be specified or otherwise belong. Or it may be included as part of the visual presentation, with the tag optionally being indicative of some stylistic implication (such as boldfacing the dialogue answer) or associated with some other data (such as a hyperlink).

FIG. 22A to FIG. 22D provide an illustration of interactions between an information requester and an information provider through a protocol in embodiments of the present invention, and how they act as dialogue inquirer and dialogue responder respectively.

FIG. 22A shows that an information requester specifies a digital resource for retrieval 4602. The digital resource is referred to by a web address (e.g., www.abc_store.com/stereo_systems). An information provider replies 4604 with the requested advertising digital resource. (Note that many may consider a web address is equivalent to a URL (Uniform Resource Locator), which includes an access scheme or protocol part, e.g., the "http://" or "http" in http://www.abc_store.com/stereo_systems. The term "web address" as used herein does not necessarily include an access scheme or protocol part.)

FIG. 22B shows an information requester asking 4606 for addresses of the seller associated with a particular advertising digital resource. An information provider capable of such dialogue may reply 4608 with the requested addresses. If there is no specified reply format, then the addresses are deemed to be in a default format, e.g., in freeform.

FIG. 22C shows an information requester asking 4610 for seller addresses associated with a particular advertising digital resource, and demanding the reply in a specific format. An information provider replies 4612 none, even though the digital resource may exist and the information provider is capable of such dialogue, because none of the available addresses is in the requested format.

FIG. 22D shows an information requester asking 4614 for information not of advertising nature. The requester asks whether the protocol supported by an information provider is of version 2.3 or higher. Some designation (such as "check" as shown in FIG. 22D) that appears in a protocol request may indicate that the requested information is not of advertising nature. The corresponding API for this request may explicitly state that the user information in response to this request is not a context-level payload of the protocol. For example, the API for FIG. 22D indicates the reply 4616 would be of a Boolean data, i.e., either true or false, and not of any specific context, namely advertising.

Note that a digital resource may represent a single product or service, and may act as dialogue responder. In addition, an information requester or dialogue inquirer may not need to specify a reference to the digital resource as part of a dialogue question if it has already addressed or otherwise identified the digital resource as part of the communication link between the information requester and provider or between the dialogue inquirer and responder.

Figure 23:
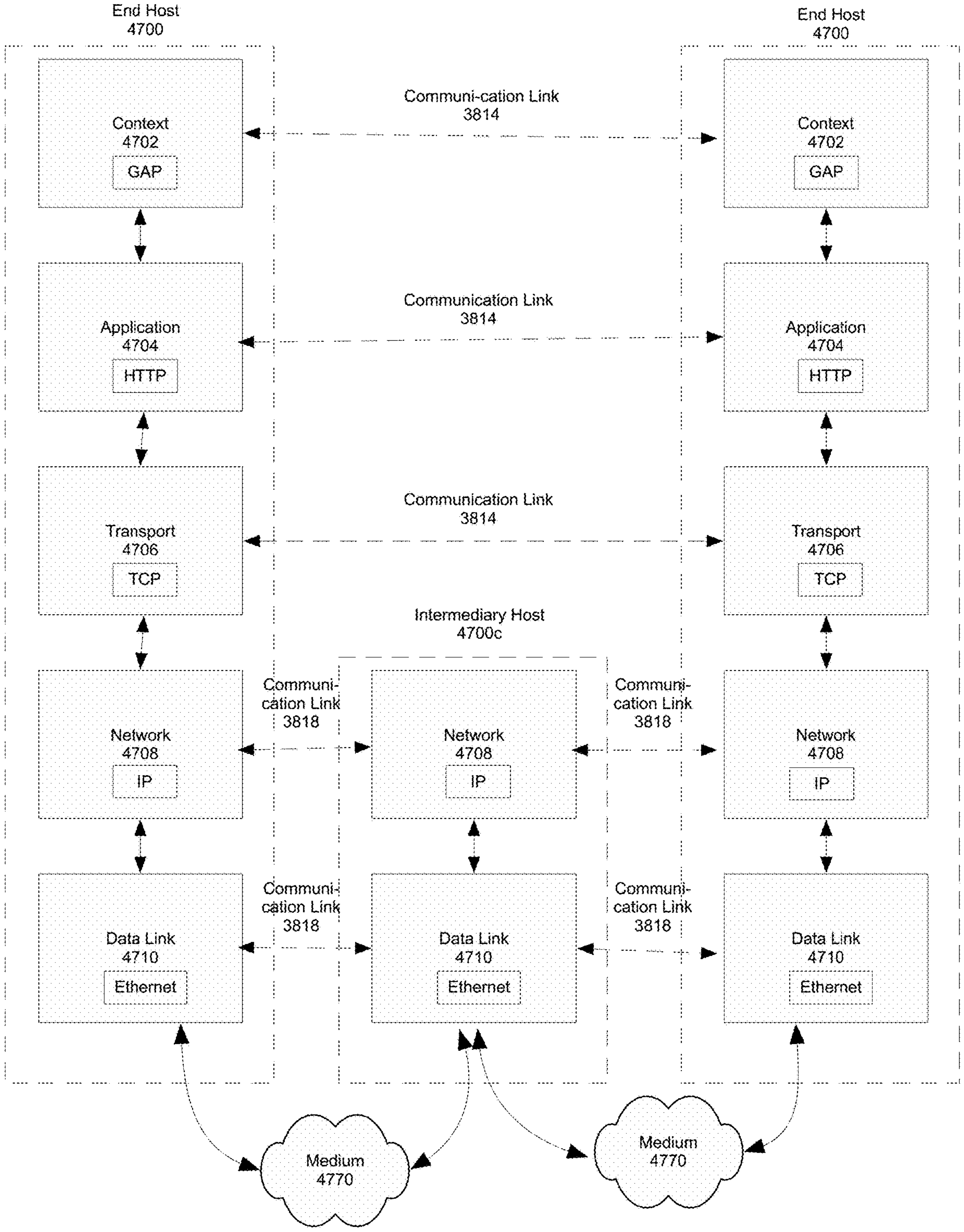
FIG. 23 shows a layered communication model including a context layer in accordance with an embodiment.

FIG. 23 shows an ARPANET (Advanced Research Projects Agency Network) TCP/IP Reference Model (or simply TCP/IP Model) equipped with the present invention, according to one embodiment, as implemented in end host 4700. The reference model comprises five layers of communication. A protocol is given as an example for each layer: Ethernet for Data Link Layer 4710 (which, as depicted, may communicate via communication link 3818 or medium 4770), IP (Internet Protocol) for Network Layer 4708, TCP (Transmission Control Protocol) for Transport Layer 4706, HTTP for Application Layer 4704, and GAP (Global Advertising Protocol) for Context Layer 4702. GAP is a context-level protocol for advertising of goods and services. An intermediary host 4700_c_ may comprise a network layer 4708 and a data link layer 4710. Multiple protocols may exist for the same, compatible or similar context, and may assume different names, such as Shop or Ad. According to one embodiment, a context-level protocol may be published in a standard or specification, such as one defined, described, or maintained by the Internet Engineering Task Force (IETF) or a private company.

As illustrated in FIG. 23, GAP uses services provided by HTTP (Hyper-Text Transfer Protocol), a common-place communication protocol for use on the Web. Other protocols at lower layers may also be used by GAP, such as HTTPS, an extension of HTTP to include security functionality. Note that some define the Web as a complete set of hypertext documents available on the Internet that are accessible through HTTP. However, since protocols such as FTP are also supported by web browsers using the same URL (Uniform Resource Locator) syntax to retrieve digital resources or online entities, accessibility through HTTP may be considered by some to be an insufficient defining characteristic of the Web.

The basic syntax of an address in form of URL (Uniform Resource Locator) for locating a HTTP-accessible resource on the Web is as follows:

http://<authority>[/<path>][/<object>][?<query>],
where:

A part is represented by a token with a pair of enclosing angular brackets, such as <authority> for an authority part. Parts delimited by a pair of square brackets mean optional. <authority> may be optional too if the HTTP request is for a local host. URL also supports a fragment part that is not shown in this basic syntax above.

The term <authority> refers to a resource-serving host, and comprises an optional <userinfo> in the form of <username>:<password> terminated with "@" (e.g., johndoe: mypassword@), a hostname in the form of a domain name or an internet protocol address (e.g., www.example_forsales.com or 134.12.13.23), and an optional port number (with default port 80) preceded by ":".

The term <path> is a sequence of subdirectory-like abstract containers separated and delimited by "I" (e.g., cars/honda). When <path> is absent, the logical root of the resource repository on the host may be considered.

The term <object> is a location-invariant handle that identifies on a host a specific local object or digital resource, which usually takes the form of a file (e.g., index or index.html), but not necessarily so. When <object> is absent, a default object (e.g., index.html), if any, in the identified logical location of the resources repository would be considered.

The term <query> is a series of name-value pairs in the form of <name>=<value>, separated and delimited by "&" (e.g., clientName=John&gender=Male). They are not used as any special queries specific to HTTP itself. An application that uses HTTP queries may specify name-value pairs that are meaningful only to information requesters and providers involved in the HTTP communication.

The following is an example address (e.g., URL) for a HTTP-accessible resource:

http://john:passwd@www.uspto.com:80/patents/index?clientId=1010

A more common syntax seen by web users would be:

http://www.uspto.com/patents/index?clientId=1010

A HTTP information requester (namely, an information requester using HTTP) such as a web browser or some other software capable of HTTP can get a URL from many sources, such as user input, web pages, a plain-text file, and a database. The requester would then formulate a HTTP request message based on the selected URL, and send it away via HTTP. The implementation of the underlying transport protocol (i.e., TCP—Transmission Control Protocol) of HTTP would be responsible for the delivery of the request message to its counterpart at the host specified in the URL. When an information provider on the destination host receives the request through HTTP, it or its agent would interpret the request, and return the requested resource if the resource exists on the host, regardless of the context that the resource may belong to. GAP (Global Advertising Protocol) information provider, on the other hand, should not return the requested resource (namely, a target digital resource or digital resource) even if the named resource exists on the host, when the context of the resource is not of advertising. That is, HTTP is a context-free protocol in relation to GAP, whose target entities or user-level payloads are of advertising nature. An example URL of GAP is as follows:

gap://www.example_cars_for_sales.com/honda/

In this example, whether a GAP information requester should receive the referenced resource depends not only on its existence on the referenced host location (i.e., www.example_cars_for_sales.com/honda/), but also the context of the referenced resource. A GAP information provider will reply with the requested resource only if the resource is of advertising nature. In the other words, HTTP will retrieve the resource, but GAP will not do so should the requested resource is not of advertising. (According to one embodiment, the context information of a digital resource may be maintained as metadata stored in the digital resource. According to another embodiment, it may be stored in a lookup table or index external to the digital resource.) However, a GAP information provider can "lie," in that it returns resources of non-advertising nature to a GAP information requester. GAP protocol users (i.e., both GAP information providers and requesters) that do so behave like a software component that does not act in accordance to its interface specification in a distributed software system, or like a licensed specialty television channel for shopping that broadcasts history shows as its regular programming. Such GAP information providers shall be regarded as malfunctioning or violating a protocol's interface service agreements.

To realize an implementation of GAP, a HTTP interface (including its URL) and implementation may be modified as per following specification. Likewise, to realize a GAP information provider and requester, a HTTP information provider and requester may also be modified accordingly.

First, the protocol or access scheme part of URL is "gap" (which stands for Global Advertising Protocol). Then two optional parts, namely <options> and <inquiry>, are added as follows between <object> and <query> in the URL syntax, as shown below:

gap://<authority>[/<path>][|object>][*<options>][|<inquiry>][?<query>]

Note that both the asterisk and vertical-bar characters would then become special characters, or characters reserved for the use by the protocol for special meanings. The <options> part, with an asterisk character "*" as a marker prefix and delimiter, provides alternatives to the default behavior or mode of operation of the protocol. (Multiple options may be separated by "&".) Exemplary alternatives are described in the following paragraphs.

The part context=<on or off>: this allows the retrieval of resources not of advertising nature. E.g.: "gap://www.example_onlinestore.com/nikeShoes/history*context=off". (This may be optional for questions in <inquiry> if those questions are already unambiguous in their context relevance in relation to the target digital resource in question. For example, a question like "what is the protocol's version?" is self-evident in its context irrelevancy.)

A part entityFormat=<format>: this specifies the expected format(s) of the requested digital resource. Examples of possible formats are dontCare (the default), freeform, markup, nvp (name-value pair), and rdf (Resource Definition Framework). Multiple formats specified in <options> are possible. E.g.: gap://www.example_onlinestore.com/nikeShoes/
catalog*entityFormat=freeform&entityFormat=nvp A part answerFormat=<format>: this specifies the expected format of answers to the inquiry in the protocol request. Possible formats are the same as those of the entityFormat option. E.g.: gap://www.example_onlinestore.com/nike_Shoes/Air3000*answerFormat=nvp&answerFormat=markup|sellerRatings( )

The part <inquiry>, with a vertical-bar character "|" as a marker prefix and delimiter, contains pre-defined questions capable of parameters. (Multiple questions are separated by "&".) These questions in attribute form include:

- A query sellerName( ): What is the seller's name?
- A query sellerAddresses([<location>]): What are the seller addresses for a given location?
- A query sellerRatings([<ratingAgency1>[,<ratingAgency2>]]): What are the seller's ratings? (This example question supports up to two rating agencies to simplify the presentation above. More could be supported in an implementation. Alternatively, multiple sellerRatings questions may be used in a single request.)
- A query productOrServiceName( ): What is the product or service name?
- A query productOrServiceDescription([<language1>[, <language2>]]): What is the product or service description? (This example question supports up to two languages to simplify the presentation. More could be supported in an implementation. The order of the languages specified indicates preference from most preferred to least.)
- A query marketType( ): What is the market type? (E.g., fixed price, auction)
- A query price( ): What is the current price of the product or service?
- A query acceptablePaymentTypes( ): What are the acceptable payment types? (E.g., Paypal, Visa, Amex.)
- A query shippingAndHandlingCharge(<location>): What is the shipping and handling charge given the consumer's location specified in <location>?
- A query paymentAt([<location>]): Where do I go to do the payment for the purchase given the consumer's location specified in <location>?
- A query currency( ): What is the currency of this offer?
- A query offerExpiryDate([<location>]): What is the offer's expiry date given the consumer's location specified in <location>?
- A query offerLastChanged( ): What was the date and time that the offer was last modified?

The following is a list of questions applicable to advertisements of perishable goods: A query bestBeforeDate( ): What is the product's best-before date for consumption?

The following is a list of questions applicable to advertisements of auction-type markets:

- A query reservedPrice( ): What is the reserved price of the auction?
- A query minimumBid( ): What is the minimum bid of the auction?
- A query currentBid( ): What is the current bid of the auction?
- A query increment( ): What is the minimum incremental amount of the bidding price?
- A query maximumPrice( ): What is the "buy it now" price of the auction?
- A query auctionAt([<location>]): Where do I go to participate in the auction given the consumer's location specified in <location>?

Questions not of advertising nature include:

- A query protocolVersion( ): What is the version of the protocol being used by the information provider?
- A query entityCapabilities( ): What are the format and dialogue capabilities of the digital resource?
- A query isMasterInstance( ): Is the digital resource the original copy?
- A query masterInstanceURL( ): What is the URL of the original copy of the digital resource?

Of course, the above lists of pre-defined questions and their options are by no means exhaustive. They may also be modified as the protocol evolves over time while in use. The form and format of these questions (and their answers) is also just one of many that may be implemented for a particular embodiment of the present invention. For example, in conjunction with providing <options> and <inquiry> on a GAP-supported URL (or simply GAP URL), <options> and <inquiry> may also be specified via a method similar to HTTP's POST method in a GAP request message, one of whose functions is to provide a block of data to information providers for processing. Proper markup tags to delineate <options> and <inquiry> making up such block of data may easily be furnished by one who has skill in Standard Generalized Markup Language (SGML) and its related or spin-off markup standards (e.g., HTML—HyperText Markup Language and XML—eXtensible Markup Language).

Based on a GAP URL, a GAP information requester would be able to construct a GAP request message using the same format of HTTP request header that a HTTP information requester would construct using a HTTP URL. Additional fields (e.g., name-value pairs to specify <options> and <inquiry>) in the request header may be added. Successfully constructed GAP request messages are sent to their destination hosts (which may also include the host where the information requester resides, if applicable) via the underlying network transport mechanism (e.g., TCP as for HTTP) available at the information requesters' host.

Likewise, GAP's responses follow the same structure of HTTP's responses. Additional fields (e.g., name-value pairs to specify answers to dialogue questions as well as the formats of those answers and of the requested online entities or resources) may be added to the response header. Such extra fields may also be specified as part of HTTP response content, embedded inside HTML comments. For example:

```
<!-- HTML comments are here
<-! GAP comments are here. !->
<gap:seller name="ABC Example Retailer" format="nvp">
<address format="markup" definition="www.fictitious.org/dictionary/
all/2.0">
<street> 1032 Empire Street </street>
<city> Los Angeles </city>
<state> California </state>
<country> USA </country>
<zipCode> 91321 </zipCode>
</address>
</gap:seller>
-->
```

The above HTML entity provides an answer to two possible dialogue questions, i.e., the seller's name and addresses. (Note that “<!--” and “-->” are HTML comment opening and closing markers. Content inside these markers is not interpreted at all by HTTP requesters for visual presentation on web browsers.) Such embedment within a HTTP comment allows a GAP-aware resource to serve both GAP and HTTP requesters without causing confusion to the latter. GAP-specific comments may be placed within “<!-” and “!->” as shown in the example above. Again, proper field and markup tags for GAP responses may easily be furnished by one who has skill in Standard Generalized Markup Language (SGML) and its related or spin-off markup standards.

Similar to HTTP protocol servers, a GAP protocol server may use a Transport Layer endpoint or TCP/IP port for its designated level or layer of communication. A suite of GAP protocols may use a plurality of lower-layer protocols, such as HTTPS, FTP and FTPS. Realization of such a GAP protocol suite (e.g., GAPS—GAP Secure, GAPF—GAP File Transfer, and GAPFS—GAPF Secure) may include assigning different TCP/IP ports to each GAP protocol in the suite and providing standards for each of them (e.g., GAPS—secure access to digital resources of advertising context via HTTP; GAPFS—secure retrieval of digital resources of advertising context via FTP). Variations of GAP or other context-level protocols may define or adopt a different URI syntax (e.g., “GAP://com/cookshot/www/” instead of “GAP://www.cookshot.com”), and they may use services provided by other context-ignorant application-level protocols, or those of transport-level protocols, or a combination thereof. (Similarly, an application-layer protocol server or service may communicate with a transport-layer protocol server or service with no necessary support from any explicit protocol servers of the intervening session and presentation layers between the application and transport layers in the OSI Reference Model.) According to one embodiment, a context-level protocol may not need to re-invent or otherwise be concerned with how data or digital resources are transferred or displayed. Instead, its functionality may focus on context determination and establishment of requests and responses, or identification and retrieval of context-denoted digital resources.

According to another embodiment, a digital resource itself needs not be GAP-aware. A plain-text digital resource with no markup tags could totally be acceptable to GAP requesters. The GAP response header for this entity would specify the resource's encoding scheme (e.g., ASCII—American Standard Code for Information Interchange) and its format (i.e., freeform text). If such information is missing in the response header, then GAP requesters could attempt to determine the format of the presentation of the retrieved entity by checking the resource's file extension, if there is one (e.g., “.txt” file extension means text file).

For example, if an embodiment of a GAP information requester includes a web browser-type application, therefore displaying a retrieved digital resource, it may choose to display a format-unclassified presentation in ASCII plain text format, when the file size of the entity is below a certain threshold. That is, if the entity in question is large and of some unknown media type, it is usually not useful to display the content in ASCII plain text format in its entirety. On the other hand, such a browser-type application may also allow its users to try various presentation formats and encoding schemes to attempt successful display of the presentation of a retrieved resource or entity with respect to the user's intent. For example, a user may view a HTML-formatted entity in plain-text format, so to reveal all HTML markup tags embedded for the presentation of the entity.

There may be a variety of ways to make available digital resources via GAP as advertising entities. One is to equip web servers with GAP-capable protocol servers or information providers, such as those shown in FIG. 15B and FIG. 15C. Another is to provide a GAP-capable proxy system or server that may maintain a list of URLs of advertising resources on GAP-incapable web servers, such as the proxy shown in FIG. 20. Such URLs may then be submitted or otherwise made available to the proxy system or server. A GAP information requester would learn about these URLs when communicating to the proxy system or server. The proxy system or server may also handle dialogue questions on behalf of those advertising resources. Dialogue answers may be generated for the proxy system or server as part of the URL submission process.

A GAP information provider and requester both expect the primary context for digital resources of their interest to be of advertising. For instance, similar to FIG. 22, a GAP information provider would not reply a GAP information requester asking for advertising digital resources with a non-advertising digital resource (or web resource) even the resource exists as specified in its URL. On the other hand, if the content of the same resource (i.e., by the same or equivalent identifier or address) is replaced with one of advertising nature, then it would be legitimate for a GAP information provider to make it available to the GAP information requester. It is an obligation of a GAP information provider to respect this rule, and behave accordingly in presenting its resources as target entities or user payloads for retrieval by a GAP information requester.

Existing web tools and technologies such as search engines may be applied to or otherwise adapted for GAP. Knowing that digital or web resources available through GAP may be contextually ascertained to be of advertising, an online consumer may formulate his search words or phrases on a GAP-aware search engine more confidently, knowing non-advertising web resources would be excluded from the search all together. In addition, a GAP-aware browser or search engine needs not be resident on the online consumer's host system. Online consumers may use a GAP-unaware browser or client software to access GAP-aware browsers, search engines and applications. Moreover, new and better tools and technologies using contexts and dialogues afforded by GAP would now be possible.

On the Web, existing online advertisements (or simply called online ads or web ads) available via HTTP may simply be made available to GAP as well. This in effect contextualizes web resources that are of advertising nature but otherwise lack a reliable and recognizable context for such interpretation. There may not be need to change the content of existing web ads if their context is consistent with advertising. The advantage of such contextualization is already substantial. It is no longer legitimate to get non-advertising resources on the Web through GAP when one is actually interested only in advertisements of goods and services.

For example, an online consumer may see an ad on a magazine about a new mobile phone. The ad shows a GAP URL. He then enters the URL on a GAP-capable web browser. The browser as a GAP information requester would then:

(1) Process and interpret the given URL to create a GAP request.

(2) Send the request via its underlying transport mechanism to the destination host, i.e., the authority specified as part of the URL.

(3) Receive an online resource of interest (namely, the primary resource) as a response from a GAP information provider at the specified destination host. The online resource is an ad about the mobile phone which includes the phone's specification and unit price.

(4) Interpret the response for proper presentation as per format (e.g., HTML) specified in the GAP response.

(5) Send retrieval requests, if necessary, for other resources (i.e., secondary resources, such as inline graphics) making up a complete presentation of the primary resource.

(6) Display the received resources as a single page. A page may contain both GAP URL links (such as GAP links to the phone's accessories) and non-GAP URL links (such as a HTTP link to a high-resolution picture of a product, a FTP link to a user guide, and so on).

(7) Indicate that the pending resource is not of advertising context when the online consumer clicks on a non-GAP URL link to, for example, a user manual.

(8) Retrieve the user manual and present it on a separate non-GAP or a separate context-off GAP browser.

All the above steps are procedurally similar to those of HTTP, except the last two steps (Step 7 and Step 8) which demonstrate how the context-making ability of GAP influences the selection and presentation of a resource based on the resource's context, or its lack of it.

On the content supply side, no undue effort is imposed on the creation and provision of online ad content for GAP (namely, GAP online ads). For example, a plain text of advertisement is sufficient as a response body (along with a corresponding response header) for presentation via GAP. Of course, one may also create presentation-rich online ads, much like HTTP-accessible web pages written in HTML. Such online ads may themselves contain GAP links as well as non-GAP links. Conversely, non-GAP resources such as a web page of a discussion forum may also contain links to GAP resources, although a GAP-incapable information requester such as a conventional web browser would not recognize these links to GAP resources. These links may be embedded in comments if they pose problems to a GAP-incapable information requester. A GAP-capable browser would recognize GAP links as well as dialogue answers embedded in non-GAP comments, and display or interpret them accordingly.

To serve an information requester a GAP online ad, an ad exhibitor would place the ad in a host's GAP information realm. (Note that content of an online ad may be dynamically generated on demand upon request, instead of being prepared in advance.) An information realm of a protocol in relation to a computing host is a subdivision of the information available in a host that is accessible or otherwise applicable to a protocol. For example, a HTTP (information) realm comprises all the resources visible and accessible via HTTP, subject to security and connectivity considerations. The same online ad may also be made available as a regular context-free web page to the HTTP realm of the same host. Moreover, the same instance of an online ad can be placed in both GAP and HTTP realms, as well as other realms such as FTP.

A GAP-capable search engine may operate on GAP realms, much the same way as search engines of the status quo operate on HTTP realms (and possible other realm types such as FTP) on the Web. Moreover, HTTP realms could also be examined to discover GAP resources. Furthermore, advanced indexing based on query answers may be performed on dialogue-capable GAP resources. Query answers may be obtained through dialogue with GAP resources or their information providers or proxies, or through parsing of dialogue answers embedded in their representations.

With a GAP-capable search engine, an online consumer may enter his search words for information in the GAP realms. The consumer may also have an option of performing a more refined search if the search engine supports the use of dialogue answers as part of its indexing. In this case, the consumer would be able to enter search words for specific dialogue answers, for example, a product name as a search word entry for searching first the part of the index that contains answers to the dialogue question "What is the product or service name?," and then the rest of the index. This facilitates a much more reliable ordering of results in which links with more relevance precede those with less. Similarly, the more precise the format of a resource representation and its dialogue answers in relation to the demand of the search words or phrases, the better chance of quality matching between a online consumer's intent and ads providers' offerings there could be.

A search engine may also be capable of multiple types of realms, for example, GAP and HTTP. A search can be performed indiscriminately on all supported realms. A user can also prioritize the realms (e.g., GAP first followed by HTTP) or exclude certain realms (e.g., no GAP) for the search operation and result presentation.

As shown above, online consumers and ad providers familiar with the web would readily appreciate the similarities between GAP and HTTP in their user-level operations. The added features afforded by GAP are also intuitive, since they are user-centric, and semantically relevant to their need. Of course, the user-level GAP operations depicted above are not exhaustive, and there are many variations and additions possible. As such, these operations should not be construed to be the limitations on the operation of GAP. Although simple, these operations serve to demonstrate the effectiveness of embodiments of the present invention in form of GAP when applied to a HTTP-like environment, which is familiar to web users.

Note that GAP may use HTTP's well-known port 80 as its contact port as well, while according to another embodiment, it may be assigned with a currently unassigned TCP/IP port. While ports other than their respective well-known ports may be used for HTTP and GAP, such use may require clients to first discover the ports at which servers are listening to or waiting on, before requests may be sent to them. For example, all HTTP servers deployed on the World Wide Web (i.e., the Web) at large would use port 80 for accepting requests. Without explicit port specification in a URL, HTTP clients such as web browsers would usually by default send their HTTP requests to port 80 of their target hosts or web servers. On the other hand, a URL on a webpage may embed the port information so that it would lead clients to the correct port at the time of requests, without any prior port discovery per se.

Figure 24A:
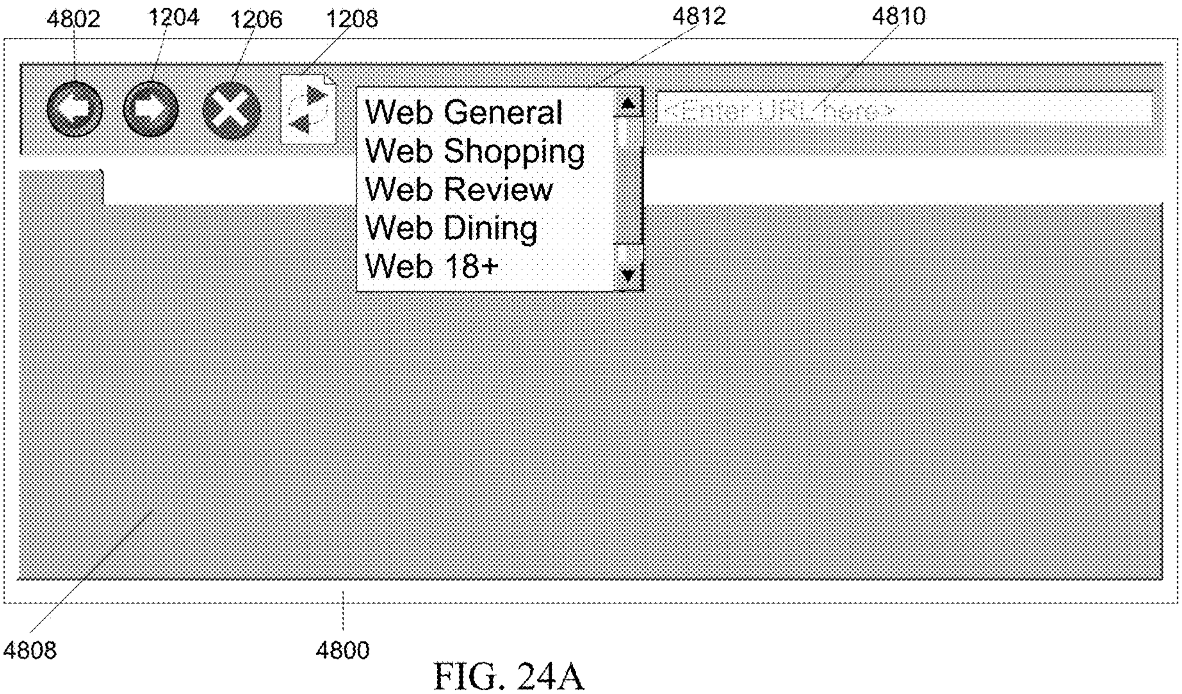
FIGS. 24A, 24B, 24C, and 24D show a number of Web browser user interfaces equipped with the present invention in accordance with some embodiments.

FIG. 24A shows an example browser page 4800, according to one embodiment, that one may see on a HTTP client station. The browser page comprises the back 4802 and next 4804 buttons, the abort 4806 and refresh 1208 buttons, an empty tab-enabled display page or area 1208, an input field for URL entry 4810, and a scrollable pull-down menu 4812 listing a plurality of context-selector phrases such as Web General (i.e., no context), Web Shopping, Web Travel, Web Dining, and Web 18+(e.g., adult-only content). These illustrative user-interface elements with the exception of the pull-down context selection menu are commonly seen in many web browsers. The first selectable choice is "Web General," which is the status quo Web, for which the default port would be 80. The next one is "Web Shopping," which may refer to the context-denoted Web for shopping, whose default port could be 98, such as the one shown in FIG. 20. The other choices such as "Web Review" and "Web Dining" correspond to the context-denoted Webs for reviews and dining respectively, whose default ports could be any distinct port numbers chosen among available port numbers not in official, de facto, or common use by other protocols. Consequently, the URL specified in the URL input field would result in a HTTP request being sent to or otherwise set up for the target HTTP server (or its proxy) at the specific port designated for the chosen context.

A URI (Uniform Resource Identifier), of which URL is a particular type, is a string of characters that adheres to a specification for identifying or otherwise referencing resources (e.g., a webpage) on the Internet or a private intranet. A URI scheme is the top level or part in the syntax of a URI construct. The remainder of the construct is to be structured and interpreted per specified URI scheme, subjected to certain constraints and conventions. For instance, the URL "http://www.uspto.gov/" has a URI scheme name "http," and the rest of the URI (not including the preceding colon ":"), namely "//www.uspto.gov/," is considered a scheme-dependent or specific part. The colon serves as a separator or delimiter between the scheme part and the scheme-specific part(s). Note that it is not necessarily for the scheme part of a URI construct to be a protocol (e.g., HTTP) even though it is commonly so. In addition, different URI schemes (e.g., HTTP and FTP) may share the same or a subset of structure and semantics for their scheme-specific parts.

Figure 24B:

FIG. 24B shows another example browser page 4800*b*, according to another embodiment, where a pull-down context selection menu is not present. There the example URL entry at the URL input field has "shop" as its scheme. This keyword "shop" is a scheme name associated with a protocol of shopping context. In particular, the protocol uses the same syntax and semantics of the scheme-specific part of HTTP URL, except now the default port would be, using the example illustrated in FIG. 20, port number 98, not 80. Hence the HTTP server to which "www.cookshot.com" in the URL refers would be listening and serving requests at port 98. (As such, URL entry "http://www.cookshot.com:98" would also be able to reach the HTTP server in question.) According to one embodiment, a TCP port other than port 80 is assigned with a context of shopping including sub-contexts of online ads and reviews of products and services, such that a HTTP server listening on or otherwise serving at this port are expected to deliver digital resources whose primary context being shopping or whose content of interest having a primary context of shopping. A HTTP client generating HTTP requests for target digital resources associated with URLs having "shop" as their scheme part or its equivalent would send the HTTP requests to that port, and not port 80.

Figure 24C:
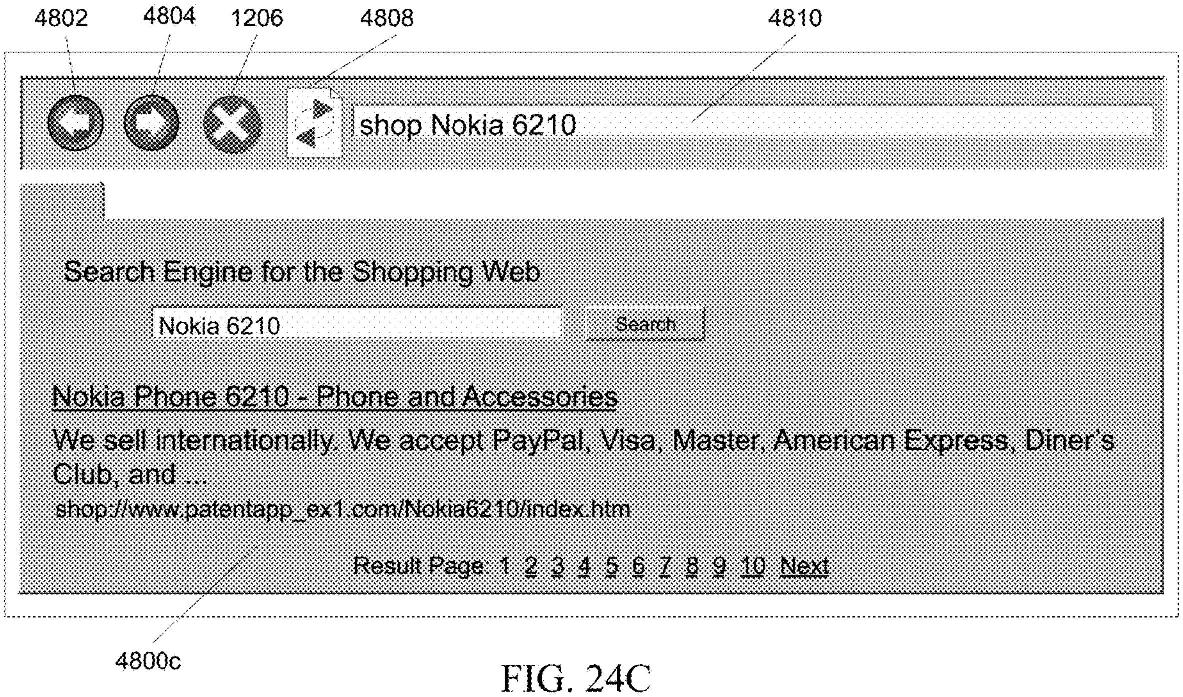
Figure 24D:
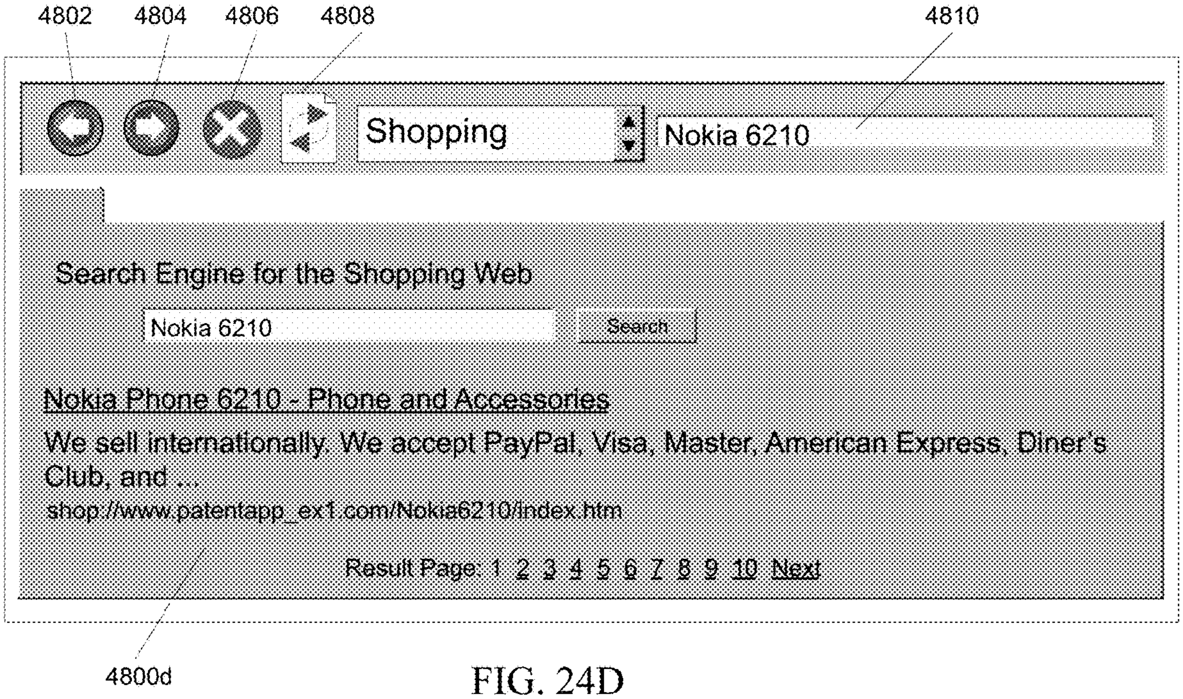

The "shop" scheme may further provide context-specific enhancement to the scheme-specific part. For instance, an entry "shop Nokia 6210" (see FIG. 24C) may result in a query with the search string "Nokia 6210" sent to a default search engine pre-assigned to or otherwise associated with the "shop" scheme. That is, if free-form keywords or phrases or those involving Boolean logic are detected as entry to the scheme-specific part, then it is considered as input to a search engine for the context of shopping. FIG. 24C illustrates such an example 4800*c*. (For example, the HTTP server of web address "www.cookshot.com" described earlier could be the default search engine.) FIG. 24D illustrates the same example but in a browser page 4800*d* similar to that of FIG. 24A.

A contextualized Web made possible by embodiments of the present invention may allow the use or adaptation of existing context-ignorant technologies, protocols and schemes in providing a context-certain or context-denoted layer or filter over digital or online resources delivered, processed or otherwise handled by or through these technologies, protocols and schemes. The operation scenarios for online resource providers and consumers participating in information exchange via such an embodiment, while may differ from one specific application to another, may not require any undue effort from these participants. Their skills and abilities in online resource retrieval, browsing, creation and publication may remain applicable or relevant. For instance, the user operations shown in FIG. 24A to FIG. 24D should be quite straight forward, and a Web user would find the user interface intuitive and consistent with what they are accustomed to. According to one embodiment, non-compliance of a digital resource provider may be reported by any party and be dealt with by the jurisdiction in accordance to the agreement or generally accepted practices, such as the removal or suspension of the addresses of non-complying online resource servers from the contextualized Web in question.

According to one embodiment, a contextually consistent space of digital resources may be achieved through communication end-points (e.g., a communication port of a TCP/IP protocol suite) that are dedicated to a certain context of digital or online resources, and by agreements, declarative or otherwise, between and by resource consumers and providers that their online queries, requests, and information of interest that may be received or served via these end-points shall be consistent with the context, unless otherwise specified.

For instance, among so many possible contextual integrity rules and guidelines, a certain TCP/IP port may be designated for serving webpages that are advertisements free, copyright free, one advertisement per page or one-offer per page, independent of or in addition to any contextual conformity requirement that the contextualized TCP/IP port may demand. Contextual integrity achieved through this approach would improve substantially the accuracy of indexing and queries of such webpages, while still allowing contextual heterogeneity among webpages and web resources that a server of digital resources may serve.

In addition, data going through a communication end-point with contextual conformity or integrity requirements may be protected or otherwise distinguished by a digital signature or other forms of security measures, so that only online resource providers and consumers (or requesters) that have formally accepted those requirements and, if any, the related penalty clauses for non-conformance, would have the keys or means to send, receive, read, produce or publish such data or digital resources.

A contextualized Web may also be furnished with enhancements such as tools, formats and rules (e.g., contextual integrity on a per webpage basis) and so on that aid in their ability to deliver, process or otherwise handle online resources in the specific context. Furthermore, sub-contexts such as "reviews," "offers" and "ads" may further refine or otherwise supplement a context to which these sub-contexts are applicable. The differentiation of these sub-contexts may be performed or otherwise realized at the port level or in the syntax of a protocol (e.g., special keywords defined in the syntax that may identify the sub-contexts of interest).

With the enhancements and modifications to HTTP as specified above, one who is skilled in the art would be able to realize an implementation of GAP, as well as other context-level protocols. For instance, a variant of HTTP may be specified as follows:

http://<authority>[/<path>][/<object>][*[<context>] [*<context>]][?<query>]

(Note that while more than two named contexts may be supported, the above specification would support two for simplicity in illustration.)

The introduction of the optional part and its subparts "[*[<context>]*[<context>]]" to HTTP URL syntax allows the specification of additional contexts that the requested resource may belong to. The presence of the asterisk "*" alone in a HTTP URL would mean the default context, for instance, advertising. Without this optional part, an URL would be just a regular HTTP URL.

An additional context may also be specified in an optional "<context>" part. For example:

(1) http://www.wbstz.com/brandnamePhones (2) http://www.wbstz.com/brandnamePhones*

(3) http://www.wbstz.com/brandnamePhones*mobilePhone (4) http://www.wbstz.com/brandnamePhones*mobilePhone("USA")

(5) http://www.wbstz.com/brandnamePhones*mobilePhone("USA")*brand("Nokia")

The first HTTP request bears no context. The second request specifies an advertising context. The third request specifies advertising of mobile phones. The fourth request specifies advertising of mobile phones applicable to use in USA. The fifth request specifies advertising of Nokia-branded phone mobiles applicable to use in USA. (Note that the parameter "USA" is an example of context parameterization.)

Each explicitly named context and its supported parameters, if any, may not need to be defined as an inherent part of a context-aware protocol. They may be defined independently. Information requesters and providers could then use the named contexts of their interest to contextualize each individual requests and responses through a context-aware protocol capable of such on-demand contextualization, as long as these information requesters and providers share the same definitions of these named contexts. The fulfillment of this stipulation is made simple when the protocol is associated with a set of commonly used contexts. An "unknown" context may be included in requests and responses along with its unique identifier, such as an URI. Accordingly, an otherwise context-free protocol might reliably be made context-capable on a per request and response basis, as long as the information provider and requester may themselves be context-aware and know how to mutually specify and recognize these on-demand named contexts through the protocol. For example, the query part of the context-free HTTP URL may be used to carry these on-demand named contexts, such as: "?contextName=mobilePhone&contextDefinition=urn:www.fictitious.org:glossary:all:2:0," and a context-ignorant HTTP information provider would return an error when it encounters a query part that the information provider fails to make sense or interpret.

The addition of these optional context parts to HTTP would incorporate embodiments of the present invention into HTTP, thereby upgrading the protocol while preserving its existing functionality. An ordinary HTTP information provider would not understand such a context-aware or context-making HTTP request, and would return an error (e.g., resource not found). A context-aware information requester would learn about this incapability from the error message so returned. Such an information requester capable of this enhanced HTTP is in effect capable of a "combined protocol," namely a combination of both the original context-free HTTP and a context-specific or context-making protocol made possible by embodiments of the present invention. Another illustrative variant of HTTP in embodiments of the present invention is as follows:

http://<authority>[/<path>][/<object>][*[<options>] [|<inquiry>]][?<query>]

This variant supports GAP's features of options and inquiry in lieu of multiple contexts. Here is yet another variant:

```
http://<authority>[/<path>][/<object>][*[<context>][*<context>]
[*<options>]][|<inquiry>][?<query>]
```

This one supports GAP's features of inquiry and options in addition to multiple contexts. (Although both contexts and options use the asterisk "*" character as marker and delimiter, the latter are of name-value-pair, while the former are not. This difference in syntax is sufficient for proper distinction during parsing of the URL. Note that this is just one example syntax used by a protocol in embodiments of the present invention.) Contexts as well as options and inquiry may also be specified in a HTTP requester header.

In addition to open systems such as the Web, embodiments of the present invention may be applicable to use within an application or system, where a communication protocol is used among pre-defined modules or components within the application or system.

Furthermore, a communication protocol equipped with embodiments of the present invention may make a distinction between copying and transferring a target digital resource, and treat the resource as having more than one instance, if such distinction is useful to a given context, such as advertising. That is, when the protocol copies a digital resource, it leaves the number of instances of the digital resource unchanged. When the protocol transfers a digital resource, it removes an instance of the resource. For example, an advertising digital resource may be a limited number of discount coupons. A transfer of such a resource would reduce the number of available coupons. In addition, an information requester may register for notification of query answers, especially those that change over time such as the current auction price, if the information provider would support it. These additional features do not indicate a new use or an enhancement to embodiments of the present invention. Rather, they are some of many different features that a communication protocol equipped with an embodiment of the present invention may possess. Those skilled in the art would be able to realize a particular embodiment per some requirement in accordance with the present invention.

For instance, specific embodiments may vary depending on the specific operating environments as well as specific functional, performance, security, reliability, maintenance and presentation requirements. For instance, the art of communication protocol development has been around for more than 30 years. While in essence all communication protocols are designed to transfer some information from one end to another end, there are a myriad of variations, with different data representations, synchronicity and logical connection models, error handling, security mechanisms, data caching and buffering strategies, and so on. Some protocols work in conjunction with others, while some exclude each other for the same application. Embodiments of the present invention make possible context-level communication via interfaces and protocols for subject matters including but not limited to Advertising, Reviews, News (Business, finance, entertainment, politics), Science and Technologies, Medical and Health, History, Books and Arts, Scholastic and Academic.

For example, in addition to advertising, which could already encompass beyond retail goods and services, e.g., jobs and personal ads, a communication protocol herein referred to as Good Answers Protocol (GAP) may be specified as follows:

gap://<authority>[/<path>][/<object>]*<context>[*<context>][*<context>][?<query>]

(While the protocol shown here may support up to three contexts for simplicity, it may be extended to support an indefinite number of them.)

Furthermore, a context may be described in a hierarchical manner, like categories in a business directory. For example:

gap://www.movie_chain.com/movies/ABC*movie/review gap://www.movie_chain.com/movies/ABC*movie/showtime("New York City")

Instead of just a mere different representation of the same information the same digital resource (www.movie_chain.com/movies/ABC) provides different information, namely the critics' review on the movie ABC and the showtimes of the movie in New York City. The former and the latter are both related to movies, but differ in their specific "subcontexts." In addition, semantically independent contexts may also be specified as follows:

gap://www.example_travel_info.com/destination/HongKong*touristInfo("New York City")*fineDining Here the request is to the entity "www.example_travel_info.com/destination/HongKong" for information on fancy restaurants, specifically for visitors from New York City. The contexts "touristInfo" and "fineDining" are independent in that they can exist without the other. For example, without the "touristInfo" context, the returned information is still of fine dining, but it would not be customized to visitors coming from the New York City. On the other hand, without the "fineDining" context, the returned information would be of tourist information for visitors from New York City in general, including visa requirement, currency rate, embassy address, etc.

A glossary and grammar of contexts may be developed to facilitate this example Good Answers Protocol. An information provider may also maintain and make available a list of contexts supported for a particular or a group of digital resources or online entities that the provider may be responsible for, so that an information requester may survey the kinds of information available. In addition, this GAP protocol may also support dialogue. For example, a digital resource, whose context is established as medication, may be asked about its generic name, indications, and so on.

Another example is an application of embodiments of the present invention to turn the Web from a global repository of distributed semantically-uncertain information base into one of semantically-rich information source. Different channels of specific semantic communication contexts may be established to support a much more effective heterogeneous mode of information dissemination and request. Because the current Web is inherently context-free, it inevitably treats all information dissemination and request as though for homogeneous users, thereby discriminating against user groups or interests of lesser majority. This would impede the growth to universality of the Web.

For example, someone looking for an urn for funeral use may get a large result of links to websites about URN (Uniform Resource Name—an IETF RFC protocol standard) if today he enters "urn" (when not even in form of a capitalized acronym) as a search word in a popular search engine. The result is biased towards the current user base of the Web, most of who would be considered computer savvy enough to be more interested in URN than an urn. However, one would argue, and rightly so, that most of the people in the world are not computer savvy, and should not be required to be so in order to take full advantage of the Web. It is similar to word processing software which in essence shall not give computer programmers any considerable advantage over non-programmers in using the software to perform its intended tasks, i.e., document creation, maintenance, collaboration, publication, and distribution. As such, contextualized channels on the Web made possible by embodiments of the present invention would drastically help equalize this imbalance. Context-specific search engines may be developed, relying on the communication contexts of the contextualized channels that these engines are to index and operate on. According to one embodiment, an otherwise general-purpose search engine serving a contextualized information channel or Web becomes contextualized. These contextualized channels may be likened to specialty channels in television broadcasting. This is like before the time of specialty channels, television audience could only choose channels of television stations or networks, and subject themselves to the programming of these conventional channels. The rise of specialty channels gives audience of heterogeneous nature the ability to choose content of their interested subject matters. Embodiments of the present invention might further reify Marshall McLuhan's famous literary trope "the medium is the message" with realization of "protocol is the context."

Still yet another example is an application of embodiments of the present invention to make possible legitimate user feedbacks for search engines and information provider. Because there is no established context for online information at large, it may not be suitable or relevant for web users to rate the results from search engines in relation to a given context. However, when web pages are presented in a certain context, such as that of advertising, web users may now rate more objectively on the relevance of a given web page in a search result. Based on the search input and ratings given by the web users, a search engine may improve the search quality based on this correlation. Information providers may also be rated for the content integrity. This is made possible because of an established context mutual to both content providers and consumers through a context-making communication interface or protocol. Contextual integrity of searchable content within a resource may subsequently improve.

For example, if an online consumer looks for a sailing jacket of a particular brand, and therefore specifies the search words of "Goodbrand sailing jacket," a search engine nowadays could return links to popular web pages that sell assortment of goods, some of which are of brand "Goodbrand," and some of which are about sailing, and some of which are jackets, but no item would be a sailing jacket of brand Goodbrand. In short, the online consumer would get a page that lists items that each of which may contain one or no relevant word. This illustrates while all content in a given resource may be of advertising, the contextual integrity of the resource is compromised by having listed many unrelated items for sales as its content.

Good contextual integrity should translate into better ratings for information providers, which in turn encourages contextual integrity improvement. In fact, a single webpage may contain more than one web resources. Yet multiple web resources presented together on the same webpage could have their own independence with respect to searches and dialogues. (That is, a resource may further be decoupled from its mere presentation. A webpage needs not be a single homogeneous resource. It may serve as a collection or presentation of one or more resources. Such a collection or presentation may itself be a resource.) Such independence may easily be set up and identified with structural markups. A search engine can consider individual web resources independently even though they appear on the same webpage. When there is a match for a given context, the search engine can return a link to the whole webpage, or a modified link to just the matched web resource for preciseness. Again, demand for such contextual integrity of web resources is made possible by embodiments of the present invention. In addition, a search engine may now disregard web resources of advertising nature whose offers have expired. (Note that an expiry of an offer is not the same as that of a web page. The former is a possible natural attribute to an advertised offer, while the latter is a control attribute to temporary storage of webpages for later retrieval.) That is, a web page may contain several ads, where some have expired and some have not. A search engine would ignore the expired ones should its user ask only for online ads still in effect.

As illustrated above, embodiments of the present invention make possible so many applications. Hence, while the specification so far may have contained much specificity, it should not be construed as limitations on the scope of the invention, but rather as an exemplification of embodiments thereof. One who is skilled in the art would be able to incorporate the present invention into a variety of embodiments and applications. For instance, an online document or resource may comprise an indication of its subject matter or subject matter context, the indication comprising an identification of a protocol interface associated with a subject matter or subject matter context. For example, a HTML webpage may indicate an alternate link (e.g., a LINK element with “rel” attribute whose value is “alternate”), the alternate link comprising a URL whose port (e.g., port 89) is associated with a subject matter (e.g. shopping). A search engine or a user agent such as a web browser may recognize the subject matter based on the alternate link, and process the webpage accordingly. For instance, the search engine may catalog, classify or index a web resource based on information available via an alternate link, and present or select the web document or resource based on matching of a query or context against the information, even though the webpage does not necessarily contain that information, or the information in the same or compatible form, mode or scheme. For example, an online video may be associated with an alternate link to a transcript or a text description of the video. A search service may index the transcript or text description. It may present or select the video if the search service deems that the transcript or text description is a match with a user request or query. In one embodiment, such a matching may require that the alternate link is associated with a protocol interface that is associated with a particular subject matter, such as port 89 if port 89 is deemed being associated with the subject matter, e.g., by way of a published online document such as an IETF RFC (Request for Comments). In one embodiment, an online publication identifying a TCP/IP port and associating the port with a subject matter such as shopping is regarded as having the port deemed being associated with the subject matter.

In addition, further disclosed are methods, systems, and devices for restricting access to one or more apps on a device. For instance, a method for restricting access to one or more apps and their data is described, the method comprising providing an area; accepting a request to associate one or more functions with the area; associating the one or more functions with the area; accepting a request for access to the area; requesting for authentication; providing access to the one or more functions, if the authentication is successful; and denying access to the one or more functions, if the authentication is not successful. According to another embodiment, a computing device provides an area, the area including a folder, an icon, a screen page, or a virtual screen. The device accepts a request to associate one or more functions with the area. The device associates the one or more functions with the area, and makes invisible the one or more functions outside the area. The device then accepts a request to access the area. It requests authentication. It provides access to the one or more functions if the authentication is successful, and denies access to them if not successful.

Figure 25:
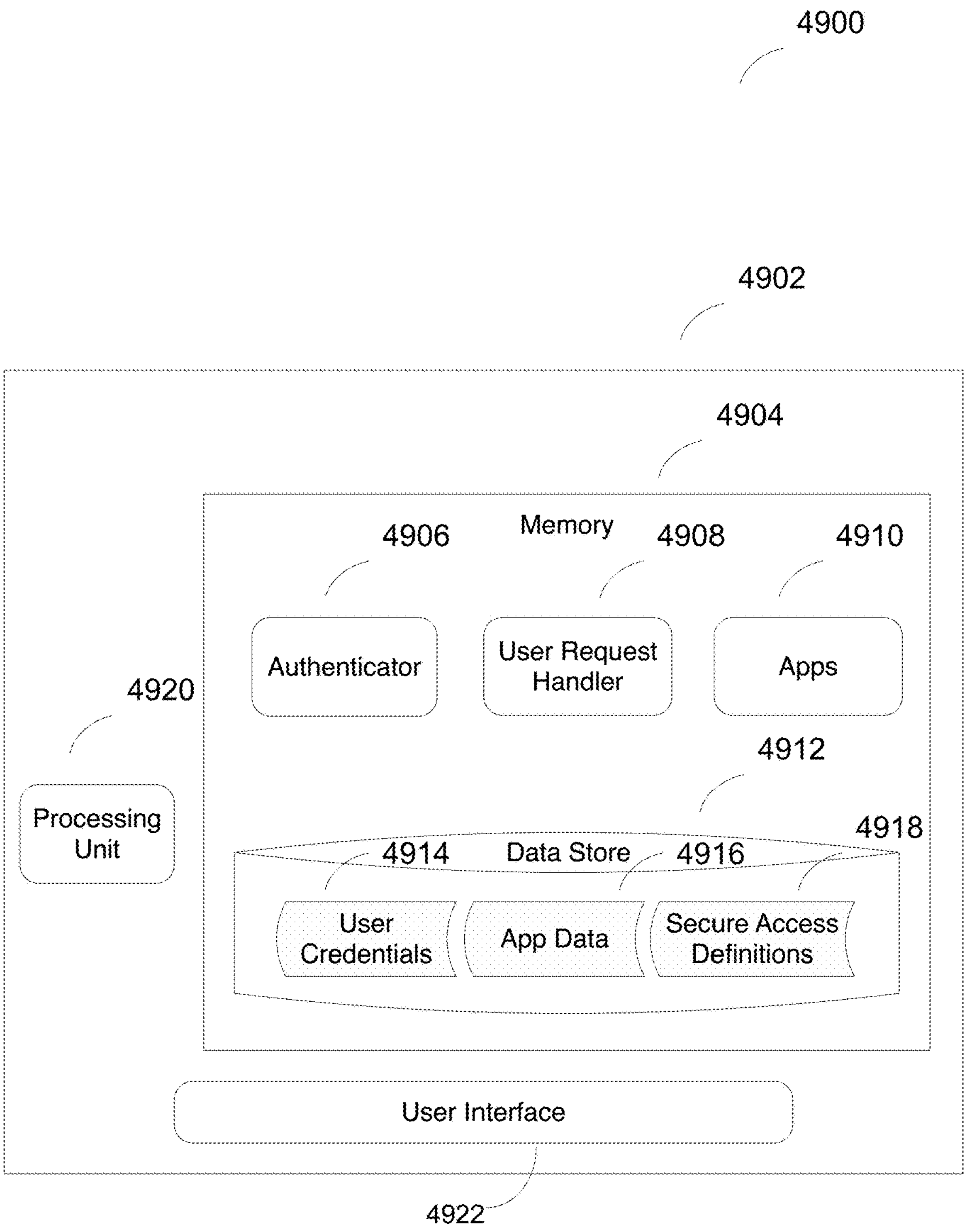
FIG. 25 shows a block diagram of a device in accordance with an embodiment.

FIG. 25 shows a block diagram 4900 of an exemplary device 4902 equipped with the present invention. The device 4902 comprises a processing unit 4920, a memory 4904, and a user interface 4922. The device 4902 (e.g., a mobile phone, personal digital assistant, computing tablet, desktop phone, a portable or desktop computer, a control terminal, and so on) is communicatively coupled to a user via the user interface 4922 (e.g., a display, a speaker, a microphone, a keyboard, a touch screen, and so on). Any type of user interface is within the scope of various embodiments.

The user interface 4922 is provided for interacting with a user, including receiving requests for designating an app for restricted access and accessing the app or a restricted area, view or screen in or with which the app is protected or associated, as well as indications that another user or a device of another user may access applications or services on the device.

The memory 4904 is provided for storing programs and data for the operation of the device 4902. It includes an authenticator 4906, a user request handler 4908, one or more apps 4910, and a data store 4912, the data store comprising user credentials 4914, app data 4906, and secure access definitions 4918. The user request handler 4908 is responsible for interpreting requests sent by a user via the user interface 4922, such as associating apps with a secure or restricted area, assigning apps to a secure or restricted area, view or screen, deciding if authentication is required in relation to accessing the secure or restricted area so to run or make visible the one or more apps and their data installed or otherwise accessible through the device, and communicating with the one or more apps 4910 about requests from one or more users, the requests for granting access to the one or more apps 4910 on the device 4902 to one or more devices associated with the one or more users. The authenticator 4906 is responsible for prompting for and accepting input from the user, for example, to decide if a secure area comprising the apps in question should be made visible or available to the user, as well as other authentication-related activities, such as creating or changing user credentials. If the authentication is successful, the authenticator may then allow the requested operation or effect to proceed. Otherwise, the user is notified of such denial. The user credentials 4914 in the data store 4912 are used for such authentication purpose (e.g., as executed by the authenticator 4906), while the secure access definitions 4918 there provides the rules or boundaries under which an authentication is required. The app data 4916 provides data storage for the one or more apps 4910. The authenticator 4906 may also facilitate identification and/or authentication of an external device or an application on an external device based on identification and/or authentication of the user of the application or the external device.

The processing unit 4920 is provided for executing the programs (e.g., the authenticator 4906, user request handler 4908, and apps 4910) in the memory 4904, and the user interface 4912 for interacting with a user.

In some embodiments, the secure access definitions 4918 may be part of the user request handler 4908, or the authenticator 4906 may be part of the user request handler 4908. As such, although the device 4902 is described as being comprised of these various components, fewer or more components may comprise the device shown in FIG. 25, and still fall within the scope of various embodiments.

In one embodiment, a user via the user interface 4922 selects an app for configuration (e.g., by touching and holding for a pre-determined period of time an icon for the app on a touch screen), and specifies that the app be associated with a secure area, such as a folder, a screen view or page, or a virtual screen available on the device. (E.g., the user may gesture to the device via screen scrolling that he wants to access to the next screen view or page to the right of the current screen view or page, or an out-of-sight virtual screen positioned virtually at the top of the current screen, the next screen view or page, or the out-of-sight virtual screen being designated or configured as a secure area.)

Such specification or association may be performed via a configuration file, settings page, or the selected icon (e.g., dragging the icon to the secure area). The user request handler 4908 or its equivalent stores this configuration in the secure access definitions 4918. If the user does not yet have credentials established for such authentication, then the user request handler 4908 causes the authenticator 4906 to prompt the user to establish one, and to handle the subsequent interaction with the user. Alternatively, the user request handler 4908 may do so with the user via the user interface 4912. Successfully established, the credentials are stored in the user credentials 4914 in the data store 4912. The user may also change the credentials via the authenticator 4906 independent of any app invocation or configuration for access. If the user wishes to no longer restrict access to the app, then he may be first authenticated by the authenticator 4906 before being granted the permission to make such change. (E.g., to disassociate an app with a secure area, the user may touch, hold, and drag the icon for the app in the secure area to outside.) The user request handler 4908 updates the secure access definitions 4918 accordingly.

Upon receiving a request from a user to access an area or screen through the user interface 4912, the user request handler 4908 checks if there is any applicable data in the secure access definitions 4918 for the area or screen. If so, it causes the authenticator 4906 to interact with the user and authenticate him against the data in the user credentials 4914 in the data store 4912. Otherwise, the area or screen may be accessible without further permission or credentials checking. Should the authentication in the former case be successful, the area or screen may be accessible, thereby making the apps therein available to the user.

In an embodiment, a touch-screen device presents a list, view or inventory of available apps on one or more visual pages or areas, where a user may go from one page or area to another. For example, a so-called home screen on the device may comprise more than one set of apps, where each set of apps is displayed or otherwise presented independently from the other sets. The user may gesture to the device (e.g., by swiping across the screen) to select the previous or next set or sets in relation to the current set of apps. Each set of apps so display or presented makes up a view, each of which may extend beyond what the physical screen of the device can show at any one point in time. For example, individual views may be organized horizontally while the icons of the apps vertically. Animations such as that of sliding from one page to the previous or next, either horizontally or vertically, may accompany this change of view. In addition, an secure area may change in size and/or color, for example, depending on the status of protection and the number of apps therein. The user interface 4912 is responsible for such interaction with the user.

In one instance, the user indicates via the user interface 4912 to the user request handler 4908 that one view is configured to become a restricted area, in that access to it would require authentication of the user by the authenticator 4906. Upon successful authentication, the user may access this restricted area or view, and assign apps to it (e.g., by moving their icons into the area or view), thereby removing these apps from authentication-free access at the app execution level even when the device-level authentication, if any, has been successfully performed or otherwise been disabled. That is, to gain access to apps with restricted access, the user needs to be authenticated by the authenticator 4906. Successful authentication enables the user to access all apps in the restricted view or area for which the authentication is performed. Such authentication may be required every time access to the restricted area or view, or to the individual apps within it, is requested by the user, or when there is some inactivity of the device or apps in question since the last successful authentication. Or the user may open and close restricted areas or views manually via the user interface 4912, so that the user request handler 4908 may then decide in accordance to this manual setting if access to the restricted areas is granted and whether authentication is needed.

The user may also designate two or more sections of views, one or more of which comprising one or more restricted areas or views. Between any two sections may be a demarcation or partition point, line or interface (visible or otherwise), where authentication will be required if the user requests access to a section of restricted areas or views, and not required if he requests access to a section of non-restricted areas or views. Different sections of restricted areas or views may have different passwords or credentials for authentication. In addition, the same app with different data sets may also appear in different sections. For example, a phone app may appear in both the non-restricted and restricted areas, where the phone app in the restricted area has access to different contact data and call logs compared to the one in the non-restricted area. Another example app is a photo album app. That is, the data that an app may have access to defines the function of the app and distinguish it from the otherwise same app that does not have access to the data (but perhaps to other data). In one embodiment, a Secure Access Definition such as the one shown in FIG. 25 stores and maintains the relationships between the apps and their respective data in relation to the sections that they are applicable to. For instance, the user may specify an email address for which messages received will be associated with an email app in a section of restricted areas, while messages received for all other email addresses will be associated with an email app in another section.

Figure 26:
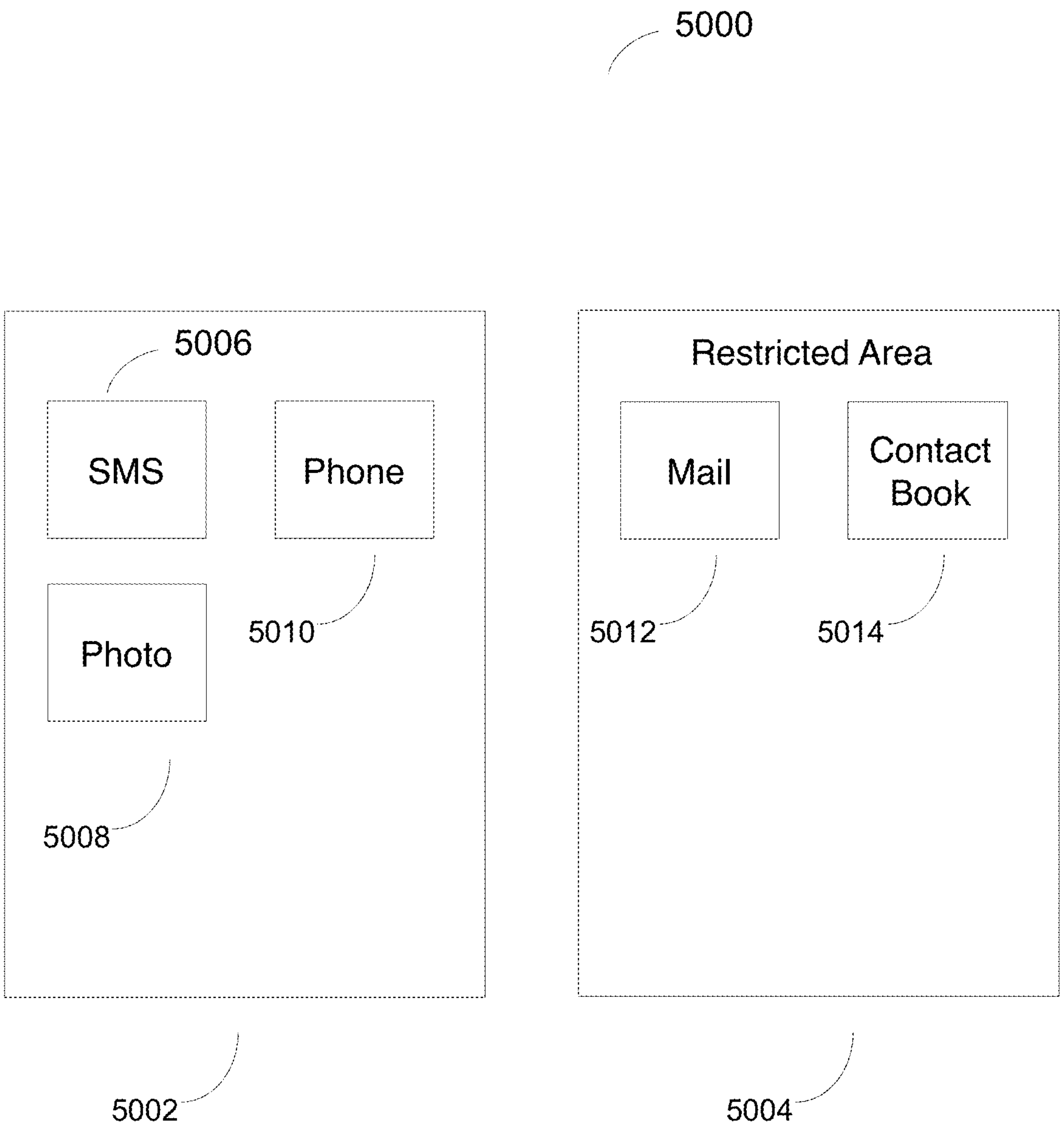
FIG. 26 shows screenshots on a device in accordance with an embodiment.

FIG. 26 shows an exemplary display 5000 of screen that may be presented on a device embodying the one depicted in FIG. 25. There are two screen shots 5002, 5004, each representing an area or view of apps or their icons. The one on the right is a restricted area whereas the on the left is not. As such, the left screen, area or view will be accessible to the user without the need for authentication, while the data associated with the apps whose icons appearing in this screen, area, or view (i.e., SMS 5006, Phone 5010, and Photo 5008) are available to the user also without any authentication. On the other hand, since the right screen, area, or view is restricted, a user will not gain access or visibility to it until successful authentication. As such, the apps (i.e., Mail 5012 and Contact Book 5014) in this screen, area, or view will be protected from unauthorized access. The data associated with these apps are likewise unavailable to the user or other apps that the user may be using or capable of invoking without authentication.

Figure 27:
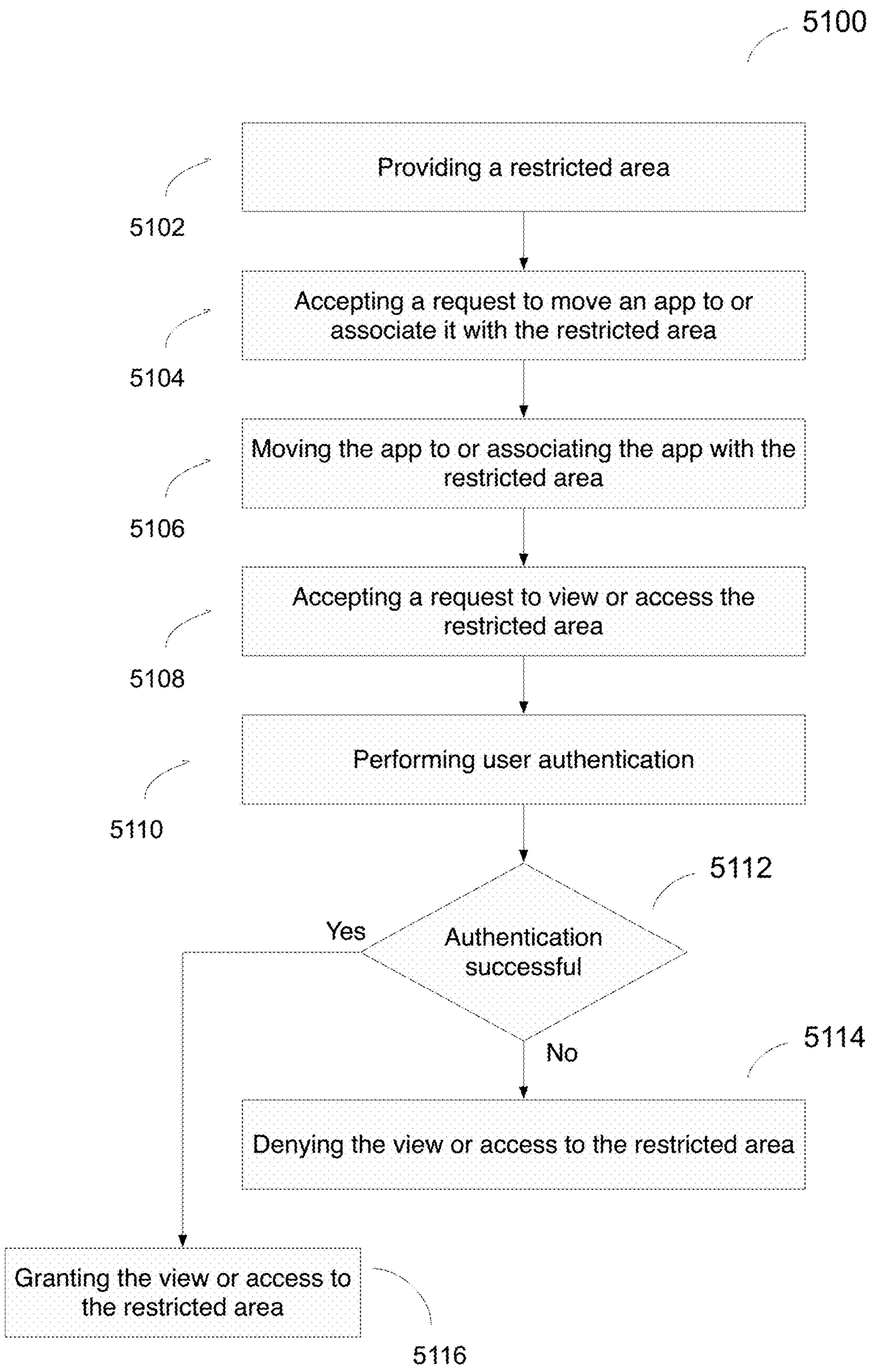
FIG. 27 shows a first computerized method in accordance with an embodiment.

FIG. 27 shows a flow diagram of an exemplary process 5100 for configuring an app for authentication on a device, such as the one shown in FIG. 25, with a display or screen an example of which is depicted in FIG. 26. For instance, per the example process 5100, the user interface 4922 provides a restricted area, view or screen (5102), which may be disabled, enabled or otherwise configurable by the user. If there are no user credentials available yet, the user request handler 4908 will cause the authenticator 4906 to interact with the user via the user interface 4922, so to obtain them, before the restricted area, view or screen may be activated, enabled or otherwise created. (In one embodiment, the user password for the device, if available, will be used as the initial user credentials for restricted areas, views, or screens.) The authenticator 4906 (or in some embodiments, the user request handler 4908) will store the information in the user credentials in the data store. The user request handler 4908 accepts a request via the user interface 4922 to move an app to or otherwise associate it with the restricted area (5104), such as having the user pressing, holding and dragging the app icon from an unrestricted area, view or screen, to the restricted one. The handler 4908 causes the user interface to remove the app icon from the unrestricted area to the restricted one (5106), and stores in the secure access definitions 4918 this membership in or association with the restricted area, view or screen. (Such setting in the secure access definitions 4918, for example, may cause the data maintained by or otherwise associated with the app to become unavailable to other apps that may otherwise have access to them, such as the data in Contact Book app being available to the Phone app.) Then the user request handler 4908 receives a request from the user via the user interface (e.g., by gesturing the intent to access the restricted area from the unrestricted one, such as those shown in FIG. 26) to access the restricted area (5108). The handler causes the authenticator to request user credentials (e.g., password) or otherwise authenticate with the user (5110). If the authentication is successful (5112), then the authenticator causes the user request handler to make visible or otherwise accessible the restricted area to the user via the user interface (5116), thereby enabling access to the apps therein, as well as making available the data of these apps to other apps. Otherwise, the secured area access request is denied (5114).

Figure 28:
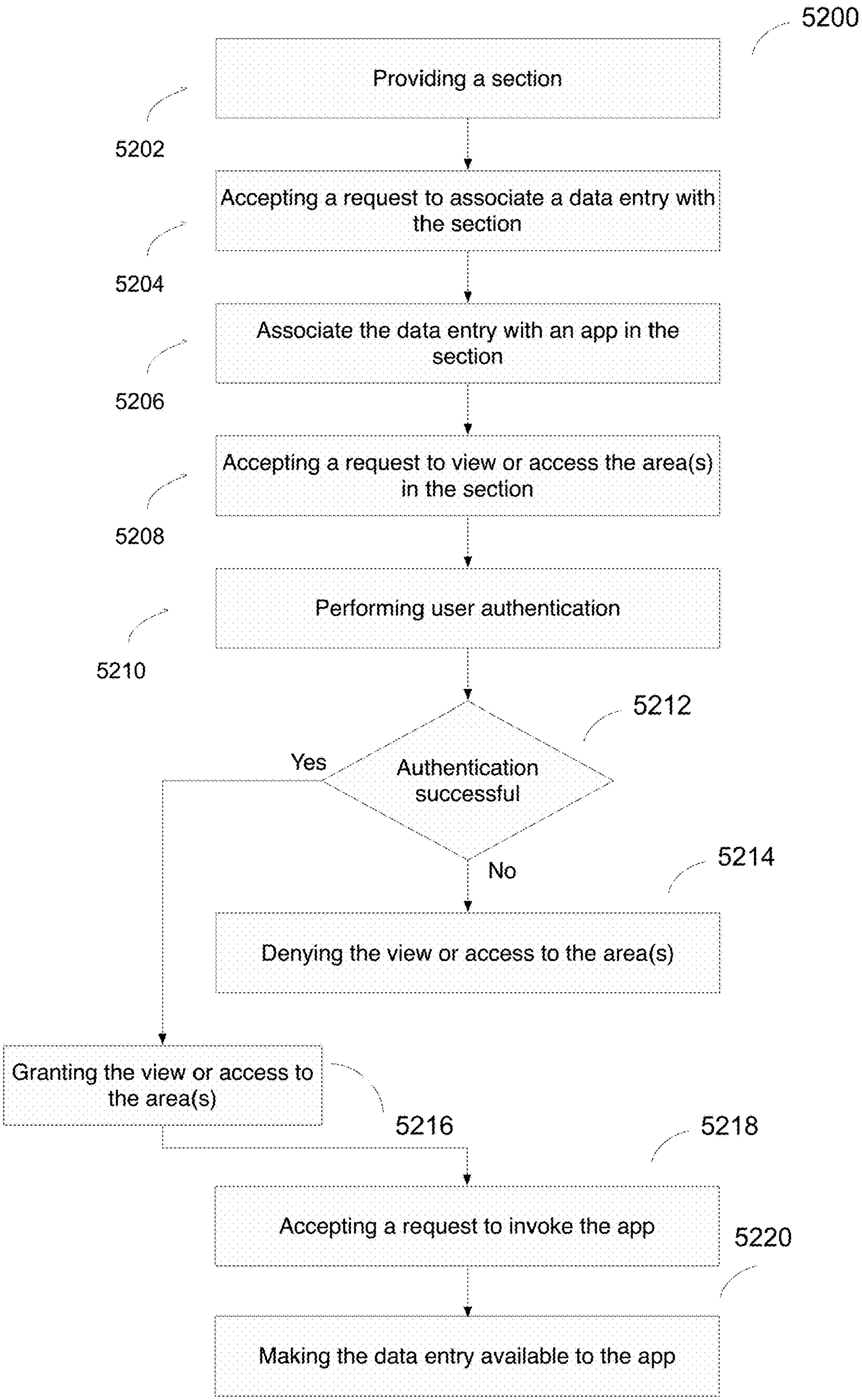
FIG. 28 shows a second computerized method in accordance with an embodiment.

FIG. 28 shows a flow diagram of an exemplary process 5200 for assigning a data entry (e.g., a contact entry, a photo, an email address) to a section of restricted areas available on a device, such as the one shown in FIG. 25. For instance, per the example process 5200, the user interface 4922 provides a section of restricted areas, views or screens (5202). It accepts from a user a request to associate a data entry with the section (5204). The User Request Handler 4908 identifies one or more apps that can handle the type of the data entry or are otherwise associated with the type, and associates the data entry with the one or more apps (5206). It stores this association information in Secure Access Definitions 4918. The User Interface 4912 accepts a request to view or access a restricted area in the section (5208). The Authenticator performs user authentication (5210). If successful (5212), it grants access to the area (5216); otherwise it denies the access (5214). When the User Request Handler 4908 accepts a request to invoke one of the one or more apps in the area upon successful authentication (5218), it makes available the data entry or data related to the data entry to the invoked app (5220).

The embodiments as described above enables a user to restrict access to an app that may not have any authentication capability itself, without the need for the device-wide authentication. For example, a parent may create a secure visual area, and place a phone app in that area, so that his kids cannot access the app without successful authentication. Or he may place a video browsing app or a Web browser in the secure area, which only requires authentication outside a certain period during a day, given that access to the date setting function for the device is also restricted. In the other words, an embodiment of the present invention enables a user to organize and manage invocation or execution-level authentication for a group of apps collectively even when the apps are not capable of doing so.

In some embodiments, data from restricted apps may not be visible or accessible to apps whose access is otherwise unrestricted. For example, if a contact book app is restricted while a phone app is not, then the phone app although functional (e.g., for making calls) cannot access to the data provided or otherwise maintained by the contact book app, and history information that the phone app may maintain should hide or otherwise omit entries that are derived from or otherwise related to the data of the contact book app.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For instance, method steps described herein may be performed in alternative orders. Various embodiments of the invention include logic stored on computer readable media, the logic configured to perform methods of the invention. The examples provided herein are exemplary and are not meant to be exclusive.

In addition, a service or application available on a user device may be made accessible to a compatible service or application on another user device for purposes of relaying a message or data sent by or addressed to a user on the other user device. For example, a user of a service (e.g., an electronic messaging service provided by one or more computing systems comprising a messaging system and a user device) may indicate to the service (e.g., via an application associated with the service where the application is running on a device of the user) that another user of the service is authorized to use a device of the user to relay, send, or receive messages or data sent by or addressed to the other user. This authorized access to such functions or capabilities on a device of the user is limited to a device of the other user whose user identity can be authenticated or otherwise ascertained.

Figure 29:
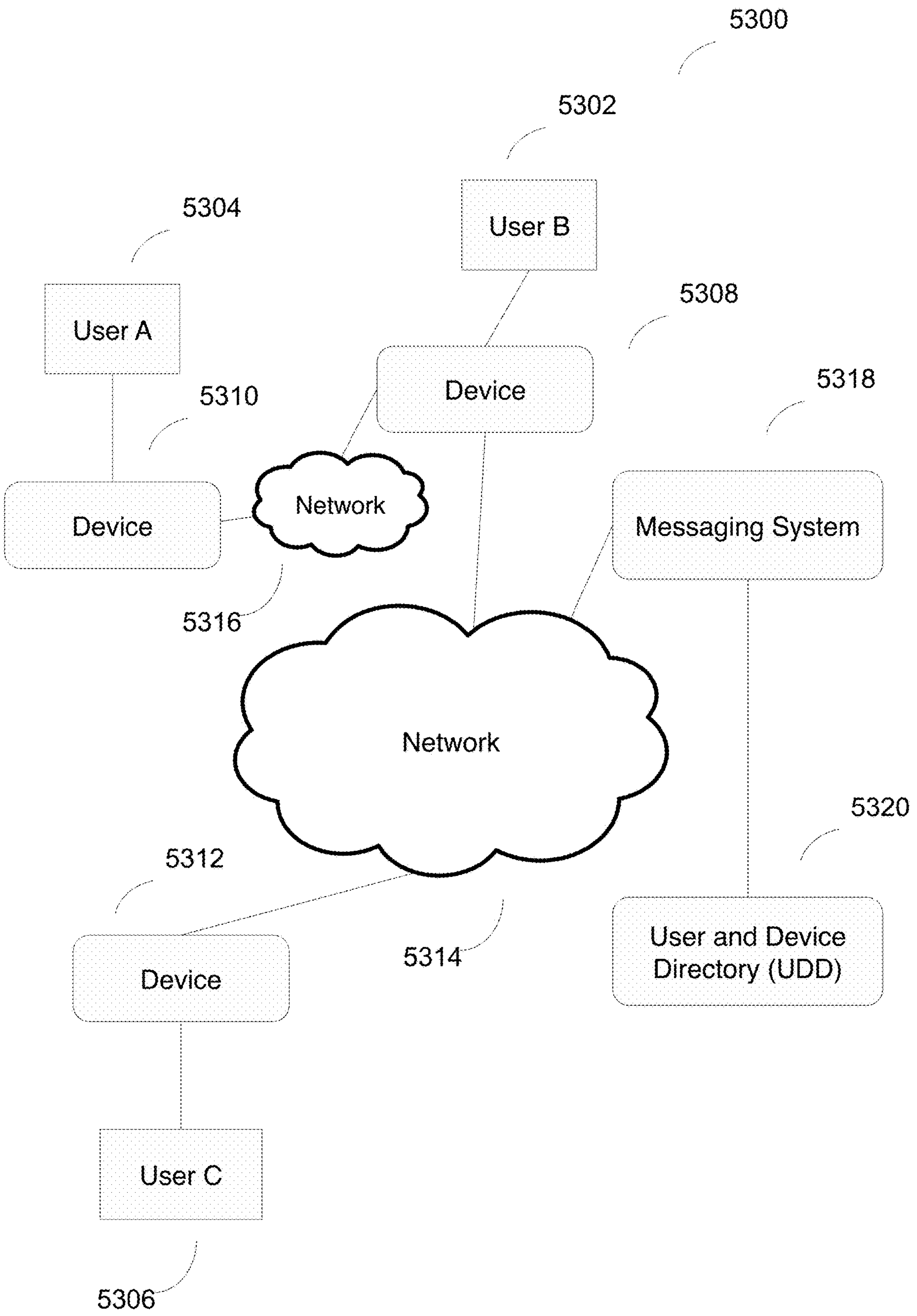
FIG. 29 shows an example environment in accordance with an embodiment.

For instance, FIG. 29 illustrates an exemplary environment 5300, according to an embodiment, for enabling a device 5310 of User A 5304 to make use of a device 5308 of User B 5302 to send and receive messages or data to and from User C 5306, when a network 5314 (e.g., the Internet) through which User C, his device 5312, or a messaging system 5318 can be reached is unavailable to the device 5310 of User A. For example, the device 5310 of User A may be communicatively connected or linked to, or otherwise reachable by the device 5308 of User B via another network 5316, e.g., a Bluetooth connection or a Wi-Fi network in non-infrastructure mode. Any type, mode or form of presence discovery and data transfer among devices is within the scope of the present invention, such as those utilizing near-field communication (NFC), Bluetooth, and Wi-Fi, or a peer-to-peer connectivity protocol or system.

As part of a signup process or user account configuration for the service, User B 5302 may specify or otherwise indicate to the messaging system 5318 that User A 5304 is permitted to receive and/or send messages (or data) through a user account of User B or a device associated with User B 5302. In one embodiment, User A may also indicate to the messaging system 5318 that messages sent by or addressed to him may be relayed through a device of User B. In one embodiment, such a permission or authorization in itself neither allows User A 5304 to interact directly with a device of User B, nor enables User B 5302 to gain visibility or access to these messages.

In one embodiment, when the messaging system 5318 receives a message addressed to User A, for example, received from the device 5312 of User C, it determines if a device of User A is available (e.g., by not receiving a periodic poll from an application or device associated with User A 5304, or by sending asynchronously or unilaterally such as via WebSocket a notification to an application or device associated with User A 5304). Should a device of User A be deemed unreachable, the messaging system 5318 may identify a device of another user, e.g., by consulting with a user and device directory (UDD) 5320, which, in one embodiment, is a database system that maintains information on one or more devices that are associated with each user of the service, and information on one or more users who are permitted to use devices associated with a particular user for relaying messages. In relation to that User A 5304 is permitted to use devices associated with User B 5302 and that the device 5308 is associated with User B 5302, the messaging system 5318 may deliver the message whose sender is User C 5306 to the device 5308 of User B, which forwards or otherwise sends it to the device 5310 of User A for presentation to User A 5310 or consumption by a compatible application associated with User A 5310. In one embodiment, the device 5308 of User B or the application receiving the message on the device does not disclose the message to User B 5302. In another embodiment, the device 5308 of User B or the application receiving the message may disclose the information in the message and any attachments or media associated with the message to User B 5302 when User B 5302 is also a recipient of the message. This mechanism or arrangement may save or otherwise reduce data usage of transmission or transfer bandwidth through the network 5314 with respect to User A 5304 and User B 5302 together, as it would otherwise take two payloads of similar size and format to deliver the content in the message to two users of the service.

Whereas an application on a device should reject or would otherwise not receive a message addressed to users that do not have an account with the application running on the device, an application in one embodiment may accept such a message and identify these recipients. The application may maintain a local list of users that User B 5302 has authorized their associated devices to receive and send messages via his device 5308, and it may obtain, receive, or update such a list of users at the messaging system 5318 (which may store and maintain this information at UDD 5320). In one embodiment, these users also agree to use a device associated with User B 5302, such as the device 5306 of User B, to relay their messages to and from their individual devices.

In one embodiment, while a device such as the device 5310 of User A 5304 may maintain its own list of authorized users, the messaging system 5318, in connection with UDD 5320, may provide and maintain a service or system-wide database for such information for all users of the service. For example, when a messaging application on the device 5310 of User A detects that there is no connectivity or communication path at the device to the network 5314 (e.g., the Internet) that would have enabled its messages or data to reach the messaging system 5318, it searches for connectivity to other devices that may reach the messaging system 5318, where these other devices may have a compatible message application running thereon. For example, in one embodiment, the messaging application may detect presence of another device through the network 5316 (or via a means of connectivity not necessarily regarded as a network, such as NFC) and exchange user identity information with the compatible messaging application on the other device. In one embodiment, the compatible messaging application may send the user identity information about User B 5302 to the messaging application on the device 5310 for presentation to User A 5304, who may then, for example, confirm the identity of User B 5302 and trust the device 5308 of User B to relay his messages. In another embodiment, the compatible messaging application may request user identity information about User A 5304 for presentation to User B 5302 who may then, for example, permit the device 5308 of User B to relay messages for the device 5310 of User A.

In one embodiment, User A 5304 may interact with his messaging application on his device 5310 so to indicate via the device 5302 of User B to the messaging system 5318 that the device 5308 of User B or the compatible messaging application on the device 5308 of User B is allowed to receive and send messages on behalf of User A 5304. For instance, User A 5304 may authorize the sending by his device 5310 to the device 5308 of User B 5302 of a code or token uniquely identifying User A 5304 to the messaging system 5318, or any messaging service-specific identification information about User A5304 that cannot easily be tempered with by User B 5302 or other users. In one embodiment, such identity information or credential may be one-time use. In another embodiment, such identity information or credential may be exchanged securely between the two devices or the two applications on these devices. In one embodiment, the device 5308 of User B may use this identity information about User A 5304 to register with the messaging system 5318 over the network 5314 that messages addressed to User B may now be sent to the device 5308 of User B, and that messages whose sender is User A 5304 may now come from the device 5308 of User B. While the application on the device 5308 of User B may handle these messages, it may not allow access to them to User B 5302. In another embodiment, User B 5302 may have access to content contained in such messages if he is also a recipient of the messages.

In one embodiment, the information provided to the messaging system 5318 for assigning or otherwise associating the device 5308 of User B as a message relaying means to the device 5310 of User A may comprise identification information of User A 5304, the device 5310 of User A, User B 5302, and the device 5308 of User B. In another embodiment, identification information of User A 5304 may be derived or otherwise looked up, e.g., by the messaging system 5318, via identification information of the device 5310 of User A, or vice versa. Likewise, identification information of User B 5302 may be derived or otherwise looked up via identification information of the device 5308 of User B, or vice versa. In one embodiment, each piece of such information may be provided by its respective device to the messaging system 5318. In another embodiment, each piece of such information may be first collected by the other device that may then forward it to the messaging system 5318.

Any mode, form, or mean of user identification and authentication as well as resource authorization, such as adopting or adapting an OAuth protocol for granting access to select resources (e.g., messages addressed to User A 5304) to a third party (e.g., the device 5306 of User B), is within the scope of various embodiments of the present invention.

In one embodiment, a compatible application, which may be running as a background service or in an active mode on the device 5308 of User B, may report to the messaging system 5318 that a device associated with User A 5304, such as the device 5310 of User A, is communicatively coupled, linked, or otherwise associated with the application, and that the device associated with User A requests the messaging system 5318 to send from now on to the device 5308 of User B those messages addressed to User A 5304, and to receive messages whose sender is User A 5304 from the device 5306 of User B. In one embodiment, such a message relaying setup or arrangement can be manually requested by either User A 5304 or User B 5302, or either user device based on some calendar time information or a timer.

In one embodiment, when the compatible application on the device 5308 of User B receives a message addressed to User A, it may send it to the device 5310 of User A, for example, via the network 5316 from the messaging system 5318, for presentation to User A 5304. In another embodiment, when the compatible application on the device 5308 of User B receives from the device 5310 of User A a message whose sender is User A with, for example, User C 5306 as recipient, it may send it to the messaging system 5318 via, for example, the network 5314. The messaging system 5318 may then forward it to the device 5312 of User C for presentation to User C 5306. In one embodiment, such an application may belong to a secure area. Identities of users whose device may be granted access to the application may also be associated with the secure area.

In one embodiment, the device 5308 of User B (namely, the relaying device) may receive or continue to receive messages addressed to User A while the device 5310 of User A (namely, the relayed device) is unreachable to the relaying device, whether temporarily or otherwise. When later the reachability is established, the relaying device may then forward those messages to the relayed device. In one embodiment, this message storing and forwarding relationship between these two devices is one to one, and can be made temporary, e.g., the relaying device not being a server configured to receive and store messages for a user (e.g., User A 5304) without the need of consent from another user (e.g., User B 5302).

In one embodiment, the relayed device may establish or restore connection or connectivity with the messaging system 5318 over the network 5314. Such establishment or restoration may be detected by the relayed device, the relaying device, and/or the messaging system 5318, and made known to the messaging system 5318, so the messaging system may choose a desirable communication path (e.g., over the network 5314 or via the relaying device) to deliver the next messages. In one embodiment, the relayed device may receive duplicate messages that may come from different networks 5316, 5314. The application receiving these messages on the relayed device may remove the duplicate messages from presentation to its user (e.g., User A 5304) based on, for example, a message identifier or some sequence number that is unique across messages, whether alone or in combination with other readily available information, such as time information.

Unlike technologies that enable multiple devices to share a network connection or to work together to bridge different payload protocols, such as peer-to-peer mobile internet connection sharing or tunneling protocols, a particular embodiment would make it possible for a device to receive a message or data addressed to another user of a common or compatible application running on the device, and forward or otherwise relay the message or data to another device communicatively coupled to the other user, where the application or another instance of the application is also running on the other device. The other device may also send messages or data via the device where the other user is a sender of the messages or data, and the user is not a recipient. The selection of or permission for this communicative channel, path, or link between the device (or the application on the device) and the other device (or the application on the other device) for receiving and sending user messages or data is based on user identity and consent.

Figure 30:
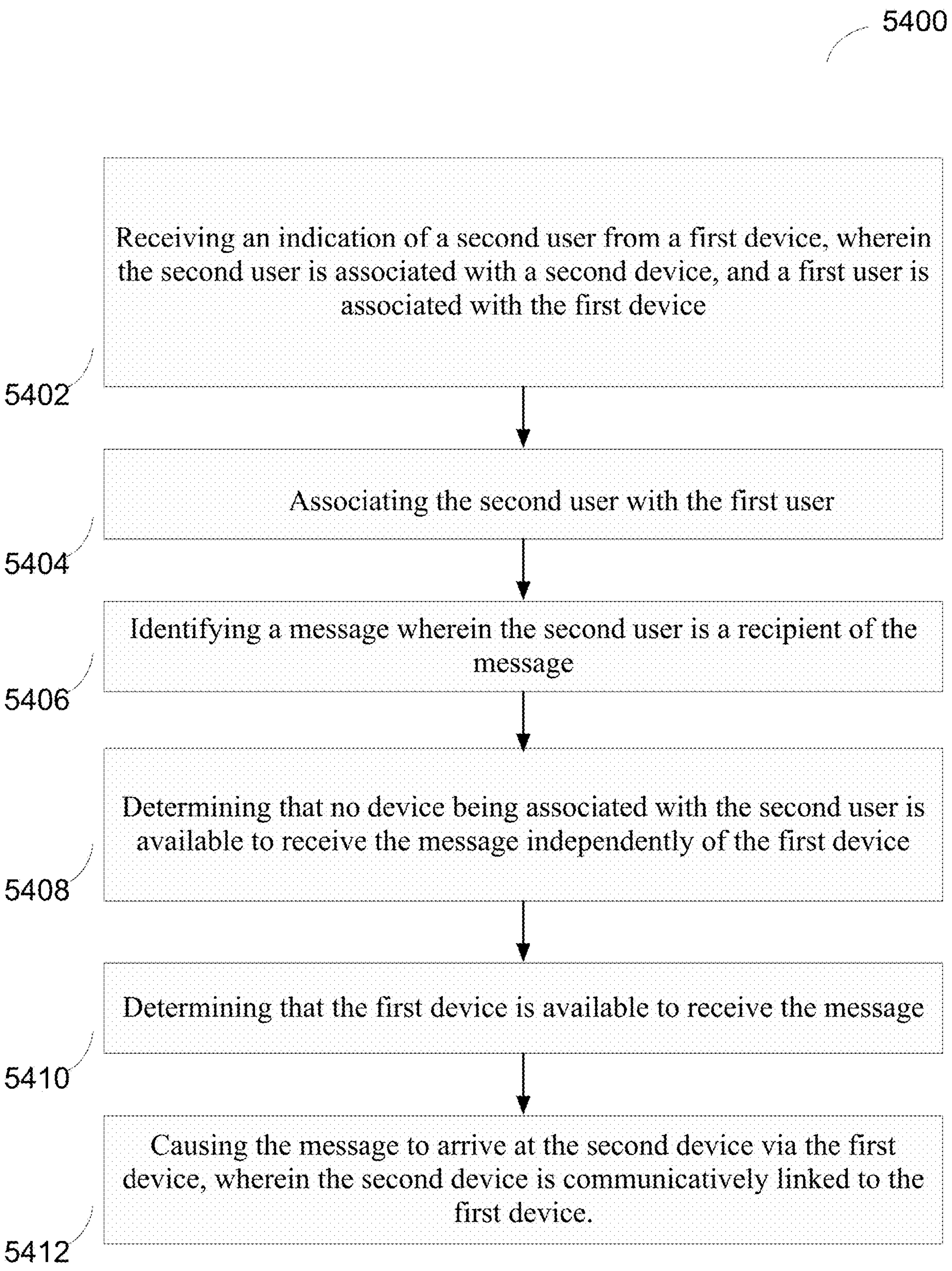
FIG. 30 shows a fourth computerized method in accordance with an embodiment.

FIG. 30 shows a flow diagram of an exemplary process 5400 for relaying a message to a user through an intermediary device of another user where, for example, the process or the steps as described may be performed under the control of one or more computing systems of a service, such as a real-time messaging service for text and multimedia. A computer system may be configured with executable instructions and may comprise a device local to a user, such as a mobile phone, and a device non-local to a user, such as a messaging system. Per the example process 5400, the computer system may receive from a device an indication of another user, such as an identification of the other user, where the device is associated with a user (e.g., an application with the user logged on is running on the device), the other user has access to a device that was, is, or will be known to the computer system, and the device is communicatively connected to the computer system over a network (5402). In one embodiment, the indication of the other user may include identification information that is inaccessible to or un-modifiable by the user and may originate from the other device or from the other user. In another embodiment, the two users may have their own accounts with the computer system or the service, and each user cannot access the account information of another user unless he obtains the logon credential of the account.

The computer system may then associate the other user with the user (5404), for example, for alternative message delivery paths, should the device of the other user become unreachable. For instance, the computer system may receive an incoming message whose recipients include the other user, or identify an outgoing message in a database or another device (e.g., a server), the message having the other user as recipient (5406). In one embodiment, the computer system may receive an indication of the user from the other user or a device associated with the other user, so to permit a device of the user to relay messages addressed to the other user or whose sender includes the other user. In another embodiment, such a message may be specific to or otherwise associated with an application or a type of application that is configured to receive or send the message or messages of similar type. In one embodiment, a device in the computer system, such as a mobile phone of the user or the other user, may receive an indication of a user and present it to the user of the other use for acknowledgment or confirmation so to grant the association of the device with another device associated with the indicated user, for the purpose of relaying messages, e.g., the device being a message relayed device or a message relaying device.

The computer system may detect that there is no device that is reachable and has the other user logged on an applicable program running on the device (5408). In one embodiment, the computer system may detect that there is no device that has an applicable program or application running with the other user logged on, where the program or application is configured to receive or send the message or messages of similar type.

In relation to the association of the other user with the user, it may locate or otherwise identify a device that is reachable (5410). In one embodiment, the computer system may locate or otherwise identify in a database a device that has an applicable program running with the user logged on.

The computer system may then send the message to the applicable program running on the device of the user, which may in turn send via a communications link, channel, or path, the message to the applicable program on the device of the other user, for example, for presentation to the other user (5412). In one embodiment, the message may be stored in a third device, from which the computer system may cause the message to be delivered from the third device to the device of the user, and then from the device of the user to the device of the other user. A compatible program or application, for example, may run on the device of the user and the device of the other user to receive and/or send the message, and is associated with its respective user who is deemed to have logged on the program or application, where the user or the other user may change to another device running another compatible program or application. In one embodiment, the computer system may then cause delivery of the message to or from the other device automatically upon determining that the user or other user is deemed to have logged on the other compatible program or application.

Figure 31:
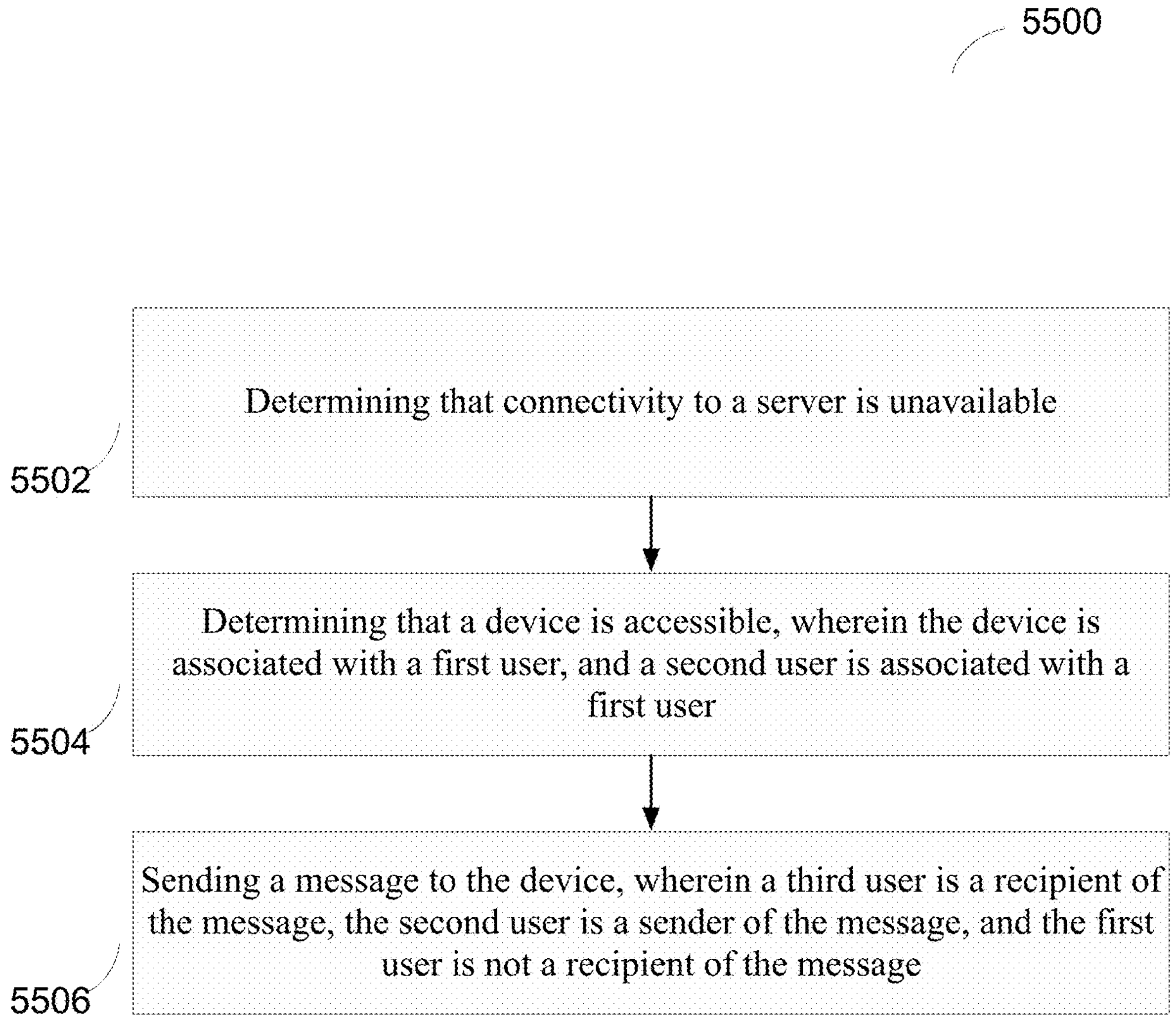
FIG. 31 shows a fifth computerized method in accordance with an embodiment.

In one embodiment, a message-relayed device may detect a message-relaying device and send a message through the latter when it loses communication to the messaging system, or connectivity to the network that may enable it to reach the messaging system. For instance, in accordance with one embodiment, FIG. 31 shows a flow diagram of an exemplary process 5500 for sending a message through a message-relaying device. A computer system may be configured with executable instructions and may comprise a device local to a user, such as a mobile phone, and/or a device non-local to a user, such as another mobile phone local to another user. Per the example process 5500, the computer system may determine that connectivity to a network or a server, e.g., a message system, is no longer available (5502). The computer system may then detect a device that it may reach (e.g., a nearby device that can be connected via a peer-to-peer connectivity or protocol), and that the device belongs to a user that the user of the computer system trusts, or is otherwise associated with an authenticated user that he trusts (5504). For instance, a first application on the computer system may request a compatible second application on the device to provide an identification of its user, which may match the identification information of the other user that the user has indicated to the first application that the user trusts the other user, devices associated with the other user, or a specific device associated with the other user. In relation to identifying the device as being associated with the other user, the computer system may send a message to the device, where the sender of the message is attributable to the user of the system, a recipient of the message is attributable to yet another user, but does not include the other user (5506).

Figure 32:
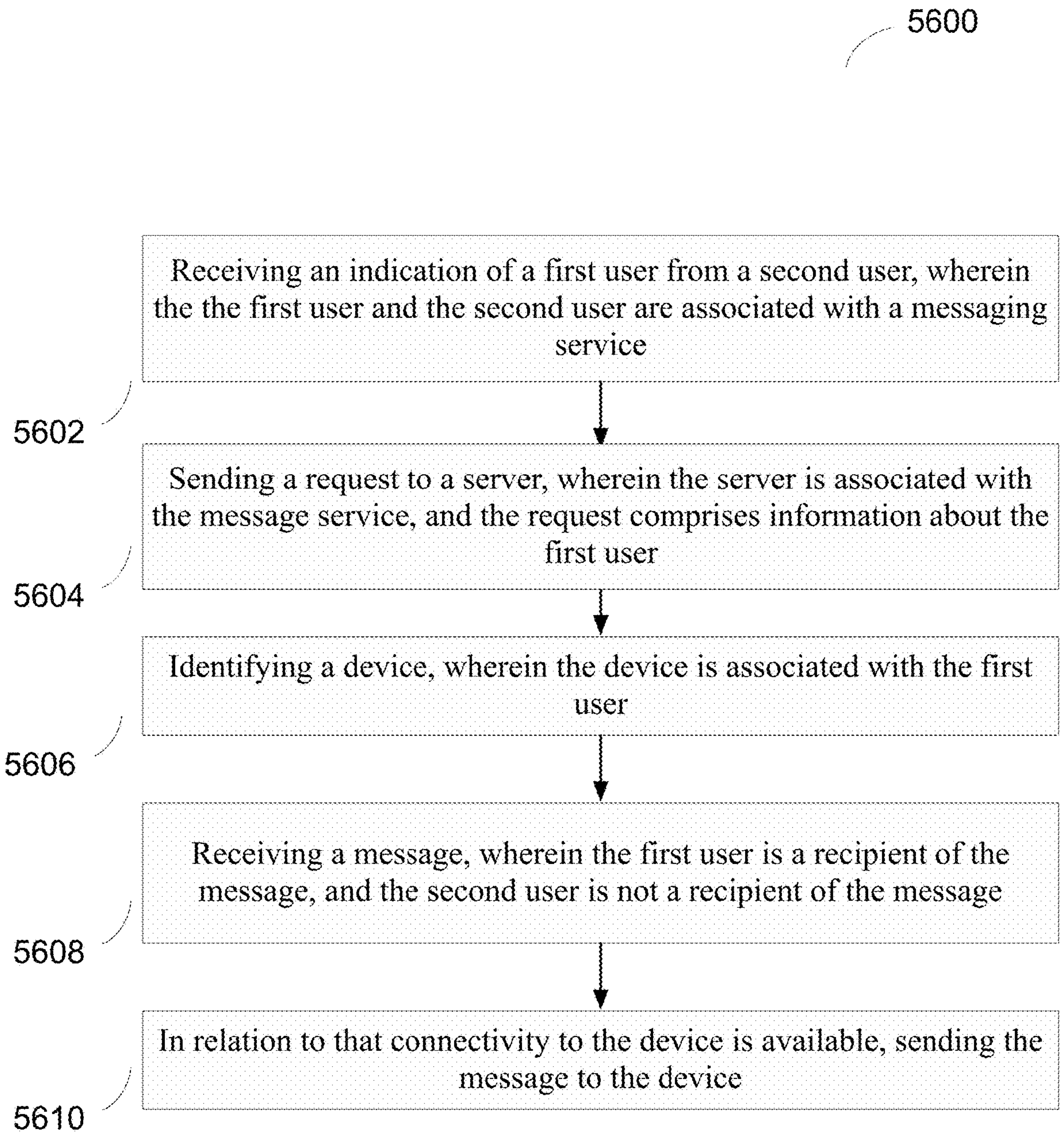
FIG. 32 shows a sixth computerized method in accordance with an embodiment.

In one embodiment, a message-relaying device may detect a message-relayed device or a device that is requesting to have another device to relay its messages. For instance, in one embodiment, FIG. 32 shows a flow diagram of an exemplary process 5600 for receiving a message on behalf of another device where the message is addressed to a user on the other device. A computer system may be configured with executable instructions and may comprise a device local to a user, such as a mobile phone, and/or a device non-local to a user, such as another mobile phone local to another user. Per the example process 5600, the computer system may receive an indication of a first user from a second user, where both users have an individual account with a common messaging service (5602). For example, the computer system may be local to the second user. It may receive from another device a request to use an application on the computer system to relay messages, where the request identifies the first user making the request or otherwise being associated with the other device. The second user may then decide to accept this request based on the identity of the first user, and indicate to the computer system as such. In one embodiment, the computer system may then send a request to a server associated with the message service, where the request identifies the first user whose messages are acceptable to devices associated with the second user for relaying (5604). The computer system may also identify the other device associated with the first user for purposes of receiving from the messaging service the future messages addressed to the first user and sending to the messaging service the incoming messages whose sender is attributable to the first user (5606). For instance, the computer system may receive a message addressed to the first user but whose recipient does not include the second user (5608). In relation to that connectivity to the other device (e.g., one that is local to the first user and has the first user authenticated) is available, the computer system may send the message to the other device (5610), for example, for presentation to the second user. In one embodiment, should connectivity to the other device be unavailable, the computer system may store the message. It may then send the message to the other device when such connectivity is available.

Figure 33:
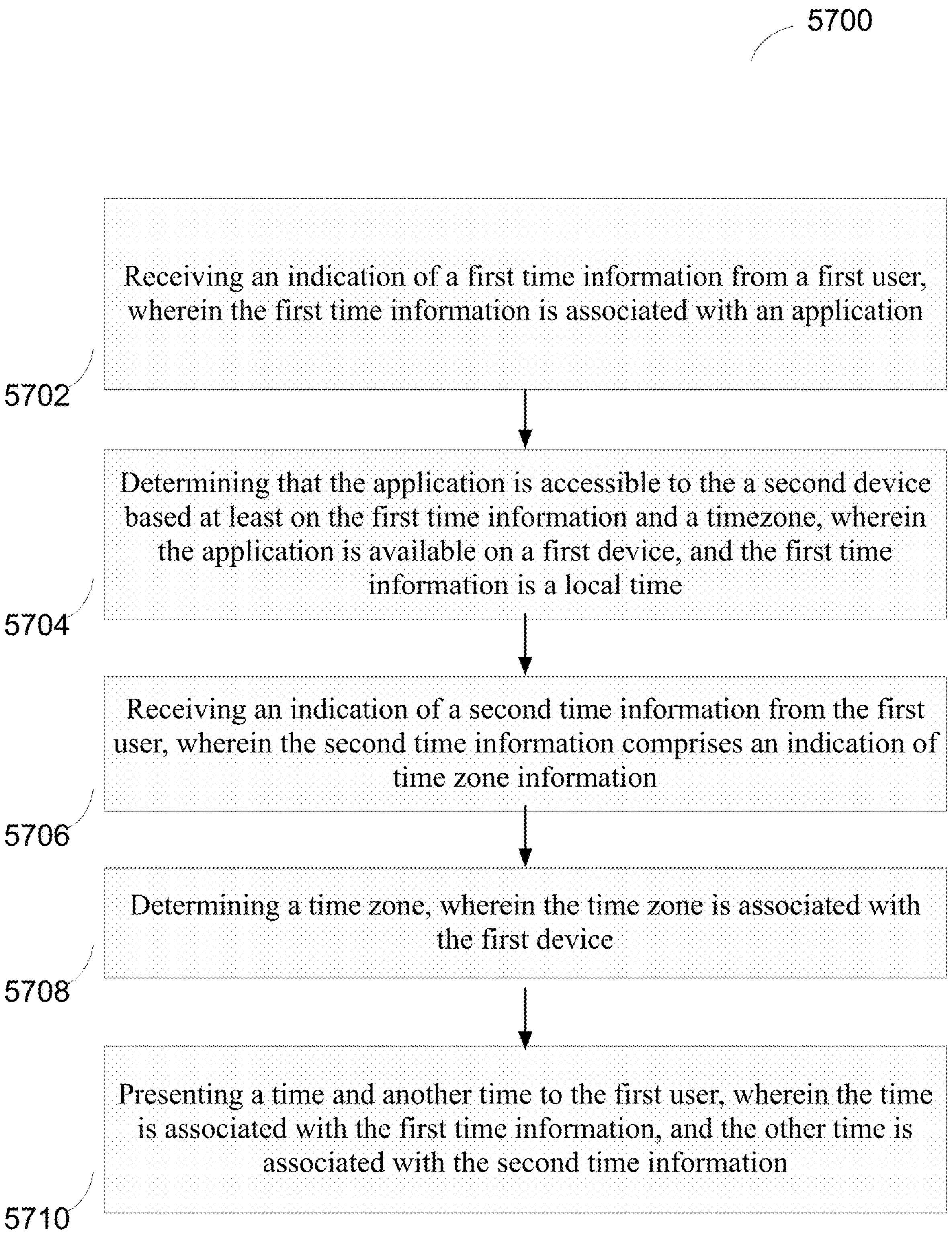
FIG. 33 shows a seventh computerized method in accordance with an embodiment.

The access to a relaying device associated with a user by a relayed device associated with another user may also be controlled or otherwise managed based on time information, e.g., time of day, a time range, a calendar time, or a combination thereof. FIG. 33 shows a flow diagram of an exemplary process 5700 for presenting time information based on a time zone-independent time in a time zone-aware context, where, for example, the process or the steps as described may be performed under the control of one or more computing systems, such as a calendar application on a mobile device. A computer system may be configured with executable instructions and may comprise a device local to a user, such as a mobile phone, and/or a device non-local to a user, such as a messaging system. Per the example process 5700, the computer system may receive an indication of a time information from a user (5702), where, for example, the time information may comprise a time when the computer system or an application on the computer system is accessible to a device associated with another user.

The computer system may then determine that a corresponding application on the computer system is accessible to a device associated with another user based on the time information and a time zone (5704). In one embodiment, the time zone may be associated with the current time zone of the computer system. In another embodiment, the time zone may be associated with the current time zone of the device. In one embodiment, the time information may be a local time pertaining to the computer system. In another embodiment, the time information may be a local time pertaining to the device. In one embodiment, the computer system may determine a time based on a time zone and the time information that is independent of a time zone (e.g., a local time), such that the time reflects the intended time of the time information in the time zone or the context of the time zone.

The computer system may also receive an indication of a second time information, for example, from the user, where the second time information comprises an indication of a time zone (5706). For example, such a second time information may indicate when access to the device by the other device associated with the other user is to begin or to end. In one embodiment, the computer system may determine a time zone to interpret the first time information and/or the second time information (5708). In one embodiment, such a time zone may be the current time zone of the computer system, the device, or the other device.

In relation to a time zone information, a first time information that is independent of a time zone, and a second time information that is specific to a time zone, the computer system may present to the user, e.g., via a schedule, calendar, or time table, an indication, e.g., a view, of a time and another time (5710). For instance, in one embodiment, the time may be determined based on the first time information and the time zone information and the other time may be determined based on the second time information and the time zone, where both the time and the other time are presented correctly in relation to each other and in accordance with the time zone.

Figure 34:
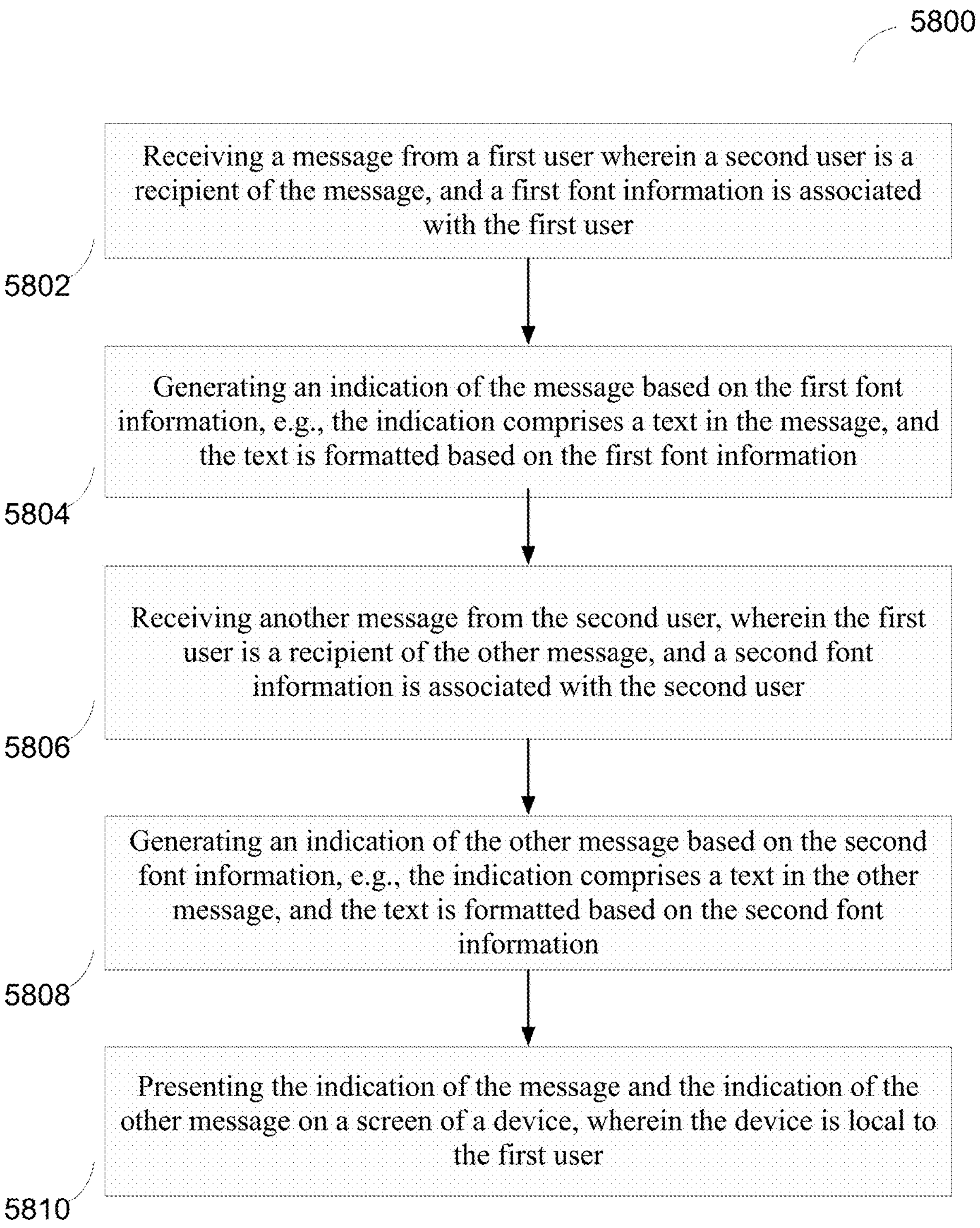
FIG. 34 shows an eighth computerized method in accordance with an embodiment.

The identity of a user of a message-relayed device or a message-relayed application on a device may also be indicated with a personalized font for text information in a message. FIG. 34 shows a flow diagram of an exemplary process 5800 for generating and/or presenting a message based on font information that is specific to a sender of the message, where, for example, the process or the steps as described may be performed under the control of one or more computing systems, such as a messaging application on a mobile device. A computer system may be configured with executable instructions and may comprise a device local to a user, such as a mobile phone, and/or a device non-local to a user, such as a messaging system. Per the example process 5800, the computer system may receive a message whose sender is attributed to a first user and whose recipients include a second user, where a first font information, e.g., Helvetica, is associated with the first user (5802). In one embodiment, such a font information may contain a font that corresponds to the handwriting of the first user. In another embodiment, the first font information and its association with the first user may be maintained at a device associated with the second user, the device having received the message. In one embodiment, the message may comprise the first font information, or a device associated with the second user may receive an indication of a message, where the indication may include the first font information. In relation to receiving the message, the computer system may generate an indication of the message based on the first font information (5804). For example, a text in the message may be formatted in accordance with the first font information.

Likewise, the computer system may receive another message whose sender is attributed to the second user and whose recipients include the first user, where a second font information, e.g., Arial, is associated with the second user (5806). In relation to receiving the other message, the computer system may generate an indication of the other message based on the second font information (5808). For example, a text in the other message may be formatted in accordance with the second font information.

In relation to the two indications each comprising a message from a different user, the computer system may present them to a user via a device screen (5810), where, for example, the two messages are displayed in two different fonts, each being associated with its respective user.

As indicated earlier, the embodiments discussed herein are illustrative of the present invention. The various procedures described herein may be implemented with hardware or software, or a combination of both. The invention may be implemented with non-transitory computer-readable storage media and/or computer-readable communication media. Computer programs incorporating various features or aspects of the present invention, or portions thereof, may be encoded on various computer readable media for storage and/or transmission, or take the form of program code (i.e. instructions) embodied in a tangible media; suitable media include magnetic disk or tape, optical storage media such as compact disk (CD) or DVD (digital versatile disk), flash memory, hard drive, and any other machine-readable storage medium. Computer readable media encoded with the program code may be packaged with a compatible device or provided separately from other devices (e.g., via Internet download). Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only. Thus, although the invention has been described with respect to specific embodiments, it will be appreciated that the invention is intended to cover all modifications and equivalents within the scope of any applicable claim.

What is claimed:

1. A system, comprising:

one or more processors; and one or more memories communicatively coupled to the one or more processors when the system is operational, the one or more memories bearing computer-readable instructions that, when executed by the one or more processors, cause the system at least to:

receive from a device an indication of non-compliance in relation to an indication of content, wherein the device receives at least one response from a digital resource provider in relation to an indication of request via a protocol interface, the at least one response comprises the indication of content, the protocol interface comprises at least one of a network port, one of a communication endpoint, or one of a communication protocol, and the protocol interface is associated with providing shopping content; and identify the digital resource provider in relation to the indication of non-compliance.

2. One or more non-transitory computer-readable storage media for enabling an online system to provide more reliably context-relevant information, bearing computer-readable instructions that, when executed on one or more computers, cause the one or more computers to perform operations comprising:

receiving an indication of non-compliance in relation to an indication of content, wherein a device receives at least one response from a digital resource provider in relation to an indication of request via a protocol interface, the at least one response comprises the indication of content, the protocol interface comprises at least one of a network port, one of a communication endpoint, or one of a communication protocol, and the protocol interface is associated with providing shopping content; and identifying the digital resource provider in relation to the indication of non-compliance.

3. A computer-implemented method, comprising:

receiving, by a computer system, an indication of non-compliance in relation to an indication of content, wherein a device receives at least one response from a digital resource provider in relation to an indication of request via a protocol interface, the at least one response comprises the indication of content, the protocol interface comprises at least one of a network port, one of a communication endpoint, or one of a communication protocol, and the protocol interface is associated with providing shopping content; and identifying, by the computer system, the digital resource provider in relation to the indication of non-compliance.

4. The system of claim 1, wherein the protocol interface is associated with a standard or standards, and the standard or standards identify the protocol interface as providing shopping content.

5. The system of claim 4, wherein the standard or standards are published prior to the device receiving the at least one response from the digital provider in relation to the indication of request via the protocol interface.

6. The system of claim 4, wherein the standard or standards are an Internet Engineering Task Force (IETF) Request for Comment (RFC), the protocol interface comprises a network port, the network port is associated with a port number, and the IETF RFC associates the network port with receiving one or more requests for shopping content.

7. The system of claim 1, wherein the protocol interface comprises a uniform resource identifier (URI) scheme and a network port, the network port is associated with a port number, and the URI scheme is associated with shopping.

8. The system of claim 1, wherein the protocol interface comprises a communication protocol, and the communication protocol is predefined as providing shopping content as payload, independently of applications and data available on the digital resource provider, and independently of prior requests sent to the digital resource provider.

9. The system of claim 1, wherein the instructions that, when executed by the one or more processors, cause the system at least to receive the indication of non-compliance, further cause the system at least to:

receive the indication of non-compliance from the device, wherein the indication of non-compliance is generated by the device in relation to determining that payload associated with the at least one response is not associated with shopping content.

10. A system, comprising:

one or more processors; and one or more memories communicatively coupled to the one or more processors when the system is operational, the one or more memories bearing computer-readable instructions that, when executed by the one or more processors, cause the system at least to:

receive an indication of request from device via a protocol interface, wherein the protocol interface comprises at least one of a network port, one of a communication endpoint, or one of a communication protocol, the protocol interface is associated with providing shopping content, and the indication of request is associated with one or more queries;

determine from one or more databases that at least one digital resource matches the one or more queries;

determine that the at least one digital resource is not associated with shopping; and send response to the device, wherein the response comprises an indication in relation to determining that the at least one digital resource is not associated with shopping.

11. The system of claim 10, wherein the response does not comprise the at least one digital resource.

12. The system of claim 1, wherein the non-compliance is determined in relation to content associated with the indication of content, and the device requests and receives the content from the digital resource provider.

13. The system of claim 1, further comprising:

wherein the system comprises a first collection of servers and a second collection of servers, the first collection of servers and the second collection of servers each comprising one or more servers;

wherein the protocol interface is associated with at least one server from among the first collection of servers;

wherein the indication of request is received by the at least one server from among the first collection of servers;

wherein the at least one response is sent by the at least one server from among the first collection of servers; and wherein the indication of non-compliance is received and the digital resource provider is identified by one or more servers from among the second collection of servers.

14. The system of claim 1, wherein the one or more memories further bear computer-readable instructions that, when executed by the one or more processors, cause the system at least to:

receive the content via the protocol interface, wherein the content is associated with the digital resource provider.

15. The system of claim 1, wherein the one or more memories further bear computer-readable instructions that, when executed by the one or more processors, cause the system at least to:

remove or suspend one or more addresses associated with the digital resource provider from accepting another indication of request in relation to receiving the indication of non-compliance.

16. The system of claim 1, wherein the standard or standards are published by at least one organization, and the at least one organization is a third party to an operator of the system.

17. The one or more non-transitory computer-readable storage media of claim 2, wherein the protocol interface is associated with a standard or standards, the standard or standards identify the protocol interface as providing shopping content, and the standard or standards are published prior to the device receiving the at least one response from the digital provider in relation to the indication of request via the protocol interface.

18. The one or more non-transitory computer-readable storage media of claim 2, further bearing computer-readable instructions that, when executed on the one or more computers, cause the one or more computers to perform operations further comprising:

receiving the content via the protocol interface, wherein the content is associated with the digital resource provider.

19. The computer-implemented method of claim 3, wherein the protocol interface is associated with a standard or standards, the standard or standards identify the protocol interface as providing shopping content, and the standard or standards are published prior to the device receiving the at least one response from the digital provider in relation to the indication of request via the protocol interface.

20. The computer-implemented method of claim 3, further comprising:

receiving the content via the protocol interface, wherein the content is associated with the digital resource provider.

* * * * *